United States Patent
Chatterjee et al.

(10) Patent No.: US 11,736,253 B2
(45) Date of Patent: *Aug. 22, 2023

(54) COLLISION HANDLING OF REFERENCE SIGNALS

(71) Applicant: Apple Inc., Cupertino, CA (US)

(72) Inventors: Debdeep Chatterjee, Mountain View, CA (US); Alexei Vladimirovich Davydov, Nizhny Novgorod (RU); Seung Hee Han, San Jose, CA (US); Jeongho Jeon, San Jose, CA (US); Sameer Pawar, Santa Clara, CA (US); Avik Sengupta, San Jose, CA (US); Guotong Wang, Beijing (CN); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,229

(22) Filed: Mar. 8, 2022

(65) Prior Publication Data

US 2022/0190987 A1 Jun. 16, 2022

Related U.S. Application Data

(63) Continuation of application No. 16/625,149, filed as application No. PCT/US2018/038545 on Jun. 20, 2018, now Pat. No. 11,290,230.

(Continued)

(51) Int. Cl.
*H04L 5/00* (2006.01)
*H04L 1/1812* (2023.01)

(52) U.S. Cl.
CPC .......... *H04L 5/0048* (2013.01); *H04L 1/1812* (2013.01); *H04L 5/0044* (2013.01);
(Continued)

(58) Field of Classification Search
CPC ... H04L 5/0048; H04L 1/1812; H04L 5/0094; H04L 5/0053; H04L 5/0044; H04L 5/0051
See application file for complete search history.

(56) References Cited

U.S. PATENT DOCUMENTS

| 10,945,251 B2 * | 3/2021 | Nogami ............. H04W 72/042 |
| 2016/0057753 A1 | 2/2016 | Yang et al. |

(Continued)

FOREIGN PATENT DOCUMENTS

| CN | 103931254 A | 7/2014 |
| TW | 201141252 A | 11/2011 |
| WO | 2014110796 | 7/2014 |

OTHER PUBLICATIONS

Chinese Notice of Allowance; Application No. 201880043092.8; dated Aug. 8, 2022, 6 pgs.

(Continued)

*Primary Examiner* — Asghar H Bilgrami
(74) *Attorney, Agent, or Firm* — Kowert, Hood, Munyon, Rankin & Goetzel, P.C.

(57) ABSTRACT

A user equipment (UE) can include processing circuitry configured to decode control information of a physical down-link control channel (PDCCH) received via a resource within a control resource set (CORESET) occupying a subset of a plurality of OFDM symbols within a slot. At least one of the symbols in the subset coincides with a pre-defined symbol location associated with a demodulation reference signal (DM-RS) of a PDSCH. The DM-RS can be detected within the slot, the DM-RS starting at a symbol location that is shifted from the pre-defined symbol location and following the subset of symbols. Downlink data scheduled by the PDCCH and received via the PDSCH can be decoded, where the decoding is based on the detected DM-RS.

20 Claims, 36 Drawing Sheets

Related U.S. Application Data

(60) Provisional application No. 62/654,196, filed on Apr. 6, 2018, provisional application No. 62/710,495, filed on Feb. 16, 2018, provisional application No. 62/591,073, filed on Nov. 27, 2017, provisional application No. 62/532,833, filed on Jul. 14, 2017, provisional application No. 62/525,007, filed on Jun. 26, 2017.

(52) U.S. Cl.
CPC .......... *H04L 5/0051* (2013.01); *H04L 5/0053* (2013.01); *H04L 5/0094* (2013.01)

(56) References Cited

U.S. PATENT DOCUMENTS

| | | | |
|---|---|---|---|
| 2018/0227156 A1* | 8/2018 | Papasakellariou | ........................... H04W 72/0453 |
| 2019/0158205 A1* | 5/2019 | Sheng | .................... H04L 5/0048 |
| 2020/0367288 A1* | 11/2020 | Dahlman | .......... H04W 74/0833 |
| 2020/0374967 A1* | 11/2020 | Nogami | ................ H04L 1/0061 |

OTHER PUBLICATIONS

Intel Corporation; "SS Burst Set Composition" 3GPP TSG RAMN WG1 NR Ad-Hoc#2 R1-1710502; Qingdao, P. R. China, Jun. 27, 2017. 7 Pages.

Ericsson; "Remaining details on DMRS design"; 3GPP TSG RAN WG1 Meeting 90 bis R1-17018448; Prague, CZ, Oct. 9, 2017. 11 Pages.

AT&T; "Remaining details for DMRS design"; 3GPP TSG RAN WG1 Meeting 91 R1-1719637; Reno, USA, Nov. 27, 2017. 5 Pages.

Extended European Search Report for Patent Application No. EP 18823421; dated Feb. 9, 2021. 12 Pages.

Catt; "Flexible Reuse of DL Control Resources for Data Transmission"; 3GPP TSG RAN WG1 NR Ad-Hoc#2; R1-1710079; Qingdao, China; Jun. 2017; 4 pgs.

Panasonic; "Configuration of Coreset"; 3GPP TSG RAN WG1 NR Ad-Hoc#2; R1-1711329; Qingdao, China; Jun. 2017; 3 pgs.

ZTE; "Discussion on Downlink DMRS Design"; 3GPP TSG RAN WG1, Meeting #89; R1-1707130; Hangzhou, China; May 2017; 11 pgs.

* cited by examiner

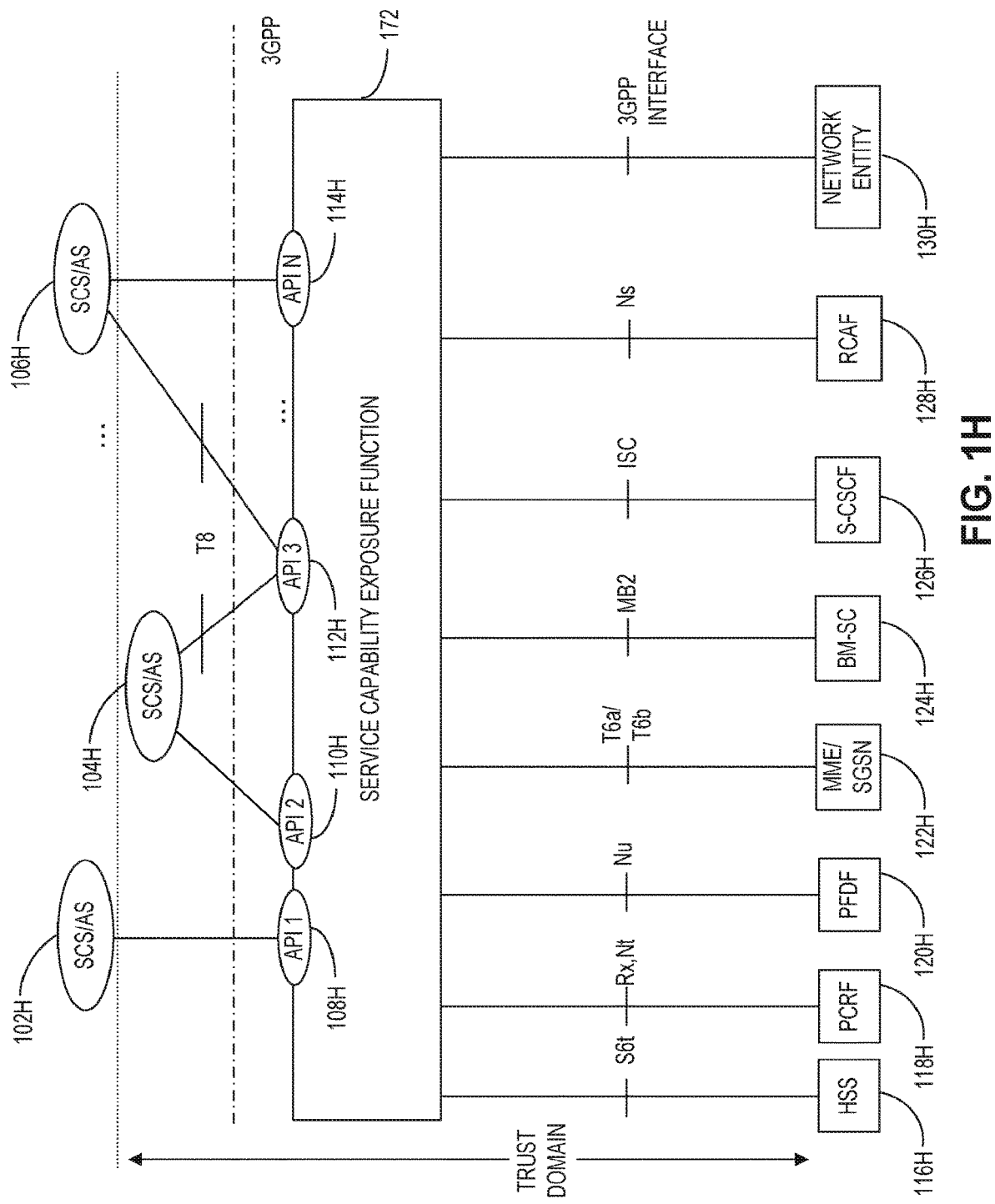

COLLISION HANDLING OF REFERENCE SIGNALS

PRIORITY CLAIM

This application is a continuation of U.S. patent application Ser. No. 16/625,149, filed Dec. 12, 2019, entitled, "COLLISION HANDLING OF REFERENCE SIGNALS", which is a National Stage Entry of PCT/US2018/038545, filed Jun. 20, 2018, which claims the benefit of priority to the following United States Provisional Patent Applications:

U.S. Provisional Patent Application Ser. No. 62/525,007, filed Jun. 26, 2017, and entitled "DOWNLINK (DL) REFERENCE SIGNAL GENERATION FOR NEW RADIO (NR) WIDEBAND OPERATION WITH MIXED NUMEROLOGY";

U.S. Provisional Patent Application Ser. No. 62/532,833, filed Jul. 14, 2017, and entitled "CHANNEL STATE INFORMATION REFERENCE SIGNAL AND SYNCHRONIZATION SIGNAL BLOCK TRANSMISSION FOR BEAM MANAGEMENT";

U.S. Provisional Patent Application Ser. No. 62/591,073, filed Nov. 27, 2017, and entitled "TECHNOLOGIES FOR HANDLING COLLISIONS BETWEEN PHYSICAL DOWNLINK SHARED CHANNEL (PDSCH) DEMODULATION REFERENCE SIGNAL (DM-RS) AND PHYSICAL DOWNLINK CONTROL CHANNEL (PDCCH) CONTROL. RESOURCE SETS (CORESETS) OR RESOURCE SETS FOR RATE-MATCHING";

U.S. Provisional Patent Application Ser. No. 62/710,495, filed Feb. 16, 2018, and entitled "TECHNOLOGIES FOR HANDLING COLLISIONS BETWEEN PHYSICAL DOWNLINK SHARED CHANNEL (PDCCH) DEMODULATION REFERENCE SIGNAL (DM-RS) AND PHYSICAL DOWNLINK CONTRAIL CHANNEL (PDCCH) CONTROL RESOURCE SETS (CORESETS) OR RESOURCE SETS FOR RATE-MATCHING"; and U.S. Provisional Patent Application Ser. No. 62/654,196, filed Apr. 6, 2018, and entitled "TECHNOLOGIES FOR HANDLING COLLISIONS BETWEEN PHYSICAL DOWNLINK SHARED CHANNEL (PDSCH) DEMODULATION REFERENCE SIGNAL (DM-RS) AND PHYSICAL DOWNLINK CONTROL CHANNEL (PDCCH) CONTROL RESOURCE SETS (CORESETS) OR RESOURCE SETS FOR RATE-MATCHING."

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

The above-identified provisional patent applications are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to collision handling of reference signals. Yet other aspects are directed to downlink (DL) reference signal generation for NR wideband operation with mixed numerology. Some aspects relate to channel state information reference signal (CSI-RS) and synchronization signal (SS) block transmission for beam management. Some aspects relate to technologies for handling collisions between physical downlink shared channel (PDSCH) demodulation reference signal (DM-RS) and physical downlink control channel (PDC CH) control resource sets (CORESETs) or resource sets for rate matching.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks are expected to increase throughput, coverage, and robustness and reduce latency and operational and capital expenditures. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to address collision of signals.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 1H illustrates an example Service Capability Exposure Function (SCEF) in accordance with some aspects.

DETAILED DESCRIPTION

Figure 1A:
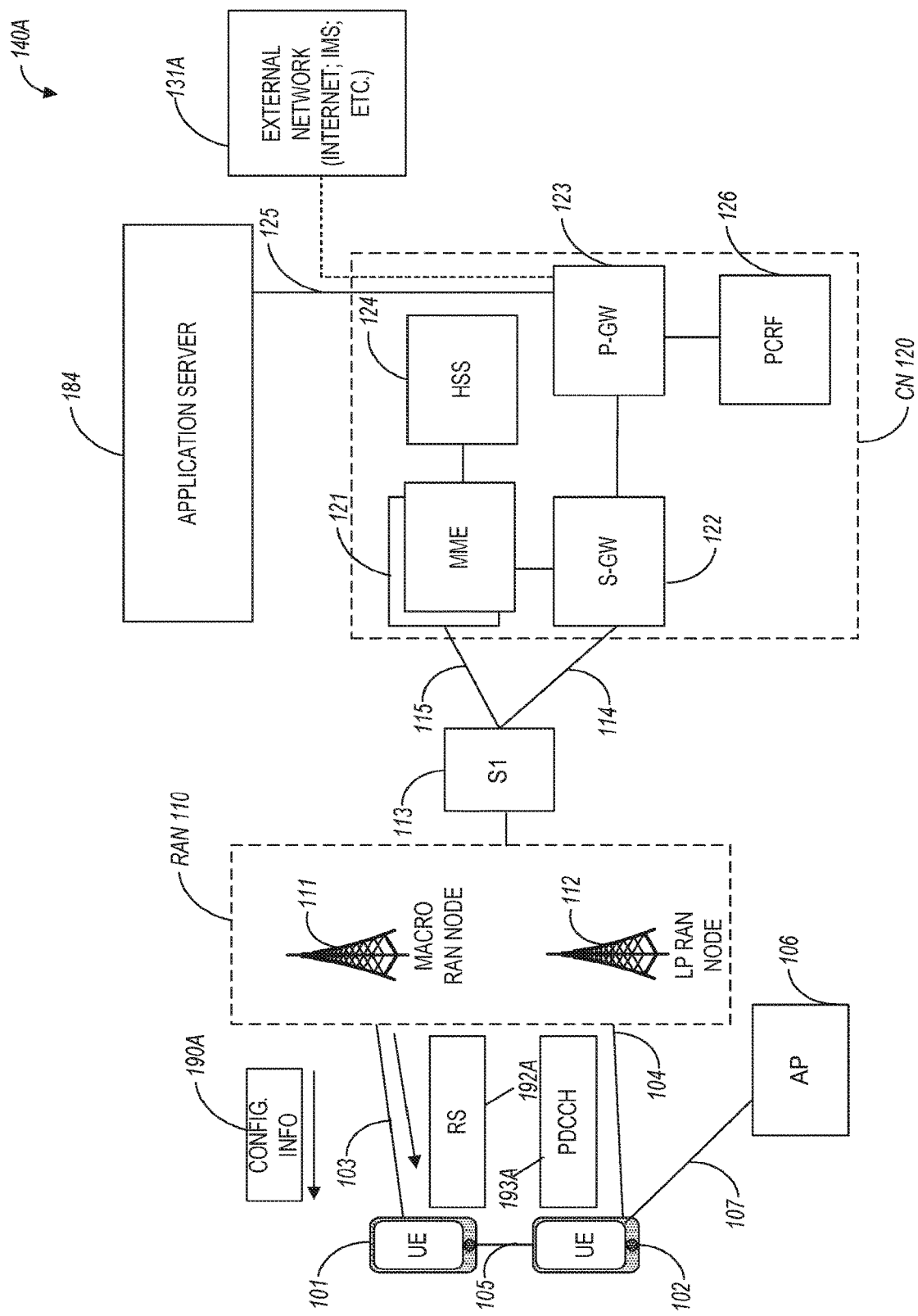
FIG. 1A illustrates an architecture of a network in accordance with some aspects.

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following exemplary radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA(UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA). MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WIDEN), iBurst, Unlicensed Mobile Access (UMA), also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11 ad, IEEE 802.11 ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G-initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based to multicarrier (FBMC), OFDMA, etc.) and in particular 3GPP NR (New Radio) by allocating the OFDM carrier data bit vectors to the corresponding symbol resources.

FIG. 1A illustrates an architecture of a network in accordance with some aspects. The network 140A is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, FIG. 1E, FIG. 1F, and FIG. 1G.

In an aspect, the UEs 101 and 102 may further directly exchange communication data via a ProSe interface 105. The ProSe interface 105 may be referred to alternatively as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any WEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise wound stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g, macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including but not limited to, radio network controller (RNC) functions such as radio bearer management, uplink and downlink dynamic radio resource management and data packet scheduling and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-TDMA) communication technique (e.g, for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The FPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 19-10. In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (IISS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate a SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CNN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited. Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow temp late (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deploy meat (the network operates in re-farmed GSM spectrum); (b) in-band deployment (the network operates within the LTE channel); and (c) guard-hand deployment (the network operates in the guard band of legacy LTE channels). In some aspects, such as with further enhanced NB-IoT (FeNB-IoT), support for NB-IoT in small cells can be provided (e.g, in microcell, picocell or femtocell deployments). One of the challenges NB-IoT systems face for small cell support is the UL/DL link imbalance, where for small cells the base stations have lower power available compared to macro-cells, and, consequently, the DL coverage can be affected and/or reduced. In addition, some NB-IoT UEs can be configured to transmit at maximum power if repetitions are used for UL transmission. This may result in large inter-cell interference in dense small cell deployments. In some aspects, the UE 101 can receive configuration information 190A via, e.g., higher layer signaling. The configuration information 190A can include a synchronization signal (SS) set, which can include a primary synchronization signal (PSS), a secondary synchronization signal (SSS), a physical broadcast channel (PBCH), and/or other types of configuration signaling. In some aspects, the UE 101 can also receive a reference signal 192A. In some aspects, the reference signal can be channel state information reference signal (CSI-RS), which can be used by the UE to estimate a channel and generate channel quality information (CQI) for reporting back to the gNB. In some aspects, the reference signal 192A can be a demodulation reference signal (DM-RS), which can be used for demodulation and decoding of data such as data received via a physical downlink shared channel (PDSCH). Additionally, the UE 101 can be configured to receive control information such as information received on the physical downlink control channel (PDCCH) 193A. In some aspects, the control information can include control resource sets (CORESETs) communicated via the PDCCH 193A. Techniques disclosed herein can be used to avoid or mitigate collision between the configuration information 190A, the reference signal 192A, and/or the PDCCH 193A.

Figure 1B:
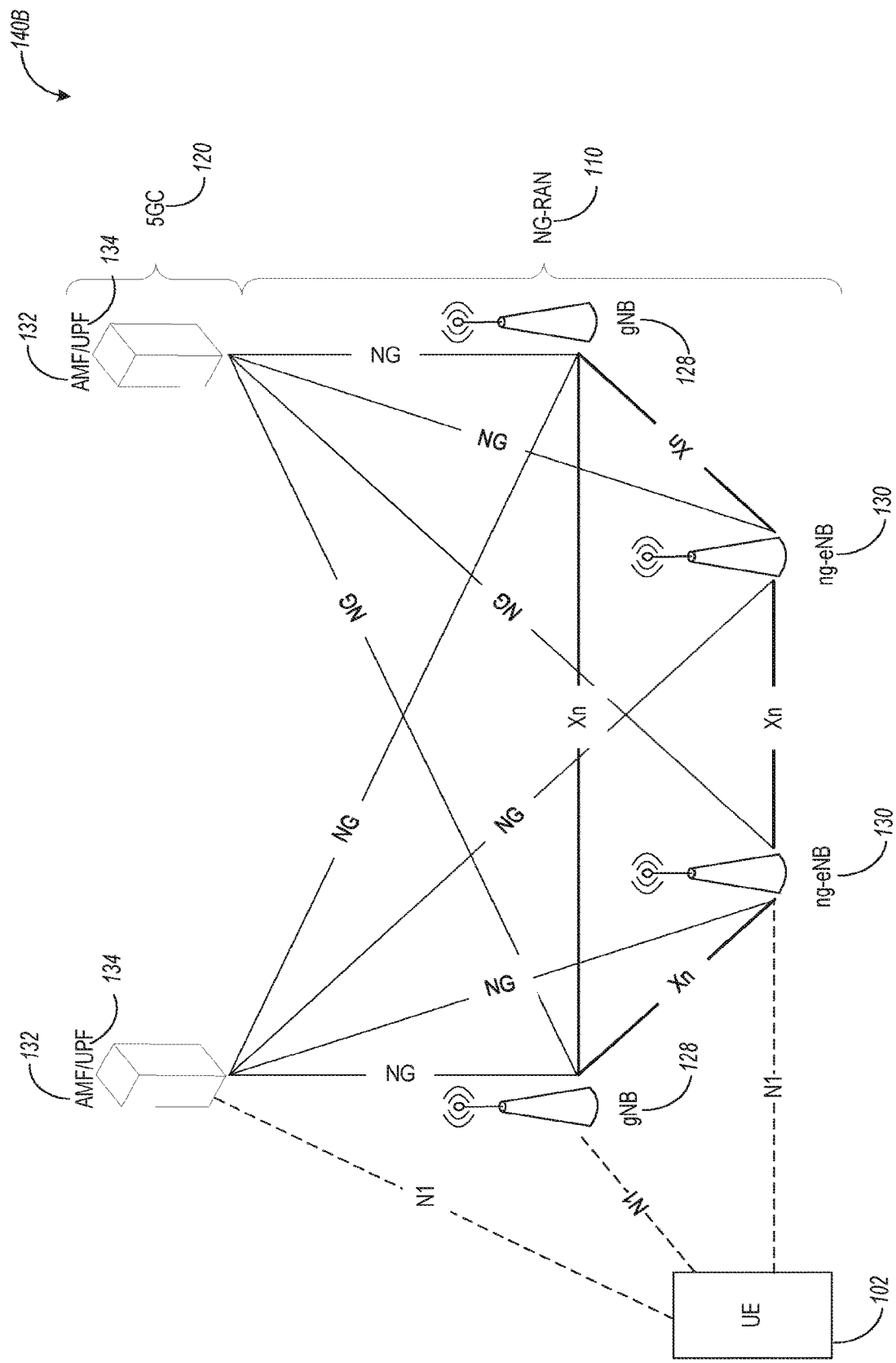
FIG. 1B is a simplified diagram of an overall next generation (NG) system architecture in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130. The gNBs 128 and the NG-eNBs 130 can be communicatively coupled to the UE 102 via, e.g, an N1 interface.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE, and is connected via the NG interface to the 5GC 120. In some aspects, an NG-eNB 130 can include a node providing evolved universal terrestrial radio access (E-UTRA) user plane and control plane protocol terminations towards the UE, and is connected via the NG interface to the 5GC 120.

In some aspects, each of the gNBs 128 and the NG-eNBs 130 can be implemented as a base station, a mobile edge server, a small cell, a home eNB, and so forth.

Figure 1C:
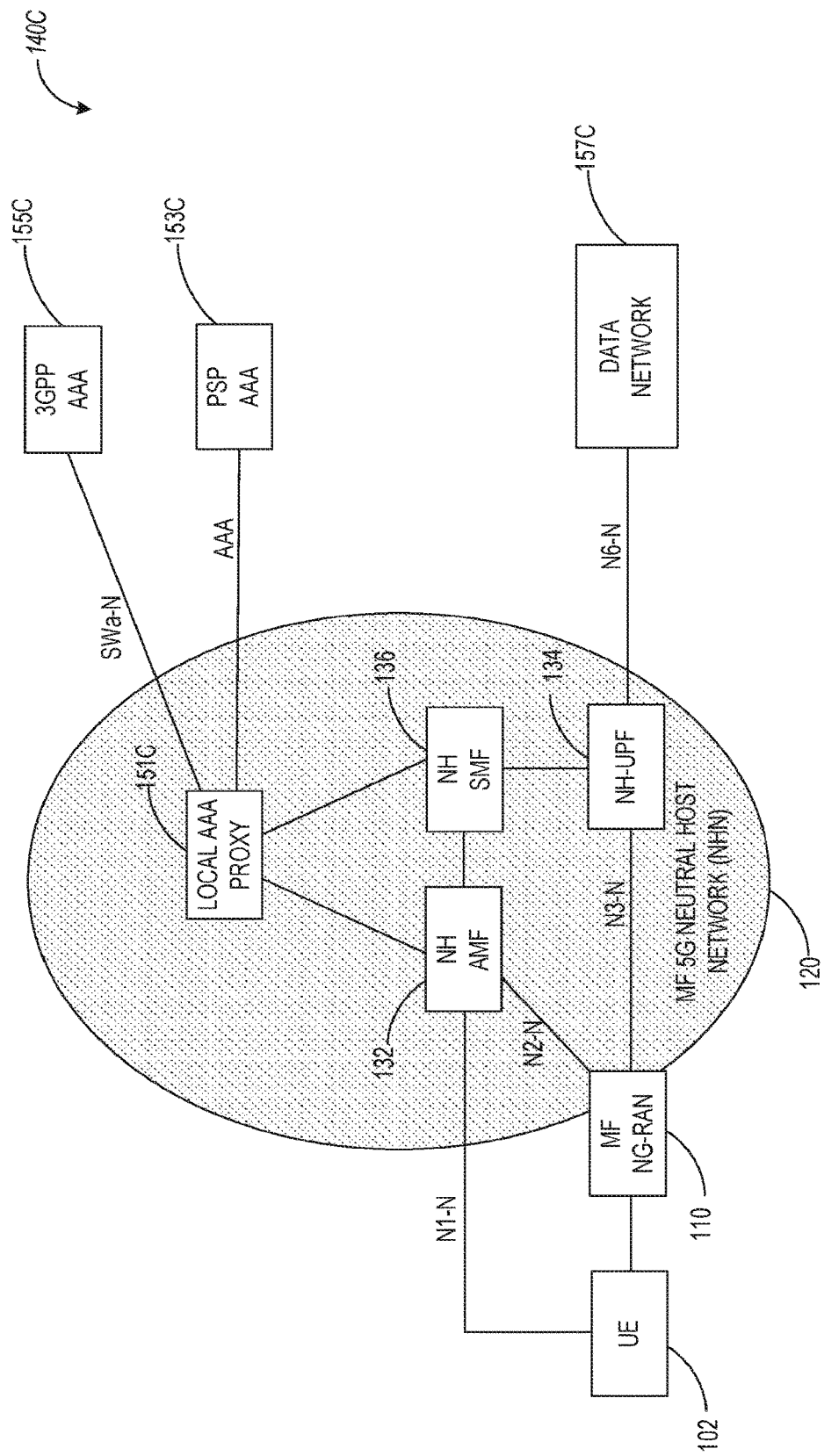
FIG. 1C illustrates an example MulteFire Neutral Host Network (NHN) 5G architecture in accordance with some aspects.

FIG. 1C illustrates an example MulteFire Neutral Host Network (NHN) 5G architecture 140C in accordance with some aspects. Referring to FIG. 1C, the MulteFire 5G architecture 140C can include the UE 102, NG-RAN 110, and core network 120. The NG-RAN 110 can be a MulteFire NG-RAN (MF NG-RAN), and the core network 120 can be a MulteFire 5G neutral host network (NHN).

In some aspects, the MF NHN 120 can include a neutral host AMF (NH AMF) 132, a NH SMF 136, a NH UPF 134, and a local AAA proxy 151C. The AAA proxy 151C can provide connection to a 3GPP AAA server 155C and a participating service provider AAA (PSP AAA) server 153C. The NH-UPF 134 can provide a connection to a data network 157C.

The MF NG-RAN 120 can provide similar functionalities as an NG-RAN operating under a 3GPP specification. The NH-AMF 132 can be configured to provide similar functionality as a AMF in a 3GPP 5G core network (e.g., as described in reference to FIG. 1D). The NH-SMF 136 can be configured to provide similar functionality as a SMF in a 3GPP 5G core network (e.g., as described in reference to FIG. 1D). The NH-UPF 134 can be configured to provide similar functionality as a UPF in a 3GPP 5G core network (e.g., as described in reference to FIG. 1D).

Figure 1D:
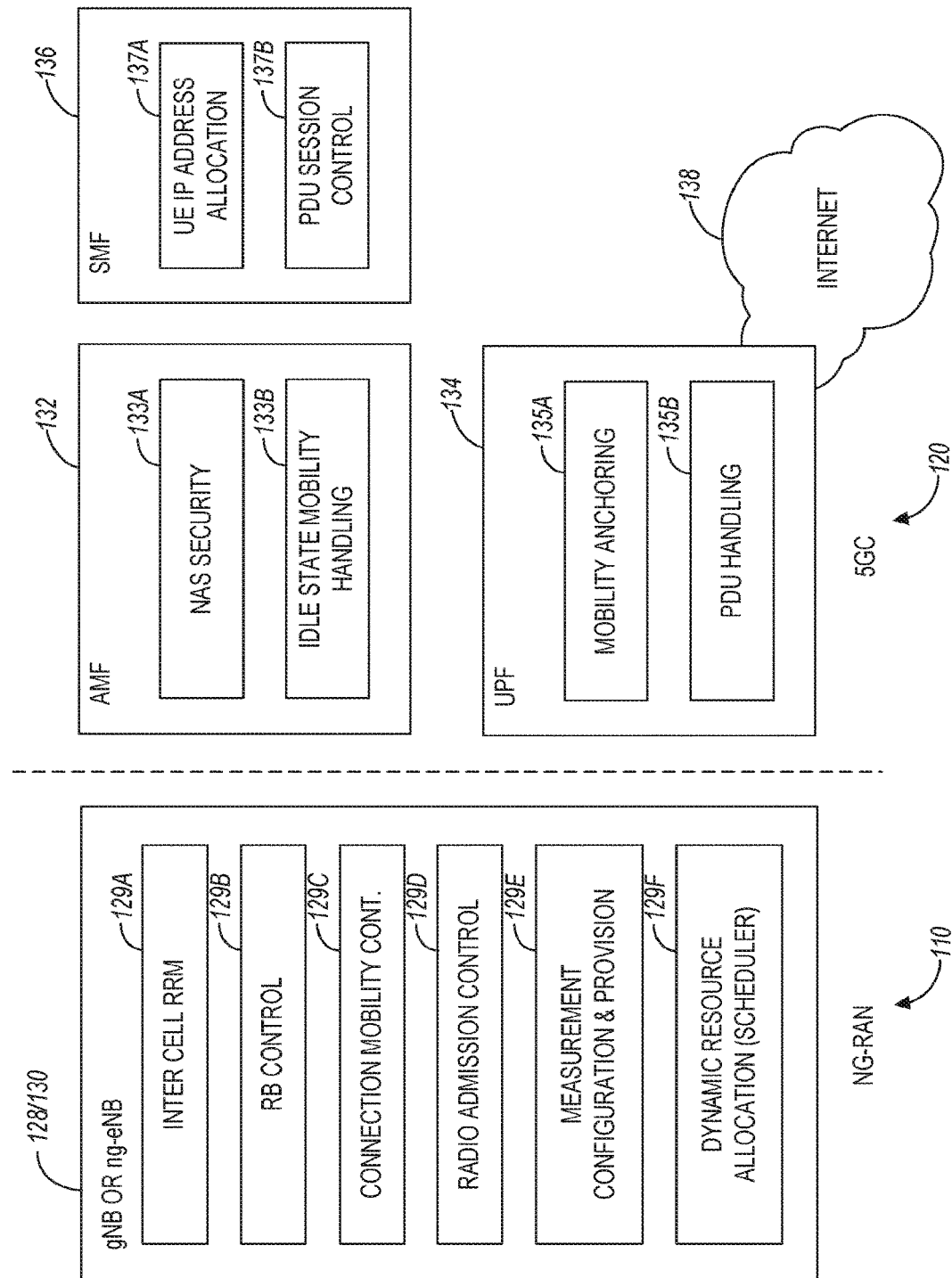
FIG. 1D illustrates a functional split between next generation radio access network (NG-RAN) and the 5G Core network (5GC) in accordance with some aspects.

FIG. 1D illustrates a functional split between NG-RAN and the 5G Core (5GC) in accordance with some aspects. Referring to FIG. 1D, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 1290, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing QoS flow management and mapping to data radio bearers; support of UEs in RRC_INACTIVE state; distribution function for non-access stratum (NAS) messages; radio access network sharing dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding packet inspection and user plane part of policy rule enforcement; traffic usage reporting uplink classifier to support routing traffic flows to a data network; branching point to support multi-horned PDU session; QoS handling for user plane, e.g., packet filtering gating UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1E:
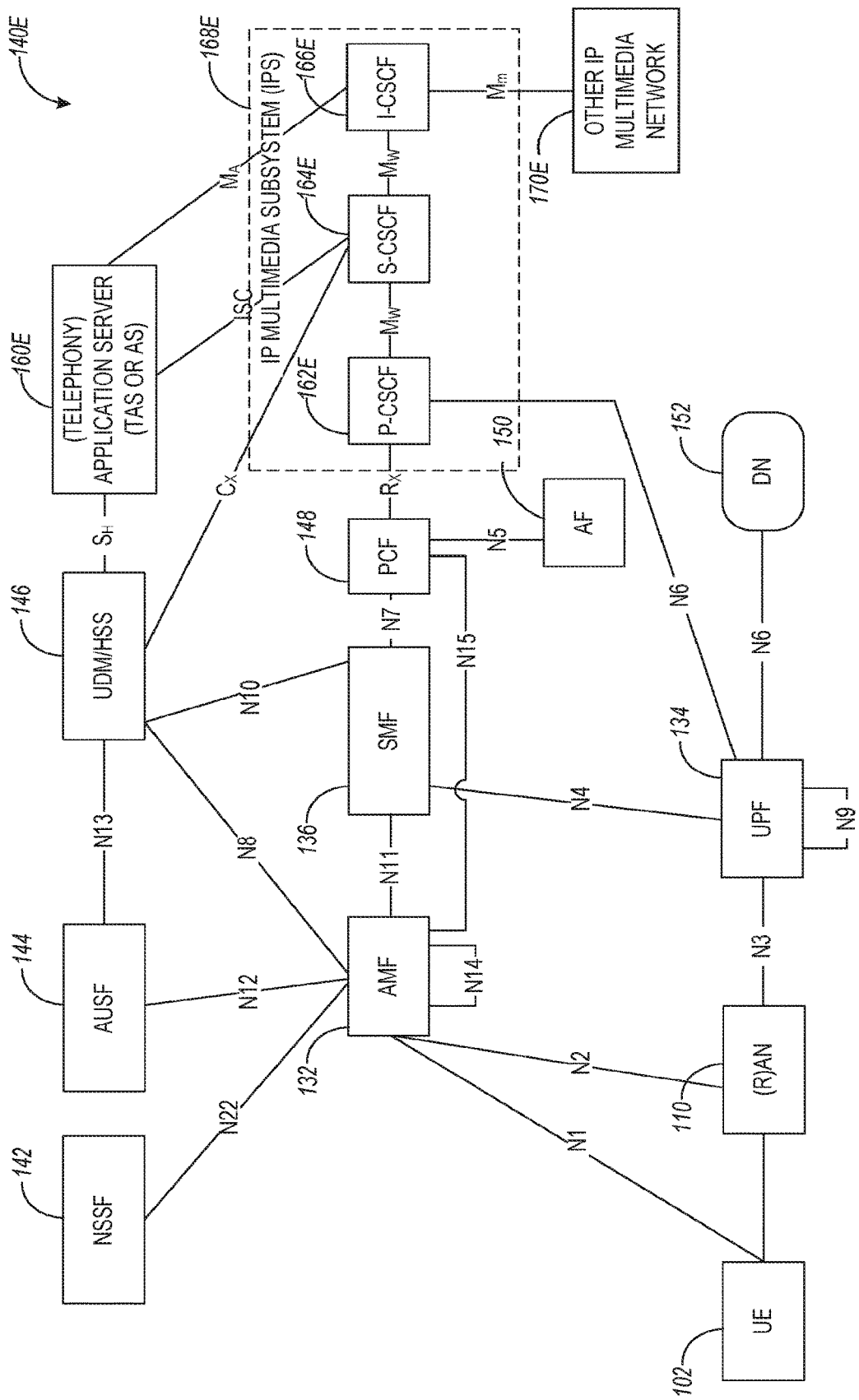
FIG. 1E and FIG. 1F illustrate a non-roaming 5G system architecture in accordance with some aspects.
Figure 1F:
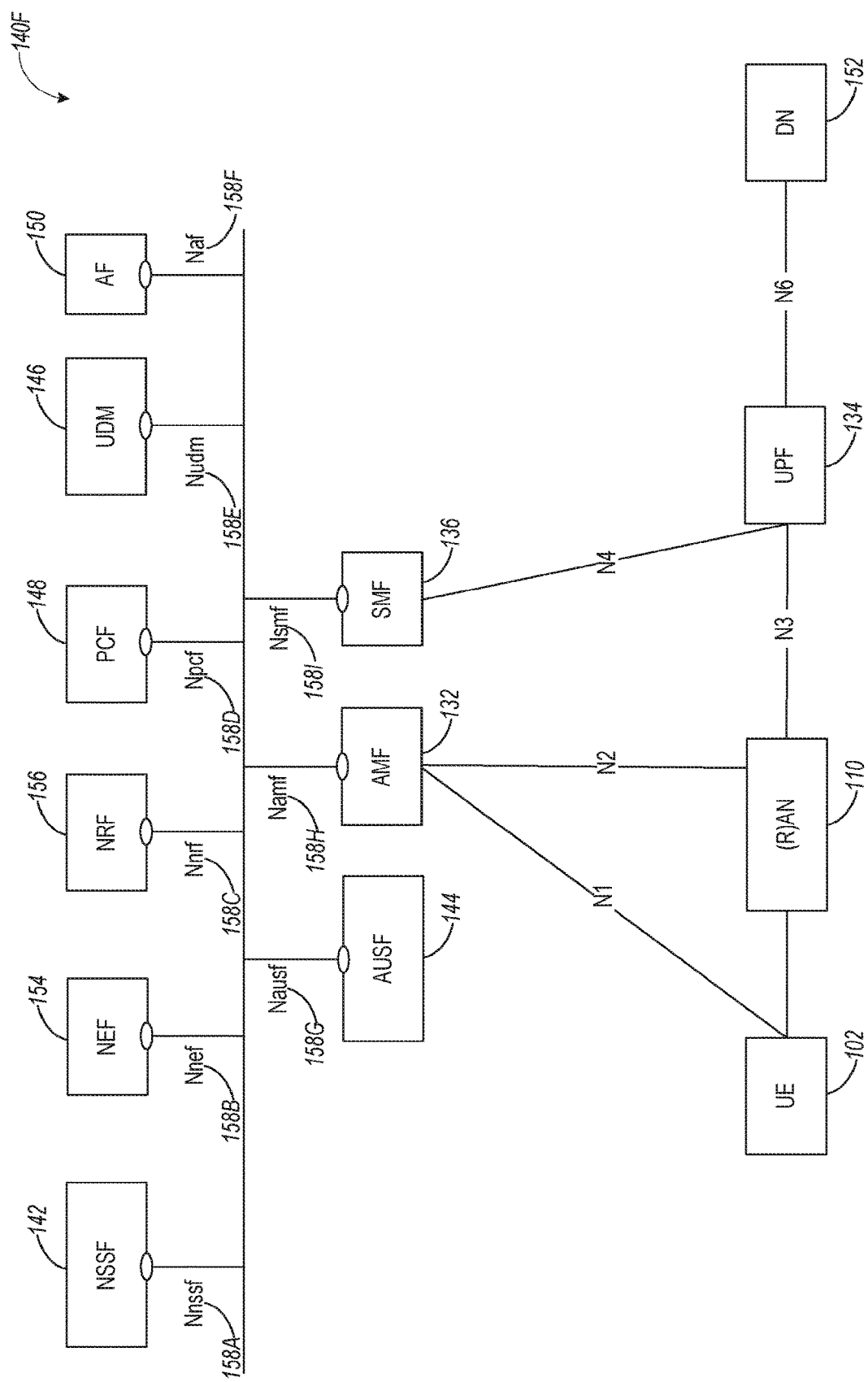

FIG. 1E and FIG. 1F illustrate a non-roaming 5G system architecture in accordance with some aspects. Referring to FIG. 1E, there is illustrated a 5G system architecture 140E in a reference point representation. M ore specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF can be used to manage access control and mobility, and can also include network slice selection functionality. The SMF can be configured to set up and manage various sessions according to a network policy. The UPF can be deployed in one or more configurations according to a desired service type. The PCF can be configured to provide a policy framework using network slicing mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem S) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), and/or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operator's network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E and/or the I-CSCF 166E.

In some aspects, the 5G system architecture 140E can use a unified access barring mechanism using one or more of the techniques described herein, which access barring mechanism can be applicable for all RRC states of the UE 102, such as RRC_IDLE, RRC_CONNECTED, and RRC_I-NACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator specific ways.

Referring to FIG. 1F, there is illustrated a 5G system architecture 140F and a service-based representation. System architecture 140F can be substantially similar to (or the same as) system architecture 140E. In addition to the network entities illustrated in FIG. 1E, system architecture 140F can also include a network exposure function (NEF) 154 and a network repository function (NRF) 156.

In some aspects, 5G system architectures can be service-based and interaction between network functions can be represented by corresponding point-to-point reference points Ni (as illustrated in FIG. 1E) or as service-based interfaces (as illustrated in FIG. 1F).

A reference point representation shows that an interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the AMF 132), N9 (between two UPFs 134), N10 (between the UDM 146 and the SMF 136), N11 (between the AMF 132 and the SMF 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1E), and N22 (between AMF 132 and NSSF 142). Other reference point representations not shown in FIG. 1E can also be used.

In some aspects, as illustrated in FIG. 1F, service-based representations can be used to represent network functions within the control plane that enable other authorized network functions to access their services. In this regard, 5G system architecture 140F can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 1G:
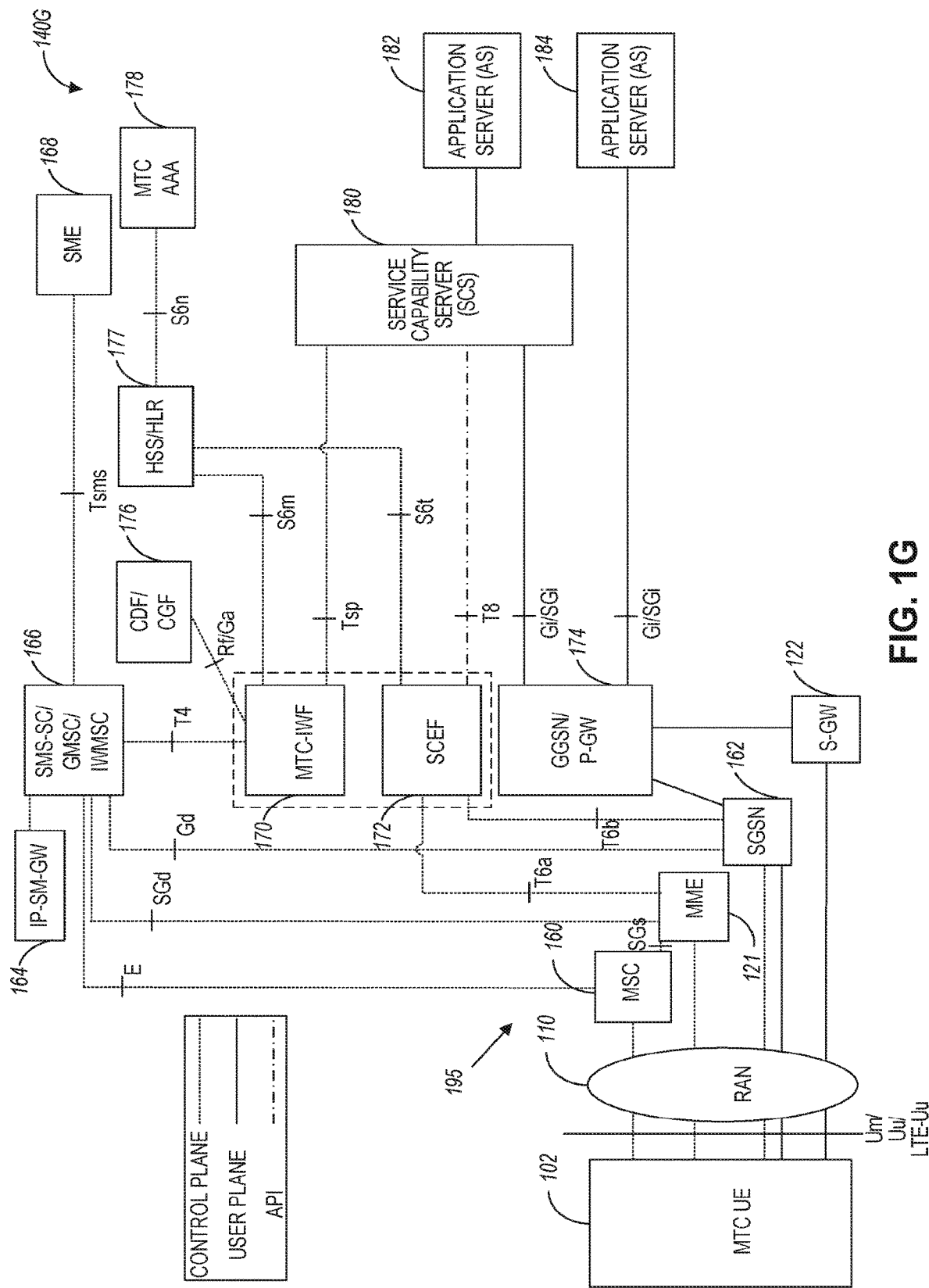
FIG. 1G illustrates an example Cellular Internet-of-Things (CIoT) network architecture in accordance with some aspects.

FIG. 1G illustrates an example CIoT network architecture in accordance with some aspects. Referring to FIG. 1G, the CIoT architecture 140G can include the UE 102 and the RAN 110 coupled to a plurality of core network entities. In some aspects, the UE 102 can be machine-type communication (MTC) UE. The CIoT network architecture 140G can further include a mobile services switching center (MSC) 160, MME 121, a serving GPRS support note (SGSN) 162, a S-GW 122, an IP-Short-Message-Gateway (IP-SM-GW)

164, a Short Message Service Service Center (SMS-SC)/ gateway mobile service center (GMSC)/Interworking MSC (IWMSC) 166, MTC interworking function (MTC-IWF) 170, a Service Capability Exposure Function (SCEF) 172, a gateway GPRS support node (GGSN)/Packet-GW (P-GW) 174, a charging data function (CDF)/charging gateway function (CGF) 176, a home subscriber server (HSS)/a home location register (HLR) 177, short message entities (SME) 168, MTC authorization, authentication, and accounting (MTC AAA) server 178, a service capability server (SCS) 180, and application servers (AS) 182 and 184.

In some aspects, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (e.g., API interfaces to the SCS 180).

FIG. 1G further illustrates various reference points between different servers, functions, or communication nodes of the CIoT network architecture 140G. Some example reference points related to MTC-IWF 170 and SCEF 172 include the following Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6m (a reference point used by MTC-IWF 170 to interrogate HSS/HLR 177), S6n (a reference point used by MTC-AAA server 178 to interrogate HSS/HLR 177), and S6t (a reference point used between SCEF 172 and HSS/HLR 177).

In some aspects, the CIoT UE 102 can be configured to communicate with one or more entities within the CIoT architecture 140G via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture.

In some aspects, the NAS protocol can support a set of NAS messages for communication between the CIoT UE 102 and an Evolved Packet System (EPS) Mobile Management Entity (MME) 121 and SGSN 162.

In some aspects, the CIoT network architecture 140F can include a packet data network, an operator network, or a cloud service network, having for example, among other things, a Service Capability Server (SCS) 180, an Application Server (AS) 182, or one or more other external servers or network components.

The RAN 110 can be coupled to the HSS/HLR servers 177 and the AAA servers 178 using one or more reference points including for example, an air interface based on an S6a reference point, and configured to authenticate/authorize CIoT UE 102 to access the CIoT network. The RAN 110 can be coupled to the CIoT network architecture 140G using one or more other reference points including for example, an air interface corresponding to an SGi/Gi interface for 3GPP accesses. The RAN 110 can be coupled to the SCEF 172 using for example, an air interface based on a T6a/T6b reference point, for service capability exposure. In some aspects, the SCEF 172 may act as an API GW towards a third-party application server such as AS 182. The SCEF 172 can be coupled to the HSS/HLR 177 and MTC AAA 178 servers using an S6t reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as CIoT devices, or having functions of a CIoT device. For example, the CIoT UE 102 can include a smart phone, a tablet computer, or one or more other electronic device acting as a CIoT device for a specific function, while having other additional functionality.

In some aspects, the RAN 110 can include a CIoT enhanced Node B (CIoT eNB) 111 communicatively coupled to the CIoT Access Network Gateway (CIoT GW) 195. In certain examples, the RAN 110 can include multiple base stations (e.g., CIoT eNBs) connected to the CIoT GW 195, which can include MSC 160, MME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. In some aspects, circuitry as well as modules disclosed herein may be implemented in combinations of hardware, software and/or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

FIG. 1H illustrates an example Service Capability Exposure Function (SCEF) in accordance with some aspects. Referring to FIG. 1H, the SCEF 172 can be configured to expose services and capabilities provided by 3GPP network interfaces to external third party service provider servers hosting various applications. In some aspects, a 3GPP network such as the CIoT architecture 140G, can expose the following services and capabilities: a home subscriber server (HSS) 116H, a policy and charging rules function (PCRF) 118H, a packet flow description function (PFDF) 120H, a MME/SGSN 122H, a broadcast multicast service center (BM-SC) 124H, a serving call server control function (S-CSCF) 126H, a RAN congestion awareness function (RCAF) 128H, and one or more other network entities 130H. The above-mentioned services and capabilities of a 3GPP network can communicate with the SCEF 172 via one or more interfaces as illustrated in FIG. 1H.

The SCEF 172 can be configured to expose the 3GPP network services and capabilities to one or more applications running on one or more service capability server (SCS)/application server (AS), such as SCS/AS 102H, 104H, . . . , 106H. Each of the SCS/AG 102H-106H can communicate with the SCEF 172 via application programming interfaces (APIs) 108H, 110H, 112H, . . . , 114H, as seen in FIG. 1H.

Figure 1I:
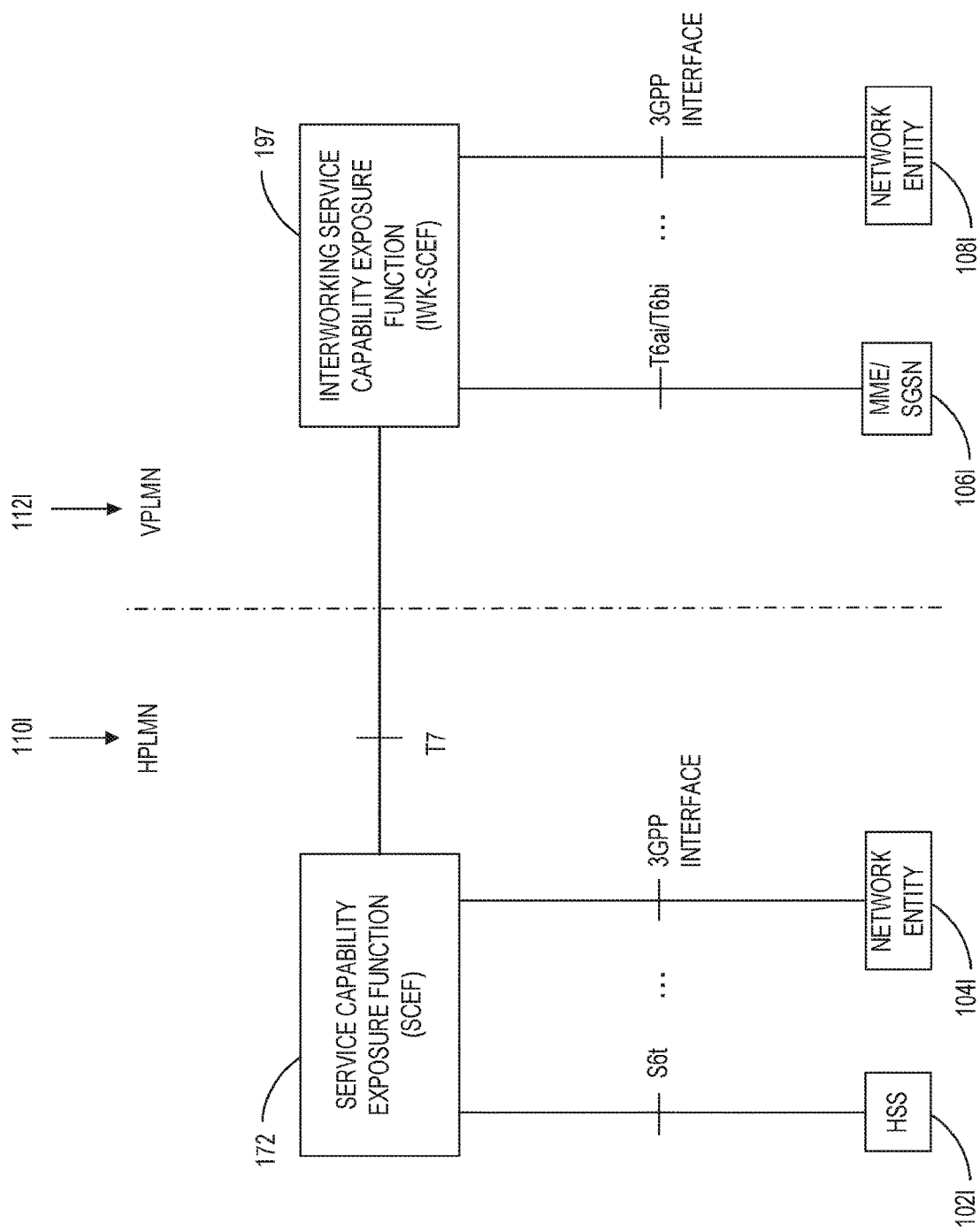
FIG. 1I illustrates an example roaming architecture for SCEF in accordance with some aspects.

FIG. 1I illustrates an example roaming architecture for SCEF in accordance with some aspects. Referring to FIG. 1I, the SCEF 172 can be located in HPLMN 110I and can be configured to expose 3GPP network services and capabilities, such as 102I, . . . , 104I. In some aspects, 3GPP network services and capabilities, such as 106I, . . . , 108I, can be located within VPLMN 112I. In this case, the 3GPP network services and cap abilities within the VPLMN 112I can be exposed to the SCEF 172 via an interworking SCEF (IWK-SCEF) 197 within the VPLMN 112I.

Figure 2:
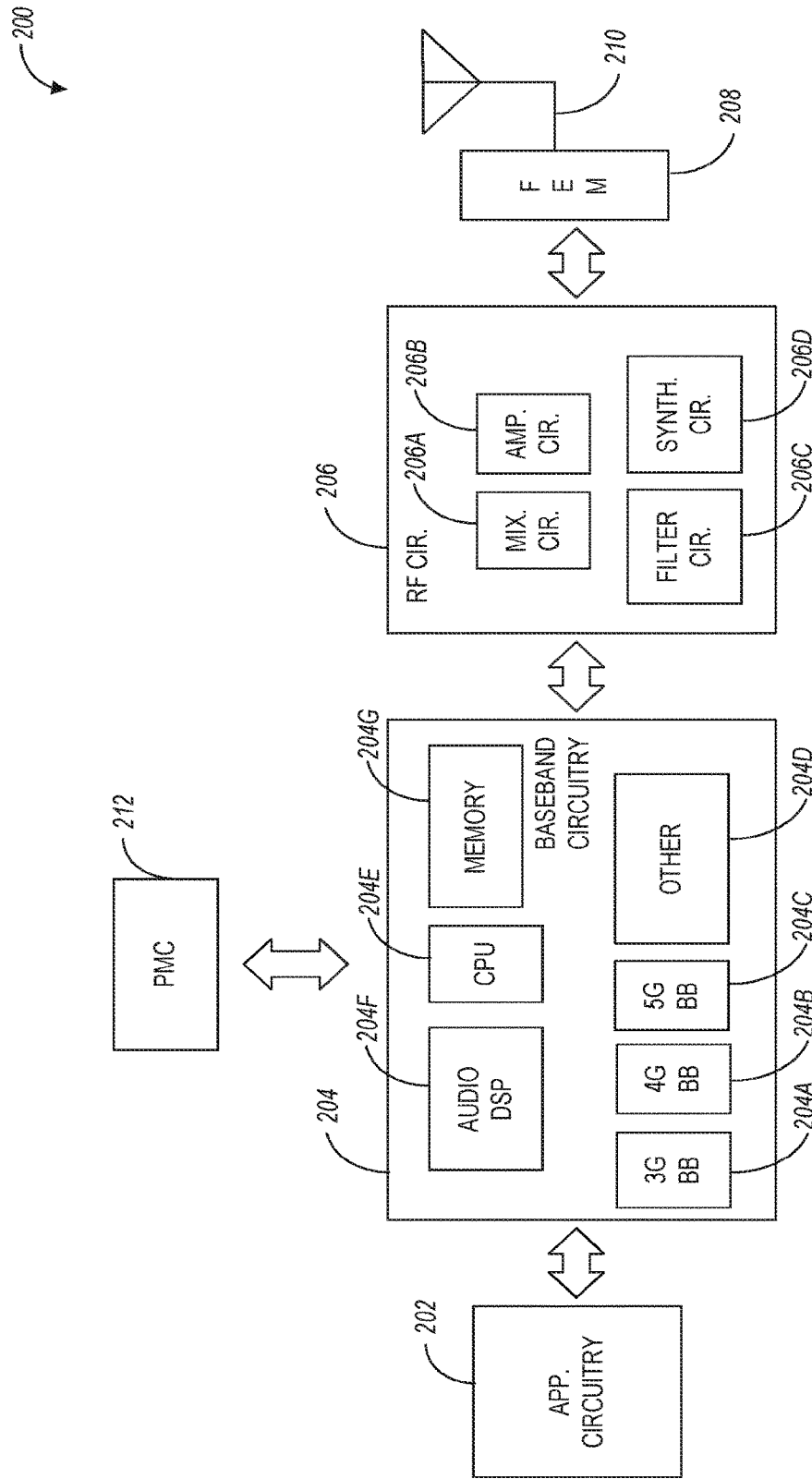
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (e.g., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting etc. In some aspects, modulation/demodulation circuitry of the baseband circuitry 204 may include Fast-Fourier Transform (FFT), precoding, or constellation mapping/de-mapping functionality. In some aspects, encoding/decoding circuitry of the baseband circuitry 204 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may be include elements for compression/decompression and echo cancellation and may include other suitable processing elements in other aspects. Components of the baseband circuitry 204 may be suitably combined in a single chip, a single chip set, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEAT circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206A. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D. The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature down conversion and up conversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct down conversion and direct up conversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. In these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer 206A of the RF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. Divider control input may be provided, for example, by either the baseband circuitry 204 or the applications circuitry 202 depending on the desired output frequency. In some aspects, a divider control input (e.g., N) may be determined from a look-up table based on a channel indicated by the applications circuitry 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-typeflip-flop. In these aspects, the delay elements may be configured to break a VCO period up into Nd equal packets of phase, where Nd is the number of delay elements in the delay line.

In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing. FEM circuitry 208 may also include a transmit signal path which may include circuitry configured to amplify signals for transmission provided by the RE circuitry 206 for transmission by one or more of the one or more antennas 210. In various aspects, the amplification through the transmit signal paths or the receive signal paths may be done in part or solely in the RF circuitry 206, in part or solely in the FEM circuitry 208, or in both the RF circuitry 206 and the FEM circuitry 208.

In some aspects, the FEM circuitry 208 may include a TX/RX switch to switch between transmit mode and receive mode operation. The FEM circuitry 208 may include a receive signal path and a transmit signal path. The receive signal path of the FEM circuitry 208 may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. The PMC 212 may control power-source selection, voltage scaling battery charging, and/or DC-to-DC conversion. The PM C 212 may, in some aspects, be included when the device 200 is capable of being powered by a battery, for example, when the device is included in a UE. The PMC 212 may increase the power conversion efficiency while providing beneficial implementation size and heat dissipation characteristics.

FIG. 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 may control, or otherwise be part of, various power saving mechanisms of the device 200. For example, if the device 200 is in an RRC_Connected state, in which it is still connected to the RAN node as it expects to receive traffic shortly, then it may enter a state known as Discontinuous Reception M ode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
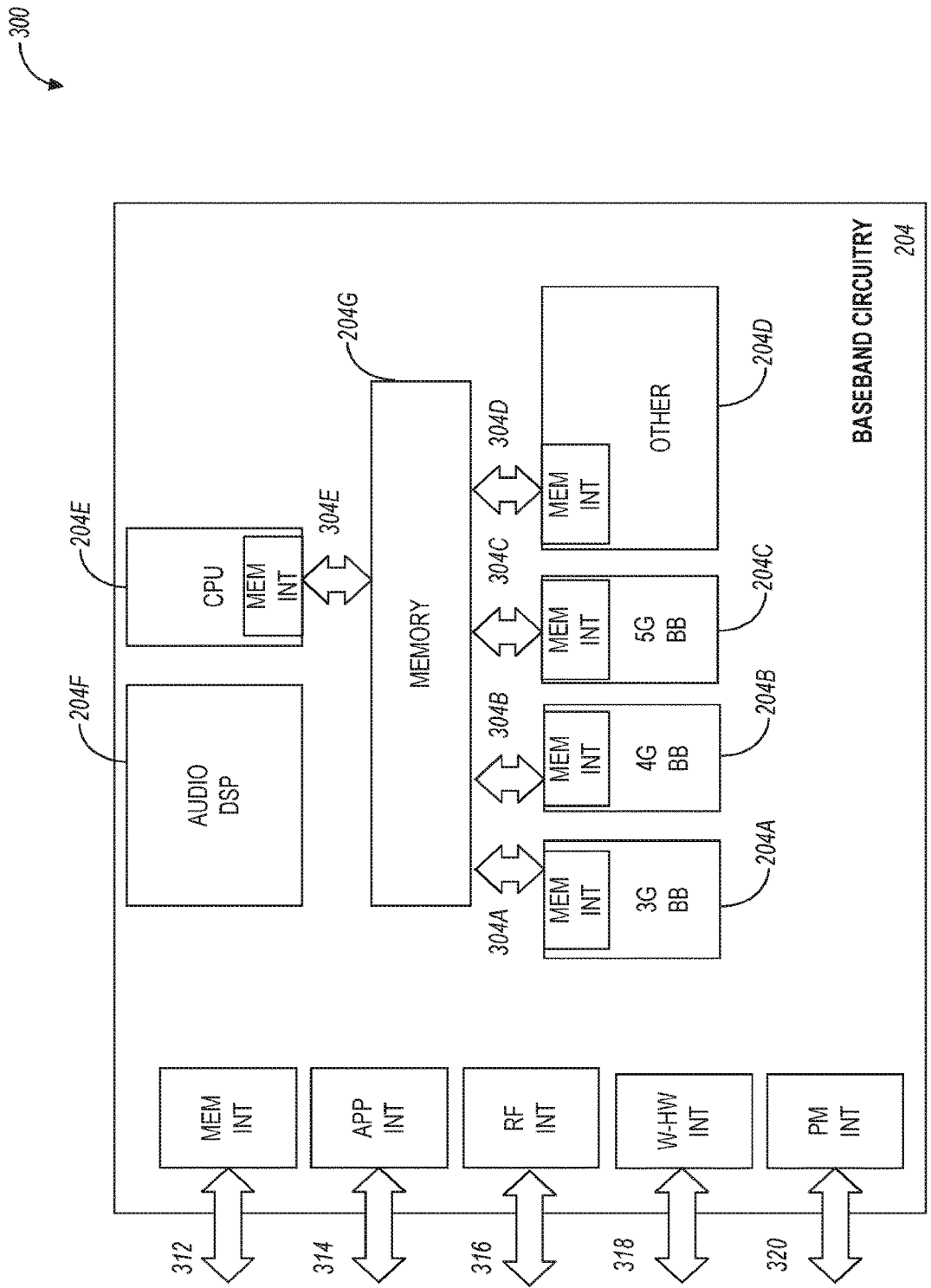
FIG. 3 illustrates example interfaces of baseband circuitry in accordance with some aspects.

FIG. 3 illustrates example interfaces of baseband circuitry 204, in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g, an interface to send/receive data to/from RF circuitry 206 of FIG. 2), a wireless hardware connectivity interface 318 (e.g., an interface to send/receive data to/from Near Field Communication (NFC) components, Bluetooth® components (e.g, Bluetooth® Low Energy), Wi-Fi® components, and other communication components), and a power management interface 320 (e.g., an interface to send/receive power or control signals to/from the PMC 212).

Figure 4:
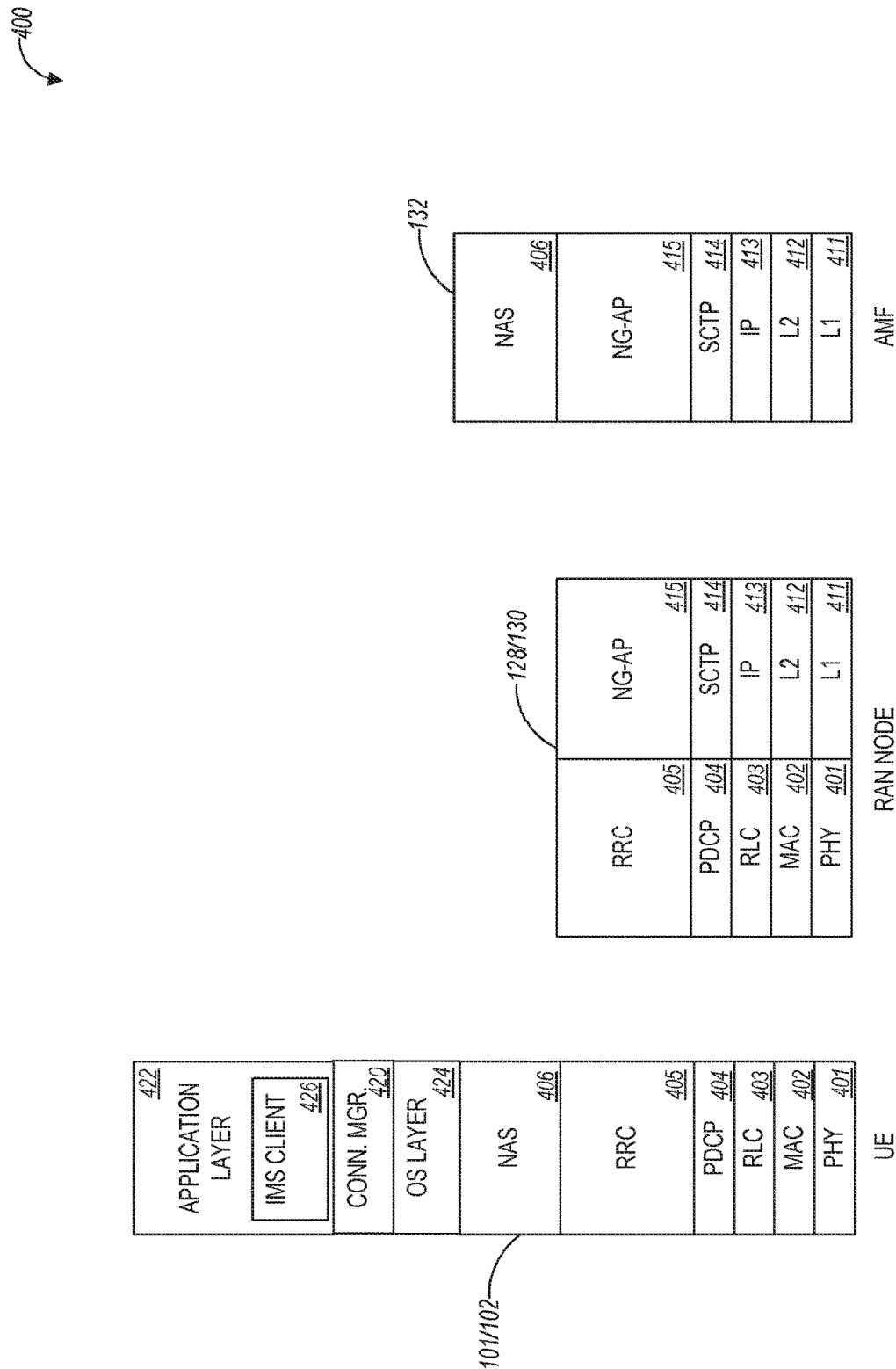
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the UE 102, the RAN node 128 (or alternatively, the RAN node 130), and the AMF 132.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC) coding/decoding of the transport channels, modulation/demodulation of physical channels, interleaving rate matching mapping onto p by sisal channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting error correction through hybrid automatic repeat request (HARQ), and logical channel prioritization.

The RLC layer 403 may in some aspects operate in a plurality of modes of operation, including: Transparent Mode (TM), Unacknowledged Mode (UM), and Acknowledged Mode (AM). The RLC layer 403 may execute transfer of up per layer protocol data units (PDUs), error correction through automatic repeat request (ARQ) for AM data transfers, and segmentation and reassembly of RLC SDUs for UM and AM data transfers. The RLC layer 403 may also maintain sequence numbers independent of the ones in PDCP for UM and AM data transfers. The RLC layer 403 may also in some aspects execute re-segmentation of RLC data PDUs for AM data transfers, detect duplicate data for AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, perform reordering and eliminate duplicates of lower layer SDUs, execute PDCP PDU routing for the case of split bearers, execute retransmission of lower layer SDUs, cipher and decipher control plane and user plane data, perform integrity protection and integrity verification of control plane and user plane data, control timer-based discard of data, and perform security operations (e.g., ciphering deciphering, integrity protection, integrity verification, etc.).

In some aspects, primary services and functions of the RRC layer 405 may include broadcast of system information (e.g., included in Master Information Blocks (MIBs) or System Information Blocks (SIB s) related to the non-access stratum (NAS)); broadcast of system information related to the access stratum (AS); paging initiated by 5GC 120 or NG-RAN 110, establishment, maintenance, and release of an RRC connection between the UE and NG-RAN (e.g., RRC connection paging RRC connection establishment, RRC connection addition, RRC connection modification, and RRC connection release, also for carrier aggregation and Dual Connectivity in NR or between E-UTRA and NR); establishment, configuration, maintenance, and release of Signalling Radio Bearers (SRBs) and Data Radio Bearers (DRBs); security functions including key management, mobility functions including handover and context transfer, UE cell selection and reselection and control of cell selection and reselection, and inter-radio access technology (RAT) mobility; and measurement configuration for UE measurement reporting Said MIBs and SIBs may comprise one or more information elements (IEs), which may each comprise individual data fields or data structures. The RRC layer 405 may also, in some aspects, execute QoS management functions, detection of and recovery from radio link failure, and NAS message transfer between the NAS 406 in the UE and the NAS 406 in the AMF 132.

In some aspects, the following NAS messages can be communicated during the corresponding NAS procedure, as illustrated in Table 1 below:

TABLE 1

| 5G NAS Message | 5G NAS Procedure | 4G NAS Message name | 4G NAS Procedure |
|---|---|---|---|
| Registration Request | Initial registration procedure | Attach Request | Attach procedure |
| Registration Request | Mobility registration update procedure | Tracking Area Update (TAU) Request | Tracking area up dating procedure |
| Registration Request | Periodic registration update procedure | TAU Request | Periodic tracking area updating procedure |
| Deregistration Request | Deregistration procedure | Detach Request | Detach procedure |
| Service Request | Service request procedure | Service Request or Extended Service Request | Service request procedure |
| PDU Session Establishment Request | PDU session establishment procedure | PDN Connectivity Request | PDN connectivity procedure |

In some aspects, when the same message is used for more than one procedure, then a parameter can be used (e.g., registration type or TAU type) which indicates the specific purpose of the procedure, e.g registration type="initial registration", "mobility registration update" or "periodic registration update".

The UE 101 and the RAN node 128/130 may utilize an NG radio interface (e.g., an LTE-Uu interface or an NR radio interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the AMF 132 as illustrated in FIG. 4. In aspects, the NAS protocols 406 support the mobility of the UE 101 and the session management procedures to establish and maintain IP connectivity between the UE 101 and the UPF 134. In some aspects, the UE protocol stack can include one or more upper layers, above the NAS layer 406. For example, the upper layers can include an operating system layer 424, a connection manager 420, and application layer 422. In some aspects, the application layer 422 can include one or more clients which can be used to perform various application functionalities, including providing an interface for and communicating with one or more outside networks. In some aspects, the application layer 422 can include an IP multimedia subsystem (IMS) client 426.

The NG Application Protocol (NG-AP) layer 415 may support the functions of the N2 and N3 interface and comprise Elementary Procedures (EPs). An EP is a unit of interaction between the RAN node 128/130 and the 5GC 120. In certain aspects, the NG-AP layer 415 services may comprise two groups: UE-associated services and non UE-associated services. These services perform functions including but not limited to: UE context management, PDU session management and management of corresponding NG-RAN resources (e.g. Data Radio Bearers [DRBs]), UE capability indication, mobility, NAS signaling transport, and configuration transfer (e.g. for the transfer of SON information).

The Stream Control Transmission Protocol (SCTP) layer (which may alternatively be referred to as the SCTP/IP layer) 414 may ensure reliable delivery of signaling messages between the RAN node 128/130 and the AMF 132 based, in part, on the IP protocol, supported by the IP layer 413. The L2 layer 412 and the L1 layer 411 may refer to communication links (e.g., wired or wireless) used by the RAN node 128/130 and the AMF 132 to exchange information.

The RAN node 128/130 and the AMF 132 may utilize an N2 interface to exchange control plane data via a protocol stack comprising the L1 layer 411, the L2 Layer 412, the IP layer 413, the SCTP layer 414, and the S1-AP layer 415.

Figure 5:
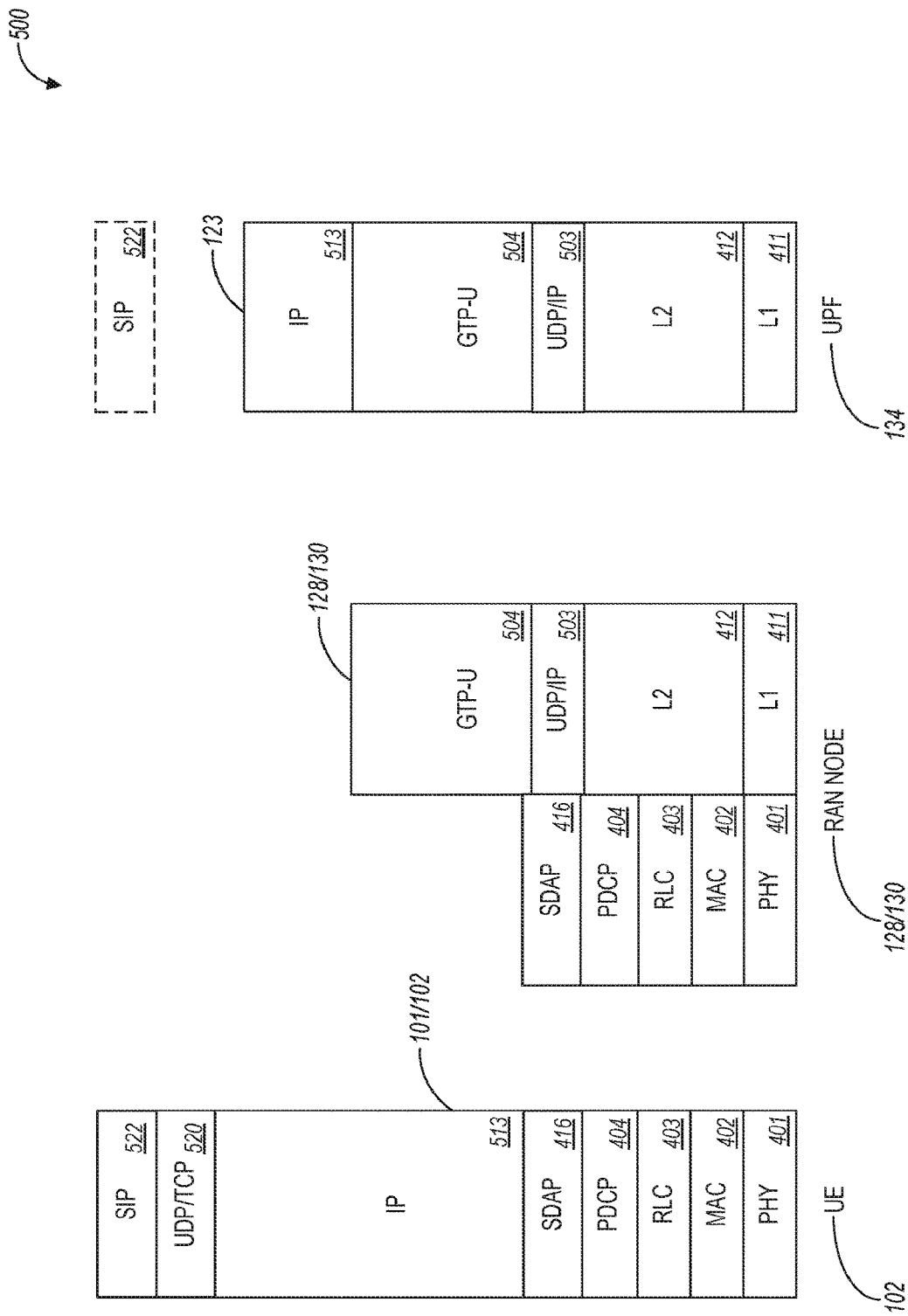
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 102, the RAN node 128 (or alternatively, the RAN node 130), and the UPF 134. The user plane 500 may utilize at least some of the same protocol layers as the control plane 400. For example, the UE 102 and the RAN node 128 may utilize an NR radio interface to exchange user plane data via a protocol stack comprising the PHY layer 401, the MAC layer 402, the RLC layer 403, the PDCP layer 404, and the Service Data Adaptation Protocol (SDAP) layer 416. The SDAP layer 416 may, in some aspects, execute a mapping between a Quality of Service (QoS) flow and a data radio bearer (DRB) and a marking of both DL and UL packets with a QoS flow ID (QFI). In some aspects, an IP protocol stack 513 can be located above the SDAP 416. A user datagram protocol (UDP)/transmission control protocol (TCP) stack 520 can be located above the IP stack 513. A session initiation protocol (SIP) stack 522 can be located above the UDP/TCP stack 520, and can be used by the UE 102 and the UPF 134.

The General Packet Radio Service (CPRS) Tunneling Protocol for the user plane (GTP-U) layer 504 may be used for carrying user data within the 5G core network 120 and between the radio access network 110 and the 5G core network 120. The user data transported can be packets in IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 128/130 and the UPF 134 may utilize an N3 interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the UPF 134.

Figure 6:
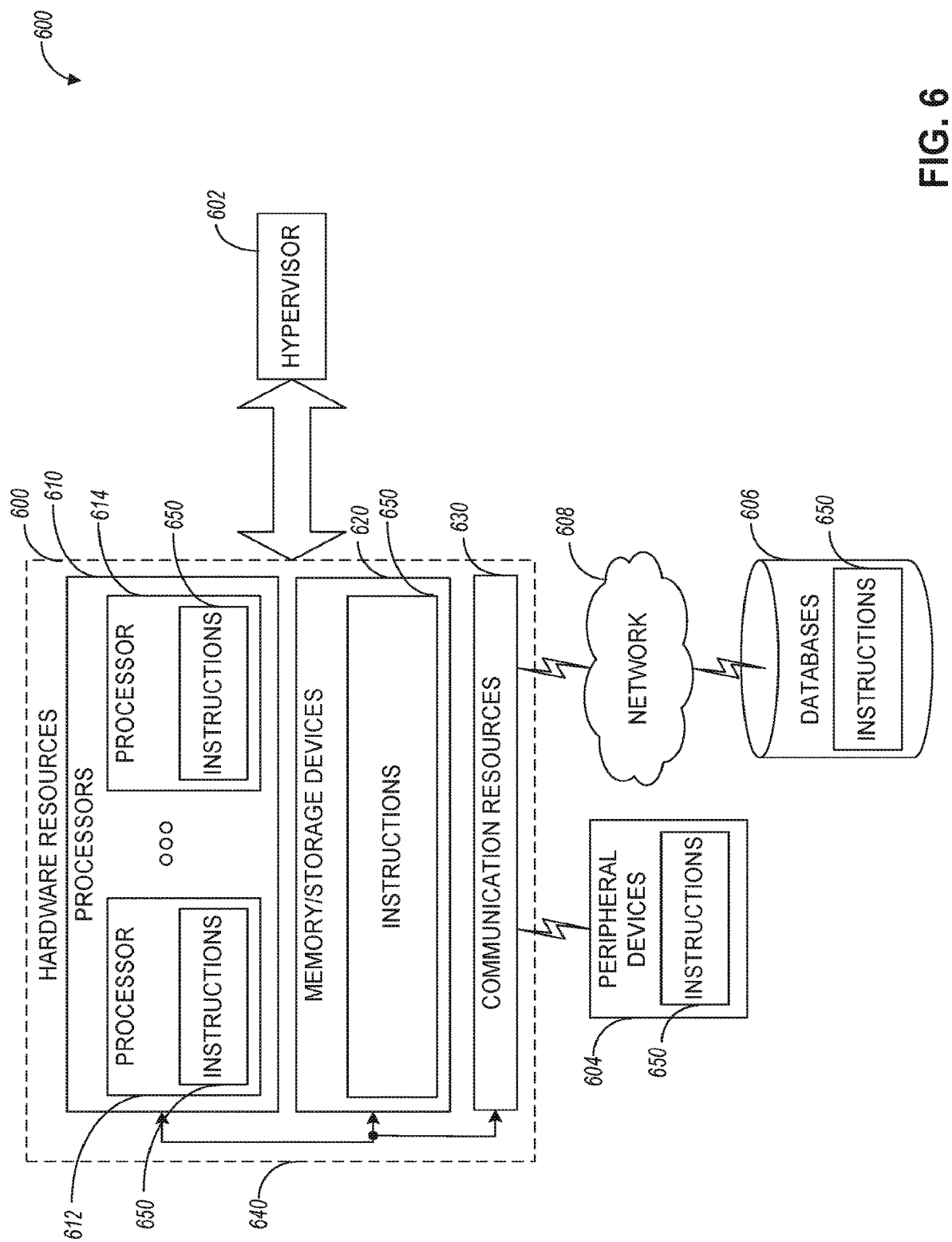
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g, a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g., NFV) is utilized, a hypervisor 602 may be executed to provide an execution environment for one or more network slices and/or sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory; storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an app let, an app, or other executable code for causing at least any, of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
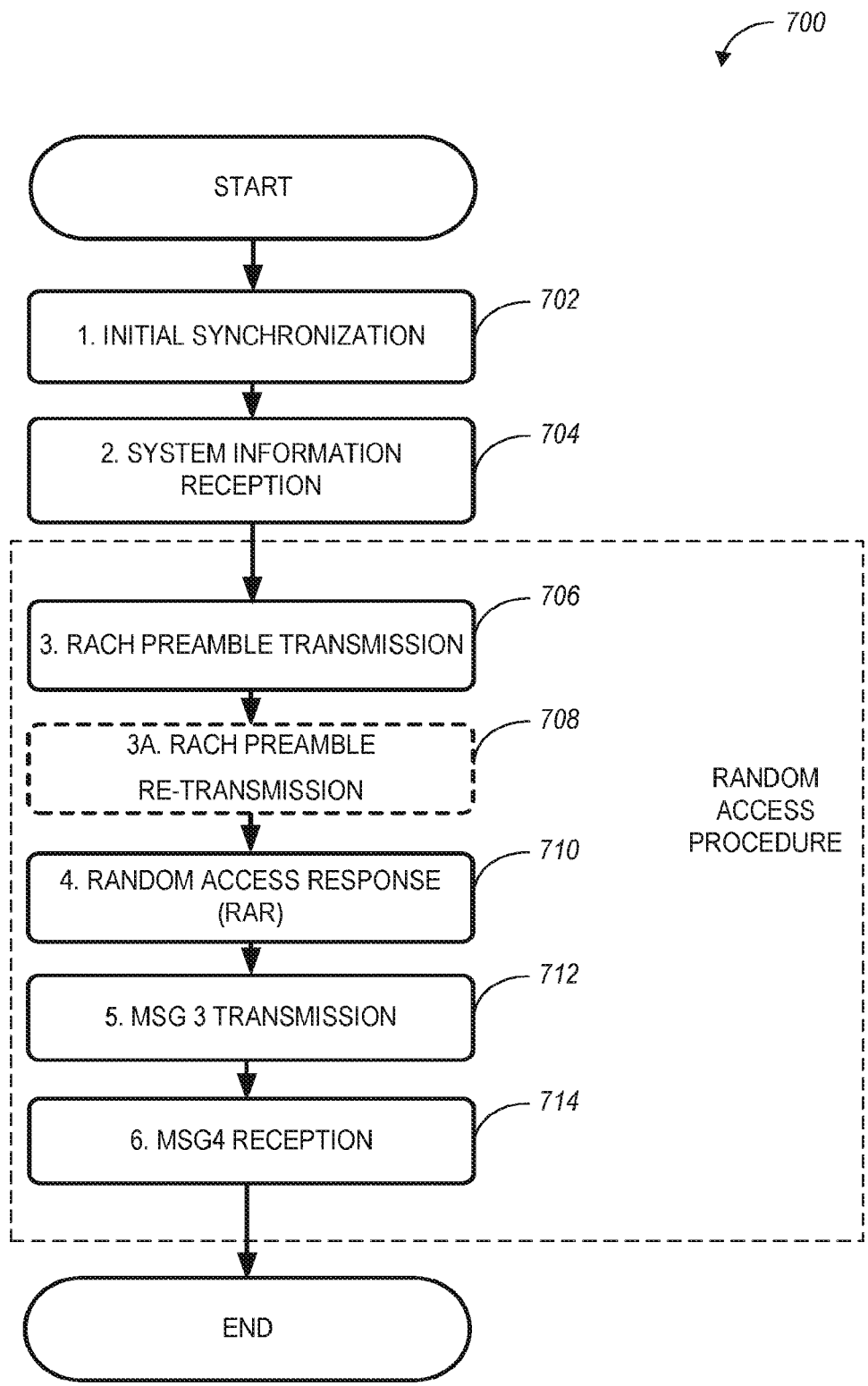
FIG. 7 is an illustration of an initial access procedure including PRACH preamble retransmission in accordance with some aspects.

FIG. 7 is an illustration of an initial access procedure 700 including PRACH preamble retransmission in accordance with some aspects. Referring to FIG. 7, the initial access procedure 700 can start with operation 702, when initial synchronization can take place. For example, the UE 101 can receive a primary synchronization signal and a secondary synchronization signal to achieve the initial synchronization. In some aspects, the initial synchronization at operation 702 can be performed using one or more SS blocks received within an SS burst set. At operation 704, the UE 101 can receive system information, such as one or more system information blocks (SIBs) and/or master information blocks (MIBs).

At operation 706 through 714, a random access procedure can take place. More specifically, at operation 706, a PRACH preamble transmission can take place as message 1 (Msg1). At operation 710, UE 101 can receive a random access response (RAR) message, which can be random access procedure message 2 (Msg2). In Msg2, the node (e.g., gNB) 111 can respond with random access radio network temporary identifier (RA-RNTI), which can be calculated from the preamble resource (e.g, time and frequency allocation).

In some aspects, UE 101 can be configured to perform one or more retransmissions of the PRACH preamble at operation 708, when the RAR is not received or detected within a preconfigured or predefined time window. The PRACH preamble retransmission can take place with power ramping, as explained herein below, so that the transmission power is increased until the random-access response is received.

At operation 712, UE 101 can transmit a random access procedure message 3 (Msg3), which can include a radio resource control (RRC) connection request message. At operation 714, a random access procedure message 4 (Msg4) can be received by the UE 101, which can include an RRC connection setup message, carrying the cell radio network temporary identifier (CRNTI) used for subsequent communication between the UE 101 and the node 111.

In some aspects, the UE 101 can be configured to perform uplink (UL) beam switching during retransmissions of configuration data such as the PRACH preamble. In some aspects, in cases when the UE has multiple analog beams and beam correspondence between transmission and reception is not available, then the UE may need to either change the transmission beam for the retransmission of PRACH or increase the transmission power of the PRACH retransmission. In aspects when the UE changes the Tx beam, then its power ramping counter can remain unchanged (i.e., the UE uses the same or similar power for the PRACH transmission in comparison with the previous PRACH transmission). In aspects when the UE does not change the Tx beam, then its power ramping counter can increase (e.g, incremented by one), and the UE can be configured to increase power for the PRACH retransmission.

In aspects when the UE is configured for multi-beam operation, synchronization signals (SSs) from multiple antennas in base station can be received, where the base station can be configured to generate the SSs using to beam sweeping In aspects when the UE detects a synchronization signal from a certain beam, then there can be one PRACH resource associated with the beam of the detected synchronization signal. In this regard, the UE can be configured to use the PRACH resource for the transmission of the PRACH preamble. Depending on the beam of the detected synchronization signal, the UE may use different PRACH resources for different PRACH sequences.

Figure 8:
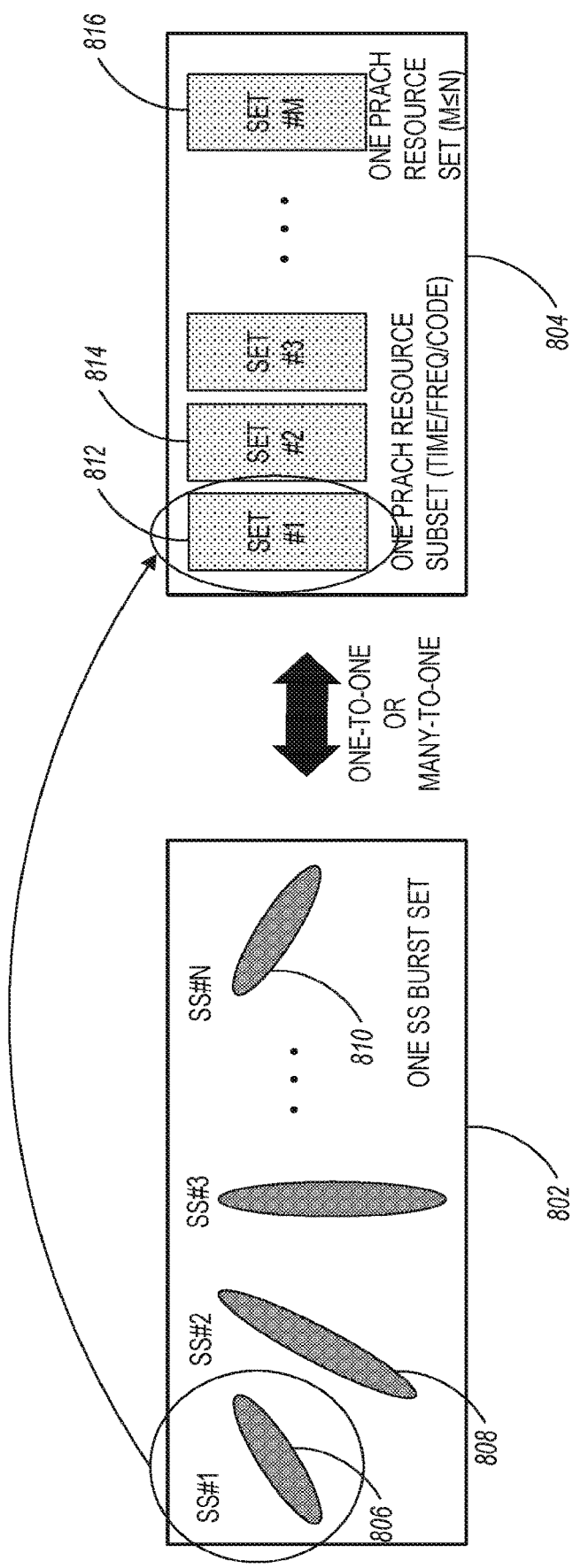
FIG. 8 is an illustration of PRACH resource configuration in accordance with some aspects.

FIG. 8 is an illustration of PRACH resource configuration in accordance with some aspects. In some aspects, the base station (e.g. gNB or node 111) can communicate a synchronization signal burst set 802, which can include multiple synchronization signals (or SS blocks) such as 806, 808, . . . , 810. The base station can use multiple synchronization signal blocks (SS blocks) for each downlink transmission beam. In some aspects, for each downlink transmission beam, there can be one PRACH resource subset configured by system information. For example, the UE 101 can be configured with a PRACH resource set 804, which can include PRACH resource subsets 812, 814, . . . , 816. Each of the PRACH resource subsets can include time and frequency information for communicating PRACH-related information such as the PRACH preamble. In some aspects, one-to-one or many-to-one correlation can exist between the synchronization signal blocks 806, . . . , 810 and the PRACH resource subsets 812, . . . , 816.

NR PDCCH (e.g. CORESET)

In some aspects, the control information carried by a PDCCH can include one or more control resource sets (CORESETs). PDCCH CORESETs denote time-frequency resources that are configured to a UE for monitoring for potential transmission of PDCCH carrying DL control information (DCI). In this regard, a CORESET can be defined as a set of resource element group s (REGs) with one or more symbol duration under a given numerology within which the UE 101 can attempt to (e.g., blindly) decode downlink control information (DCI). A UE is configured with PDCCH monitoring occasions and is expected to monitor for PDCCH in the CORESET associated with a particular PDCCH monitoring occasion configuration. In frequency domain, a CORESET can be contiguous or non-contiguous; while in time domain, a CORESET can be configured with one or a set of contiguous OFDM symbols. In addition, for large carrier bandwidth, maximum CORESET duration in time can be, e.g., symbols while for narrow carrier bandwidth, maximum CORESET duration in time can be, e.g., 3 symbols. Additionally, either time-first or frequency-first REG-to-control channel element (CCE) mapping can be supported for N R PDCCH.

Analog Beamforming

In some aspects, the physical antennas elements of a transmission-reception point (TRP), a gNB, and a UE can be grouped into antenna subarrays, where an antenna array may contain multiple subarrays. In some aspects, the physical antenna elements of the antenna sub-array can be virtualized to the antenna port(s) using analog beamforming. The analog beamforming may be used to improve the performance of the communication link between the TRP and the UE. The analog beamforming at the TRP and at the UE may be trained by transmitting a series of the reference signals with different beamforming. In some aspects, the UE may also train the receive beamforming. The optimal analog beamforming at the UE may be depend on the beamforming at the TRP and vice versa. In some aspects, each subarray may have different analog beamforming, which can be controlled by antenna weights.

In some aspects, multiple optimal Tx/Rx beam combinations at the TRP/gNB and the UE can be established for possible communication. An optimal Tx beam on one antenna subarray can be reused on another antenna subarray. The optimal Rx beam at the UE can be the same. The reference signals transmitted on antenna port with the same beam (using the same or different panels) are quasi co-located (or QCL-ed) with each other with regard to spatial channel parameters.

SS Block

Figure 9A:
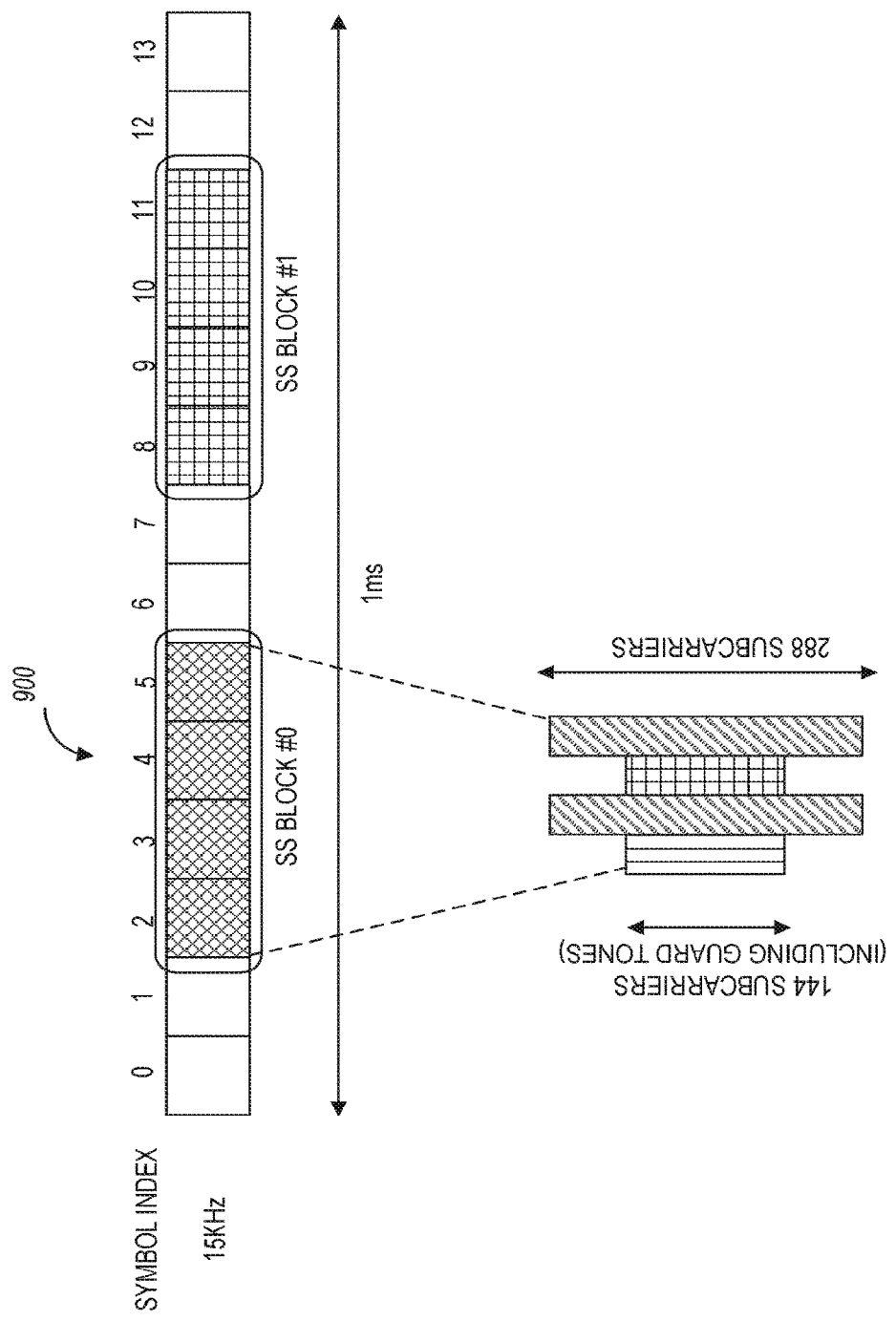
FIG. 9A illustrates SS block mapping and SS block pattern for 15 kHz subcarrier spacing in accordance with some aspects.

FIG. 9A illustrates SS block mapping and SS block pattern for 15 kHz subcarrier spacing in accordance with some aspects. Referring to FIG. 9A, the SS block 900 can include a primary synchronization signal (PSS), a secondary synchronization signal (SSS), and a p by sisal broadcast channel (PBCH). In some aspects, depending on subcarrier spacing employed in the SS blocks and carrier frequency, various patterns can be defined for the transmission of SS blocks within a slot. For example, as seen in FIG. 9A, two SS blocks can be transmitted within a slot with 15 kHz subcarrier spacing, but other transmission patterns of SS blocks can be used as well. Additionally, FIG. 9A illustrates example SS block signal configuration in frequency domain.

In some aspects, the transmission of SS blocks within an SS burst set can be confined to a 5 millisecond (ms) window regardless of SS burst set periodicity Within the 5 ms window, the number of possible candidate SS block locations can be designated as L, where the maximum number of SS-blocks within SS burst set, L, for different frequency ranges can be as follows: (a) for frequency range up to 3 GHz, L can be 4; (b) for frequency ranges from 3 GHz to 6 GHz, L can be 8; and (c) for frequency range from 6 GHz to 52.6 GHz, L can be 64.

Figure 9B:
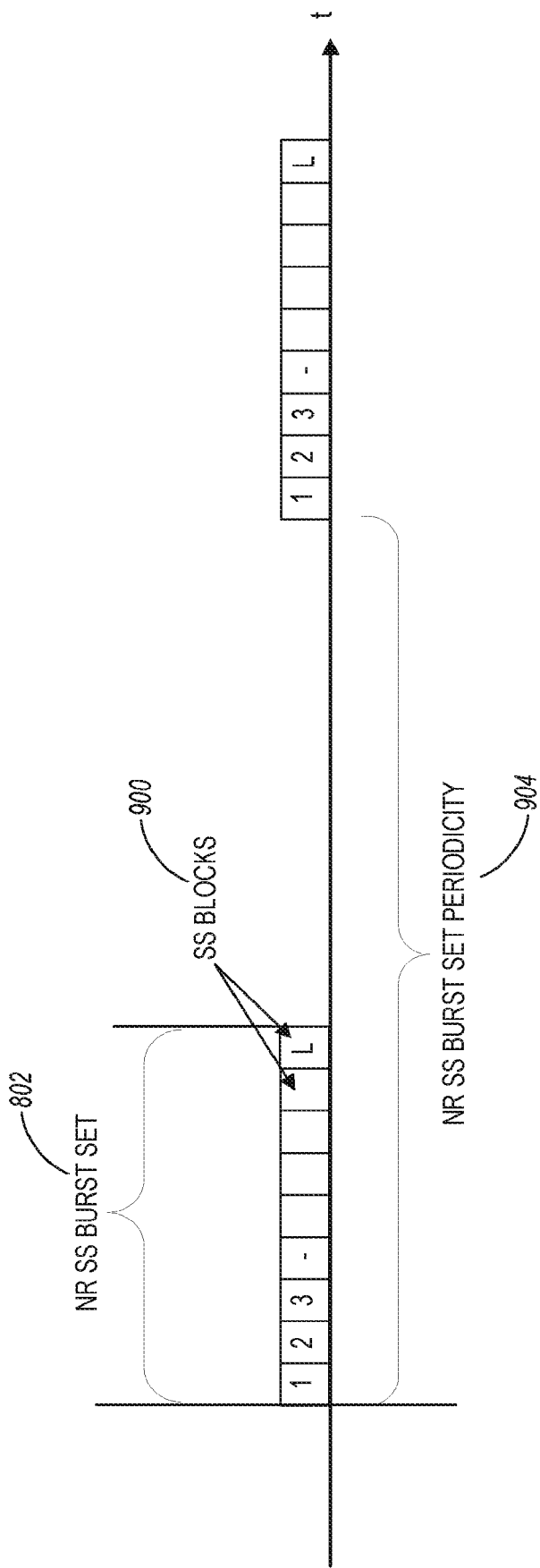
FIG. 9B illustrates an example SS block transmission in accordance with some aspects.

FIG. 9B illustrates an example SS block transmission in accordance with some aspects. Referring to FIG. 9B, there is illustrated another view of the SS burst set 802 which includes multiple SS blocks 900. As seen in FIG. 9B, the SS burst set can have periodicity of 904 which is configured by higher layers.

Figure 10:
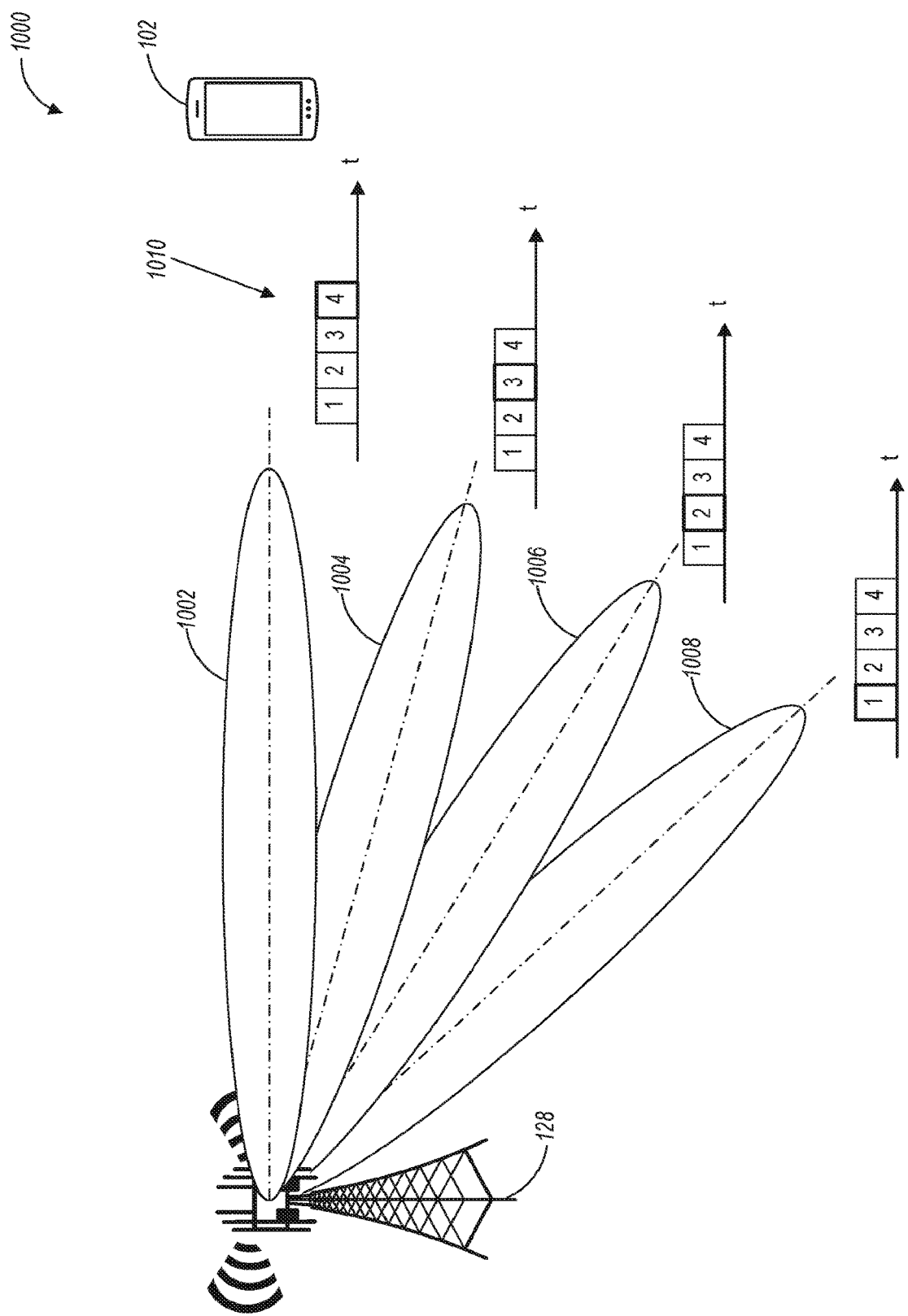
FIG. 10 illustrates beam assignment for different SS blocks within an SS burst set in accordance with some aspects.

FIG. 10 illustrates beam assignment for different SS blocks within an SS burst set in accordance with some aspects. Referring to FIG. 10, there is illustrated a communication sequence 1000 between the gNB 128 and the UE 102. More specifically, a gNB 128 can transmit different SS blocks from the SS burst set 1010 using corresponding different beams 1002, 1004, 1006, and 1008. In this regard, by transmitting different SS blocks using different beams, TX beamforming for each individual SS block transmitted by the gNB can be enabled for the UE 102. Upon detection of a specific SS block, the UE 102 can acquire TX/RX beam information that can be used for transmission of other physical channels and reference signals.

Reference Signals (e.g., CSI-RS)

Channel state information reference signal (CSI-RS) is a reference signal received by the UE and used for beam management and CSI acquisition for purposes of generating, e.g., channel quality information (CQI) for communication to the gNB. In some aspects, the CSI-RS as well as other reference signals may collide with one or more SS blocks, which can result in dropping the CSI-RS transmission. Techniques disclosed herein can be used to manage collisions associated with reference signals.

In some aspects, NR time-frequency resources can be partitioned (or configured) in a diverse manner. For instance, in NR communication systems, the net work configuration (or definition) of component carrier (CC) bandwidth, operating frequency range, bandwidth part (BWP), etc., can be different for different user equipment (UE). Additionally, the numerology used in different BWPs, either for the same UE or for a different UE, can be different as well. As a result, the time-frequency resource partition in NR can be non-uniform across different bands (in frequency) or samples (in time).

Techniques disclosed herein can be used to design downlink reference signals (RS), e.g., CSI-RS, that are compatible with a diverse system time-frequency resource partition (heterogeneous or non-uniform). More specifically, techniques disclosed herein can utilize the nested property of pseudo-noise (PN) sequences, namely, a PN sequence can be designed/generated such that its subsets are also PN sequences. This, in addition to other means of achieving orthogonality such as frequency division multiplexing (FDM), time-division multiplexing (TDM), sub-sampling in time and/or frequency, can be further used to design downlink reference signals that can be used with a variety of UE configurations. Even though techniques disclosed herein are discussed in reference to CSI-RS as an example downlink RS, other types of downlink RS can use similar PN sequences.

In NR communication systems, there can be multiple units of partitioning the total system bandwidth, including the following:

(1) Component carrier: In some aspects, a component carrier can be configured for specific UEs, and can be different for different UEs depending on the UE capability;

(2) Frequency range: In some aspects, the frequency range can be a UE-specific configured operating bandwidth, and can be a subset of the component carrier; and (3) Bandwidth part: In some aspects, a UE can be configured with one or more active frequency regions called bandwidth parts (BWPs). Each BWP can have different numerology, i.e., sub-carrier spacing and cyclic prefix value.

Based on the above resource partition definitions, at a given time, a non-uniform time-frequency grid can be used in a NR communication system. A single UE example is shown in FIG. 11, while a multiple UE example is shown in FIG. 12.

Figure 11:
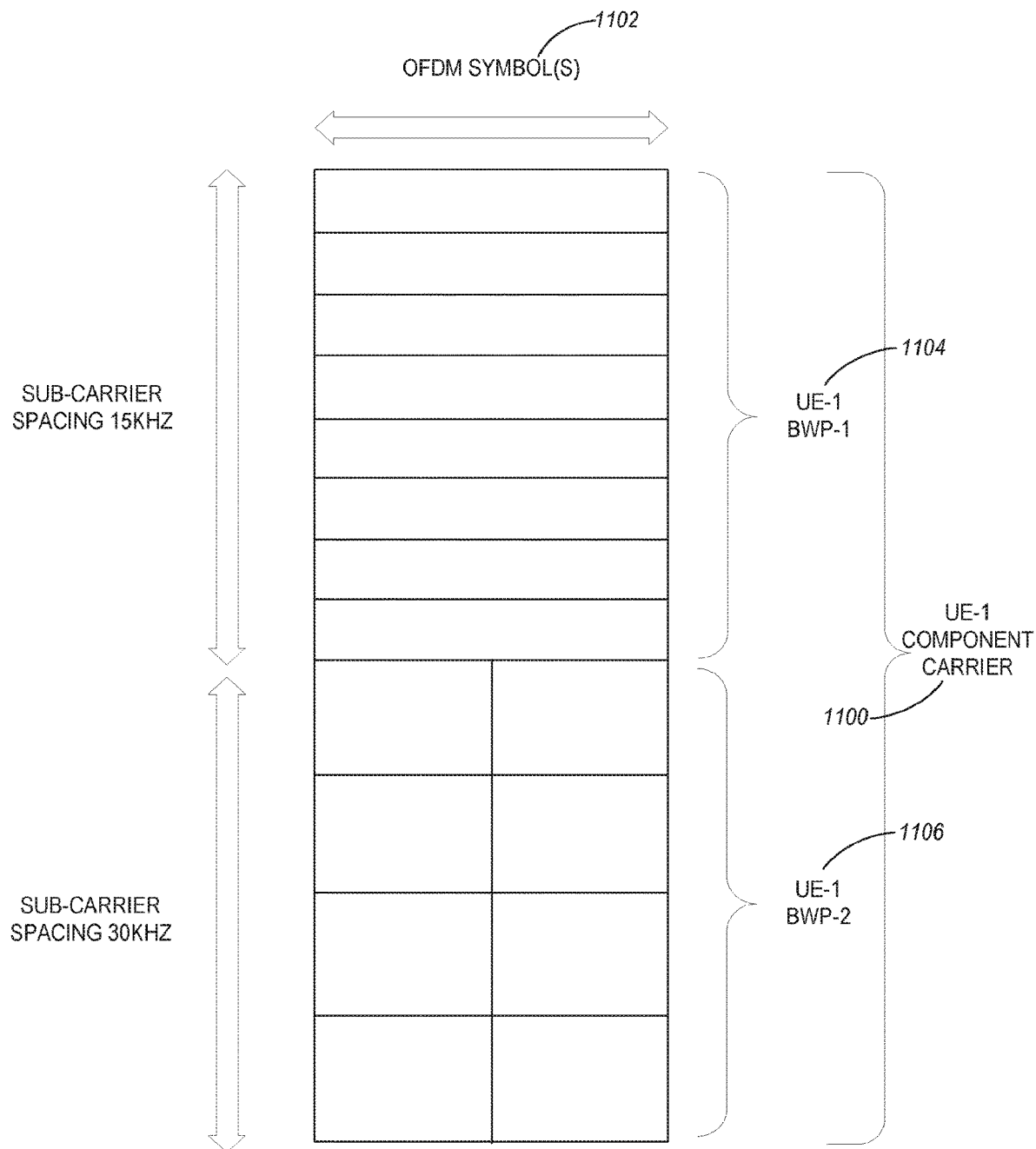
FIG. 11 illustrates a non-uniform time-frequency grid partition for a single UE in accordance with some aspects.

FIG. 11 illustrates a non-uniform time-frequency grid partition for a single UE in accordance with some aspects. Referring to FIG. 11, there is illustrated a component carrier 1100 for a first UE, UE1. The time-frequency resource of the component carrier can span a certain number of OFDM symbols, indicated as 1102. The time-frequency resource illustrated in FIG. 11 can include a first BWP 1104 with subcarrier spacing of 15 kHz, and a second. BWP 1106 with subcarrier spacing of 30 kHz. Both BWPs 1104 and 1106 can be associated with the same UE, i.e., UE1.

Figure 12:
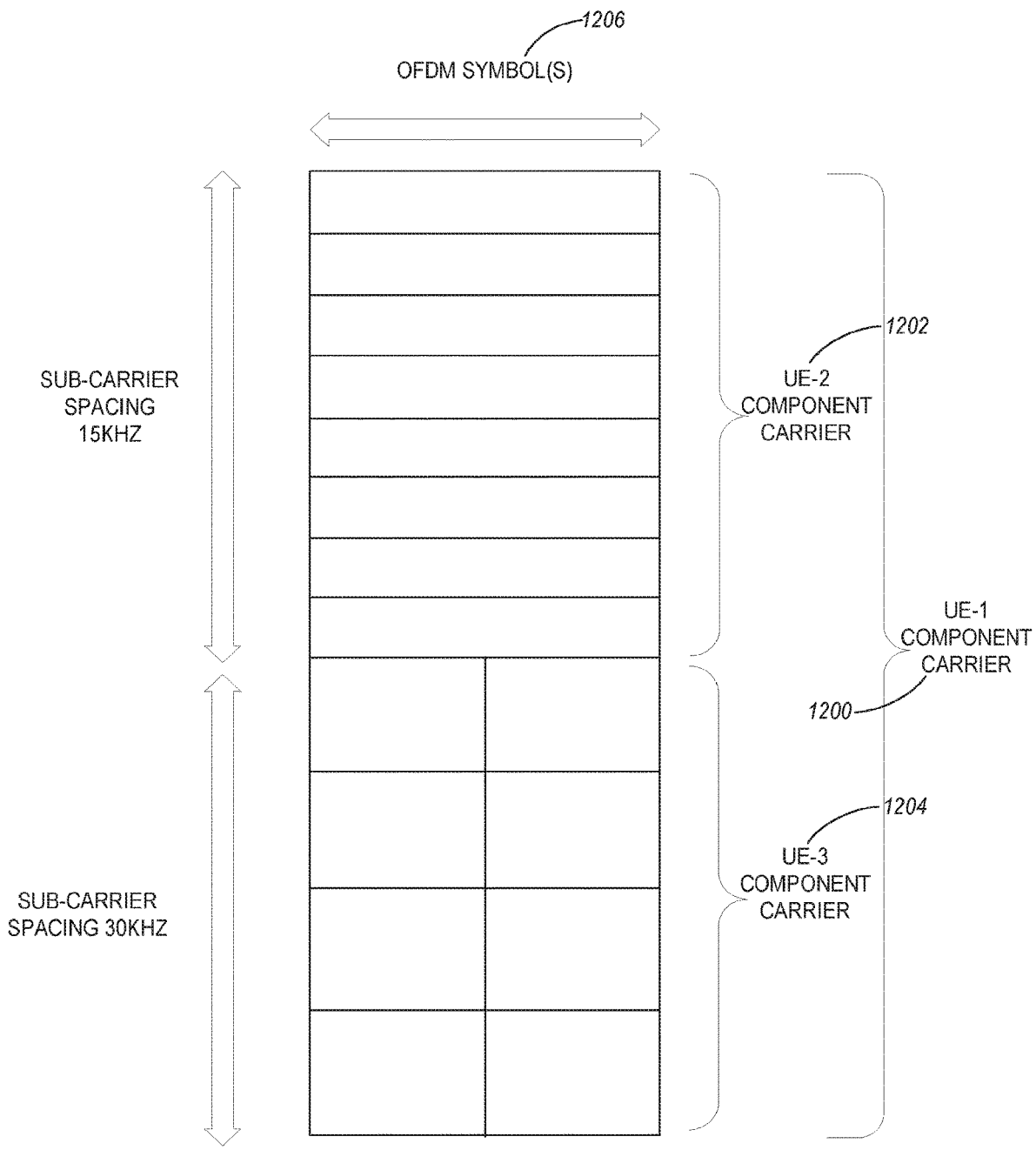
FIG. 12 illustrates a non-uniform time-frequency grid partition for multiple UEs in accordance with some aspects.

FIG. 12 illustrates a non-uniform time-frequency grid partition for multiple UEs in accordance with some aspects. Referring to FIG. 12, there is illustrated a component carrier 1200 for a first UE, UE1 The time-frequency resource of the component carrier can span a certain number of OFDM symbols, indicated as 1206. The time-frequency resource illustrated in FIG. 11 can include a first BWP 1202 for a second UE (UE2) with subcarrier spacing of 15 kHz, and a second BWP 1204 for a third UE (UE3) with subcarrier spacing of 30 kHz. Both BWPs 1104 and 1106 can be associated with the same UE, i.e., UE1.

In some aspects, the following RS design options that are compatible with this non-uniform, diverse time-frequency grid partition, can be used in a NR medication system:

Option 1. In some aspects, the RS can be based on a sub-sampled mother PN sequence. For example, a common "mother" PN sequence can be used, which can be specific for a gNB/TRP/cell. The common PN sequence can be configured to use a small sub-carrier spacing granularity for that gNB/TRP/cell (e.g., 15 KHz). If at any time a certain portion of the system bandwidth is scheduled to one or more UEs that use a wider sub-carrier spacing numerology (e.g., 60 KHz), such UEs can be configured to utilize the sub-sampled (e.g., by 4) common PN sequence, as per the used numerology. This technique can be used due to the fact that in NR, the sub-carrier spacing defined in different numerology are in-Legal multiples of each other (e.g., 15 kHz, 30 kHz, 60 kHz, etc.).

Option 2. In some aspects, different PN sequences can be used for different numerologies. More specifically, multiple PN sequence based RS can be used, one for each segment of the system bandwidth that use a common numerology. The used PN sequence can be signaled (or configured) to UE's scheduled on respective segments. In some aspects, this option can be applicable to RSs that are generated via methods that do not use PN sequences.

Option 3. Time-division multiplexing of RS transmission of different numerology. In some aspects, RS transmissions of different numerologies can be configured so that they do not overlap in time, i.e., TDM. For each numerology, a different PN sequence can be designed for a complete system bandwidth. The UEs using different numerology can be configured on different sub-frames for RS reception. In some aspects, this option can be applicable to RSs that are generated via methods than do not use PN sequences.

Option 4. In some aspects, the RS design can utilize combinations of the above three options.

Techniques disclosed herein for RS generation can be based on one or more of the following: the system time-bandwidth resource is partitioned into a heterogeneous mixed numerology components; the different time domain symbol(s) may use (or configured) different numerology; the different frequency domain regions, either referred as BWP or frequency range or component carriers, may use (or configured) different numerology; the downlink reference signal for different numerology symbols can be different; the downlink reference signal are generated using PN sequences; the downlink reference signal are generated using other methods than PN sequences; the downlink reference signal for different numerology symbols are derived from one common mother PN sequence; the downlink reference signal for different numerology symbols are derived using either truncation and/or sub-sampling of the mother sequence; the downlink reference signal for different numerology symbols are different; the downlink reference signal are generated using PN sequences; the downlink reference signal are generated using other methods than PN sequences; the downlink reference signal for different numerology symbols are derived from one common mother PN sequence; the downlink reference signal for different numerology symbols are derived using either truncation and/or sub-sampling of the mother sequence; a DL RS is designed to be compatible with mixed numerology resource partition.

In some aspects, CSI-RS and SS block transmission can be configured with the following features: indication of energy per resource element (EPRE) ratio between the CSI-RS and the SS block REs to enable joint reference signal received power (RSRP) measurements using both reference signals; and multiplexing of CSI-RS and SS block on the same OFDM symbol, where SS block punctures part of the CSI-RS signal on the overlap ping PRBs.

In some aspects, the SS block can be transmitted using multiple beams. However, the bandwidth of the SS block can be limited to a small number of PRBs. As a result, the physical layer measurement accuracy, RSRP, can be reduced due to lack of observations in the frequency domain. To improve the RSRP measurements accuracy on the SS block, CSI-RS based extension can be considered, where the SS block and the CSI-RS can be transmitted using the same beam. The CSI-RS configuration in this case can include the associated SS block. The configuration of the CSI-RS can also include energy per resource element (EPRE) ratio between the CSI-RS and the SS block signal.

In some aspects, to minimize the reference signal overhead, the CSI-RS signal can be multiplexed on the same OFDM symbol as the SS block signals. When multiplexing of the CSI-RS and the SS block is performed on the same OFDM symbol, the signal of the SS block punctures part of the CSI-RS on overlapping PRBs.

Figure 13:
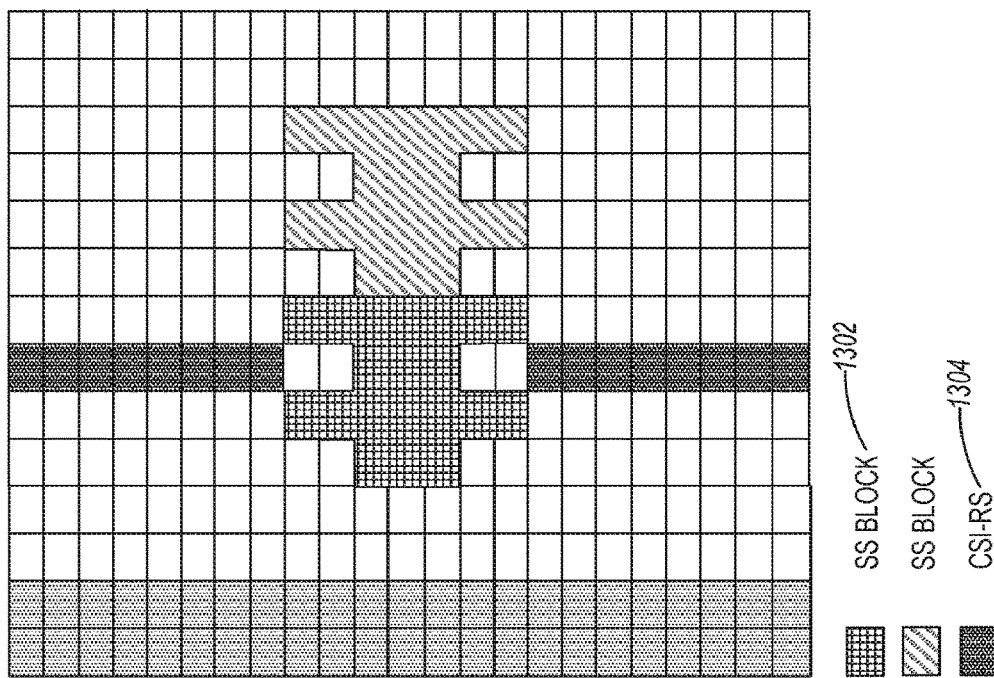
FIG. 13, FIG. 14, and FIG. 15 illustrate multiplexing of SS blocks and reference signals in accordance with some aspects.
Figure 14:
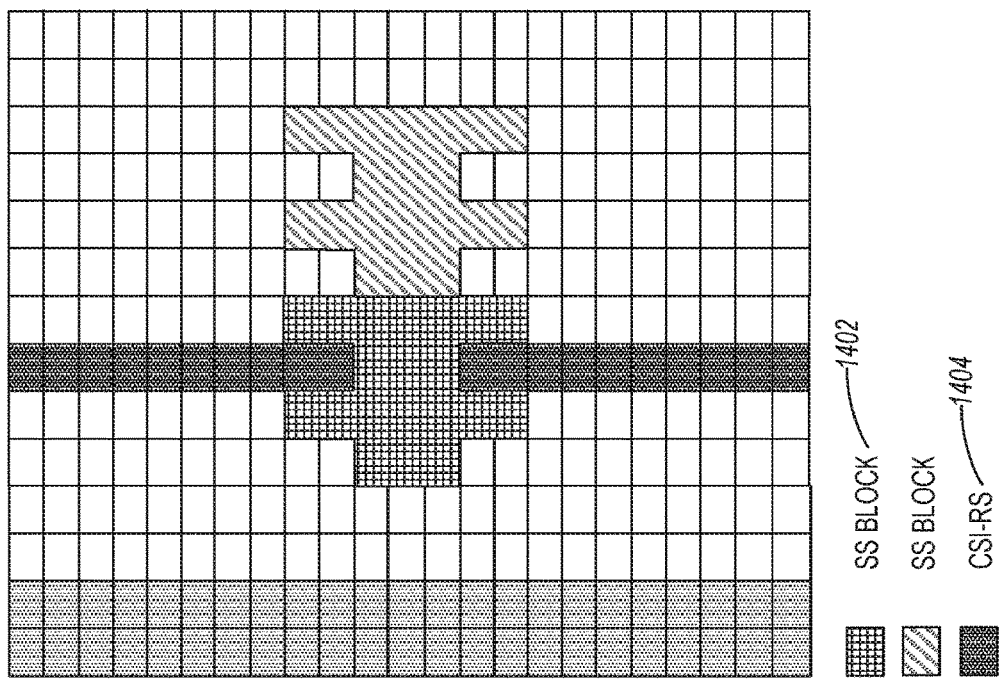
Figure 15:
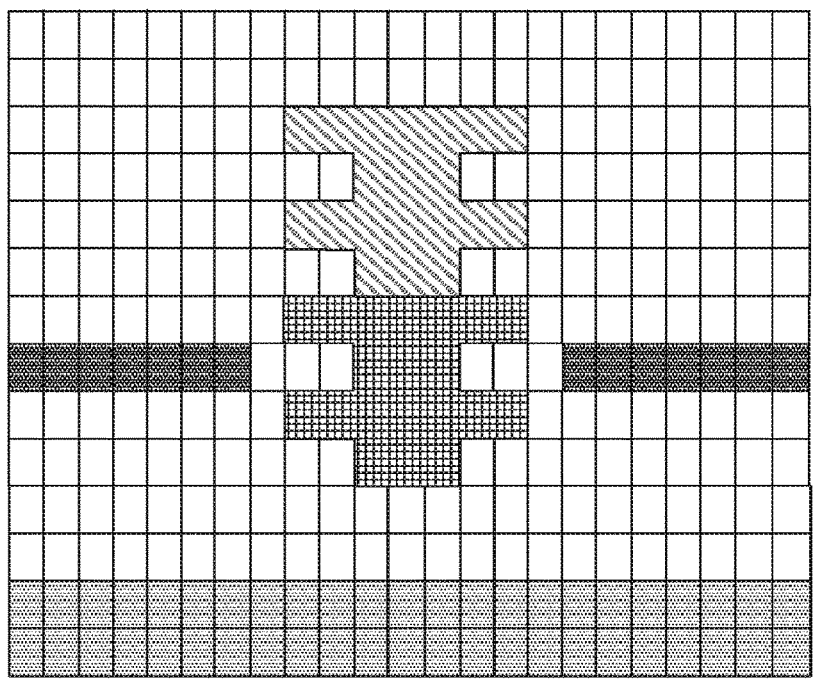

FIG. 13, FIG. 14, and FIG. 15 illustrate multiplexing of SS blocks and reference signals in accordance with some aspects. Referring to FIG. 13, there is illustrated a slot 1300 with SS block 1302 and CSI-RS 1304 transmitted within the slot 1300. In the aspect illustrated in FIG. 13, the UE may assume that the CSI-RS 1304 is not transmitted on PRBs that are not occupied by the SS block 1302 across all OFDM symbols within the slot 1300.

Referring to FIG. 14, there is illustrated a slot 1400 with SS block 1402 and CSI-RS 1404 transmitted within the slot 1400. In the aspect illustrated in FIG. 14, the UE may assume that the CSI-RS 1404 is not transmitted on PRBs that are not occupied by the SS block 1402 on the current OFDM symbol used for the CSI-RS transmission.

Referring to FIG. 15, there is illustrated a slot 1500 with SS block 1502 and CSI-RS 1504 transmitted within the slot 1500. In the aspect illustrated in FIG. 15, the UE is configured with PRBs used for CSI-RS transmission on the corresponding subframes with the SS block 1502. In some aspects, the configuration of CSI-RS transmission timing can support transmission periodicity of CSI-RS according to transmission periodicity of the SS block.

Techniques disclosed herein for configuration of CSI-RS and managing collisions involving reference signals can include one or more of the following: the CSI-RS and the SS block can be transmitted using the same beam; the power ratio between the CSI-RS and the SS block signal can also be indicated to the UE; received signal power can be calculated using both the CSI-RS and the associated SS block in accordance to configuration and reference signal power ratio; measurements based on the CSI-RS and/or the SS block can be reported to the serving transmission point; the CSI-RS transmission and the SS block transmission can be on the same OFDM symbols; PRBs used by the CSI-RS are non-overlapping with PRBs of the SS block; non-overlapping PRBs can be determined using a current OFDM symbol; non-overlapping PRBs can be determined using all OFDM symbols of the SS block; non-overlapping PRBs can be configured to the UE by the serving TRP; antenna port associated with the SS block and the CSI-RS transmission can be assumed as quasi co-located with regard to one or more spatial parameters; and the configuration of the CSI-RS can support indication of the slot for CSI-RS transmission to be the same slot for the associated SS block.

Demodulation Reference Signal (DM-IRS)

PDSCH DM-RS is used to assist UE in channel estimation for demodulation of the data channel (e.g., PDSCH). In NR communication systems, variable/configurable DM-RS patterns for data demodulation can be supported for slot based as well as non-slot based transmissions of 2/4/7-symbol duration.

DM-RS mapping type A (or DM-RS for slot based transmission) supports front-loaded DM-RS, which starts at the $3^{rd}$ or 4th OFDM symbol of the slot. DM-RS mapping typeB (or DM-RS for 2/4/7 non-slot based transmission) supports front-loaded DM-RS, which starts at the first OFDM symbol of the scheduled PDSCH. Front-loaded DMRS can be mapped over 1 or 2 adjacent OFDM symbols. Additional DM-RS can be configured for the later part of the slot. At least for slot, the location of front-loaded DL DM-RS can be fixed regardless of the first symbol location of the PDSCH. Examples of front loaded DM-RS are illustrated in FIG. 16 for both type A, i.e., slot based, and for type B, i.e., 2/4/7 symbol non-slot based DM-RS.

Figure 16:
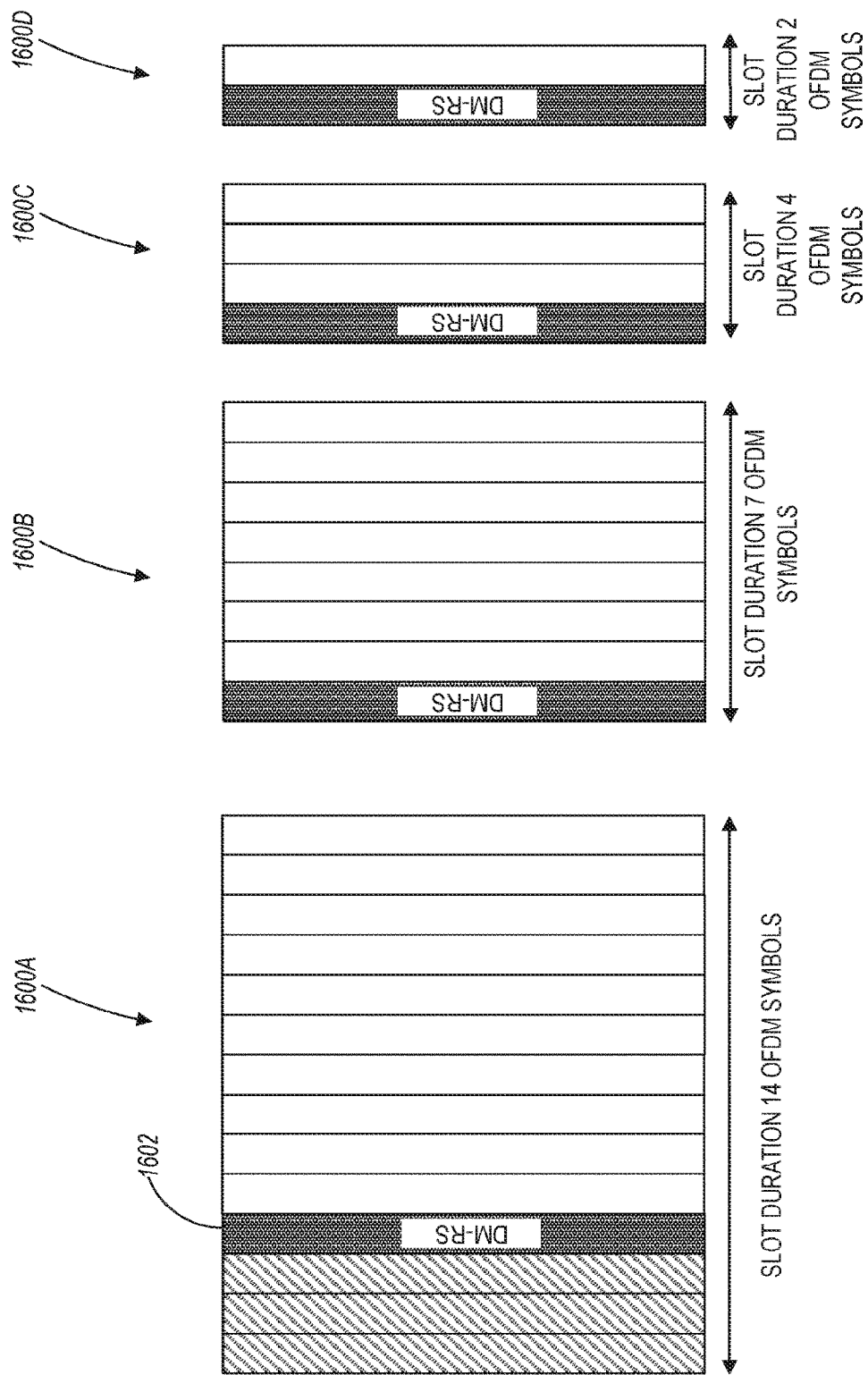
FIG. 16 illustrates a front-loaded DM-RS structure in accordance with some aspects.

FIG. 16 illustrates a front-loaded DM-RS structure in accordance with some aspects. Referring to FIG. 16, there is illustrated slot 1600A with front-loaded DM-RS 1602 of mapping type A. FIG. 16 further illustrates slots 1600B, 1600C, and 1600D with a DM-RS mapping type B for slot durations of seven, four, and two symbols respectively.

In some aspects, the PDSCH DM-RS may overlap with CORESET s containing PDCCH or with "reserved resources" that correspond to resource sets that may be configured and indicated semi-statically or dynamically for rate matching of the PDSCH. In such cases, the PDSCH DM-RS can be shifted based on one or more of the techniques disclosed herein. Such shifting of the DM-RS can result in the PDSCH DM-RS deviating from its "front-loaded" characteristic, thereby impacting UE processing timelines. If the PDCCH CORESET includes the scheduling DCI itself, then the impact to UE processing timeline is further increased as the UE may need to decode the PDCCH first in order to acquire information on details of the DM-RS configuration.

In some aspects, techniques disclosed herein can be used for avoiding collisions between PDSCH DM-RS and overlapped CORESETs or resource sets configured for rate-matching based on, e.g., shifting of the PDSCH DM-RS and/or PDSCH puncturing or rate-matching. These techniques may include rules based on the PDSCH: duration and the number of overlapped symbols. Additionally, possible adjustments to the definition of minimum UE processing times are described as well.

In some aspects, for both cases of DM-RS mapping Type A and Type B, techniques disclosed herein may assume that overlaps with PDCCH CORESETs and resource sets configured/indicated for rate-matching are handled in the same way. As an alternative, it could be specified, that for the latter case of overlaps with rate-matching resource sets, the UE may still assume that PDSCH DM-RS are transmitted and only the PDSCH REs are rate-matched around such overlapping resource sets. Hence, the aspects in this disclosure apply at least for the case of handling overlaps with PDCCH CORESETs, but the aspects disclosed herein are not limited to this scenario. Furthermore, for brevity, aspects disclosed herein use example overlaps with PDCCH CORESETs, but the disclosure may not be construed as being limited to this particular use case.

DM-RSMappingTypeA

For DM-RS mapping type A, in case of overlaps with PDCCH CORESETs or resource sets configured/indicated for rate-matching the PDSCH DM-RS may be shifted to the first available PDSCH symbol not impacted by the overlap. In accordance with some aspects, the following three options illustrated in FIG. 17, FIG. 18, and FIG. 19 may be used for shifting the DM-RS.

Figure 17:
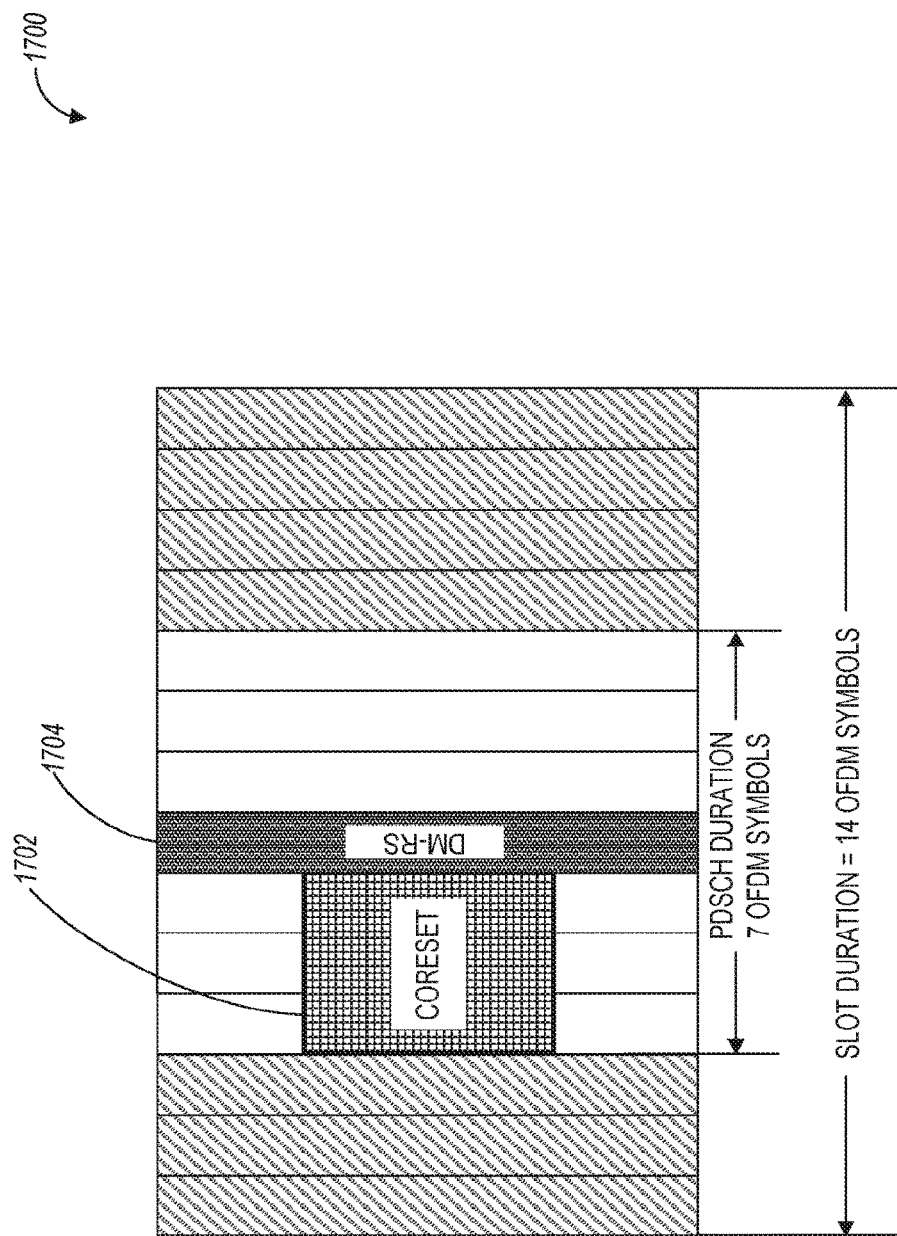
FIG. 17 illustrates collision handling for a CORESET and a DM-RS in accordance with some aspects.

FIG. 17 illustrates collision handling for a CORESET and a DM-RS in accordance with some aspects. In the first option (Option 1) illustrated in FIG. 17, the DM-RS symbol(s) are shifted to the OFDM symbol, which is not impacted by the overlap. Referring toFIG. 17, there is illustrated a slot 1700 with a CORESET 1702 transmitted starting at the fourth symbol. In this case, the front-loaded DM-RS 1704 of mapping type A can be shifted to the first available OFDM symbol not impacted by the overlap after the CORESET 1702, which in the example of FIG. 17 is the seventh symbol.

Figure 18:
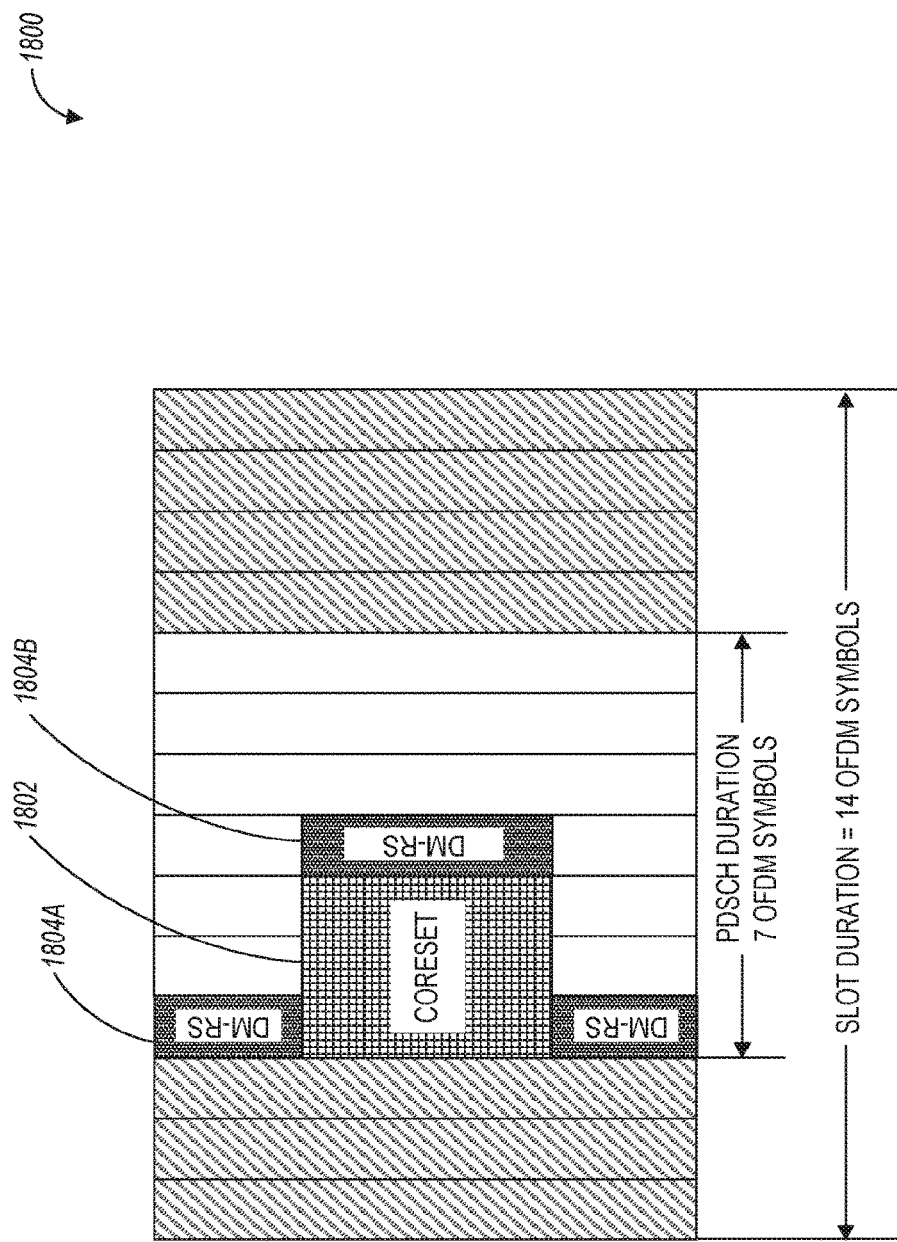
FIG. 18 illustrates collision handling for a CORESET and a DM-RS in accordance with some aspects.

FIG. 18 illustrates collision handling for a CORESET and a DM-RS in accordance with some aspects. In the second option (Option 2) illustrated in FIG. 18, UE can assume the DM-RS symbol is shifted to the first OFDM symbol not impacted by the overlap in the slot only for PRBs carrying PDCCH CORESETs. For other PRBs, UE can assume the same DM-RS symbol position. Referring to FIG. 18, there is illustrated a slot 1800 with a CORESET 1802 transmitted starting at the fourth symbol. DM-RS 1804A witches in PRB's not impacted by the CORESET transmission, can be transmitted at their expected starting symbol, i.e., third or fourth symbol. DM-RS 1804B, which is transmitted in PRB's impacted by the CORESET transmission, can be shifted to the first available OFDM symbol and can start at symbol #7 in the particular example in FIG. 18.

Figure 19:
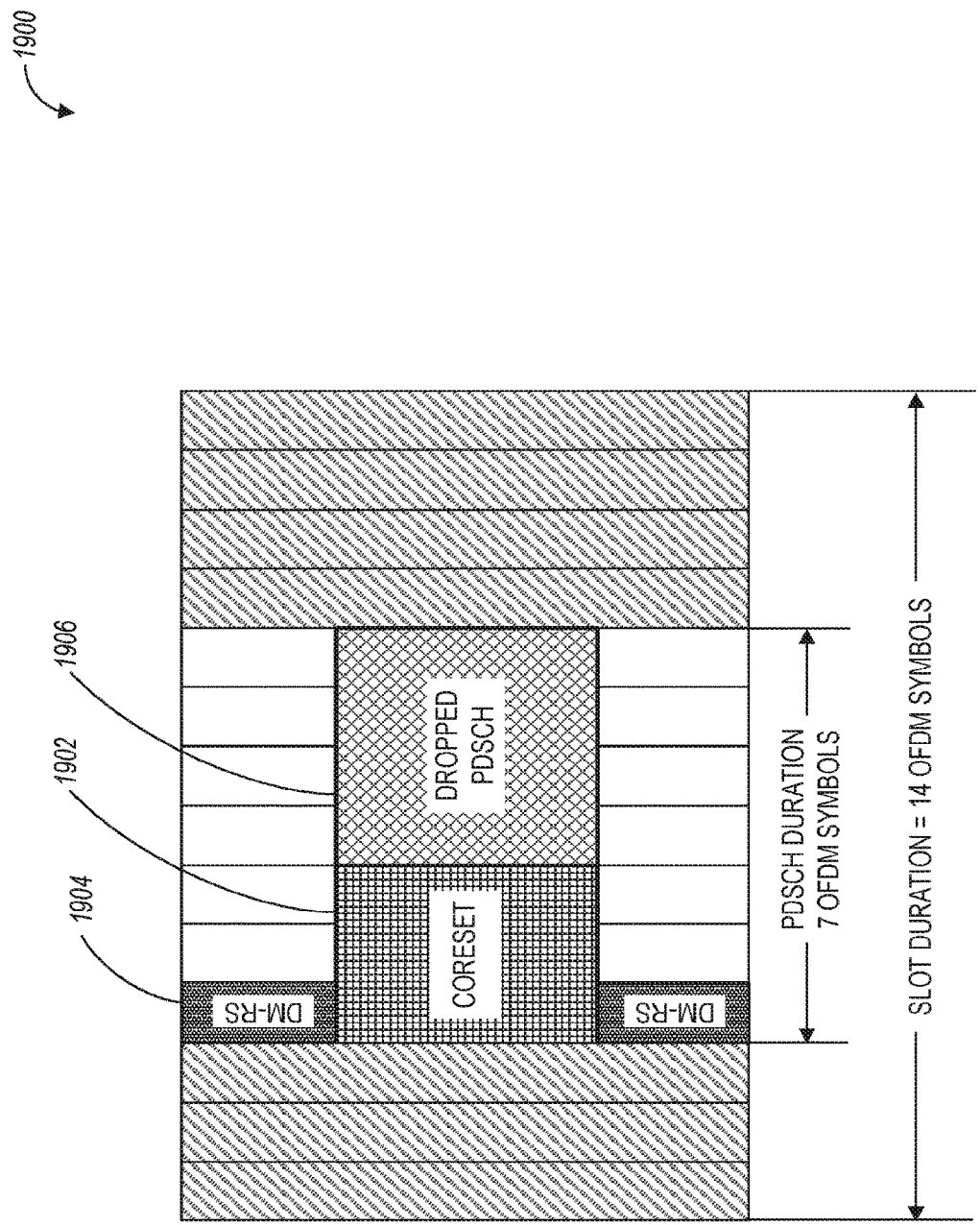
FIG. 19 illustrates collision handling for a CORESET and a DM-RS in accordance with some aspects.

FIG. 19 illustrates collision handling for a CORESET and a DM-RS in accordance with some aspects. In the third option (Option 3) illustrated in FIG. 19, the UE can assume the DM-RS symbol is punctured for PRBs carrying PDCCH CORESETs, and the PDSCH in symbols following the CORESET symbols for the PRBs carrying the CORESET are also punctured. Here, "puncturing" operation implies the PDSCH is assumed to be mapped to these affect resource elements but not actually used for transmission. For other PRBs, UE can assume the same DM-RS symbol position. Referring to FIG. 19, there is illustrated a slot 1900 with a CORESET 1902 within starting transmission at symbol number four. DM-RS 1904 can be transmitted at the same symbol number four since the DM-RS PRBs are not affected by the CORESET transmission. However, PDSCH data 1906 following the CORESET transmission can be dropped/punctured (i.e., DM-RS to the UE is punctured for PRBs that have PDCCH CORESETs that could collide with the DM-RS).

In some aspects, when the front loaded DM-RS occupies 2 OFDM symbols, both OFDM symbols can be shifted to the later part of the slot or punctured according to the three options above.

In some aspects, DM-RS pattern may use repetition of the DM-RS symbol in the later part of the slot or PDSCH duration (e.g., additional DMRS for 7-symbol PDSCH with mapping type B). In some cases, overlaps of such later-occurring DM-RS with PDCCH CORESET s or resource sets for rate-matching may occur. In such cases, in an aspect, the above options or their combinations, can be applied sequentially by first shifting the first one or two DM-RS symbols to the first available OFDM symbol(s) not impacted by any overlap, and secondly, shifting the repetition of DM-RS symbols to symbol(s) that are neither impacted by any overlap nor collide with the newly located first set of one or two DMRS symbols. In aspects when there is no available DM-RS symbol within the indicated PDSCH duration, the UE can assume that the additional DM-RS symbol(s) is/are dropped.

In some aspects, the shifting of the DM-RS symbol(s) to later symbols can be expected to impact the UE processing timeline and specifically, pipelined operation between channel estimation, demodulation, and decoding steps for PDSCH reception. Thus, to address this potential processing imp act, in one aspect, the minimum UE processing time (which can be indicated as a parameter N1 or N1+d), from the end of PDSCH reception to the start of the corresponding hybrid automatic repeat request acknowledgement (HARQ-ACK) transmission, can be increased (i.e., processing time relaxed) for UE processing capabilities 1 and 2. Accordingly, the minimum UE processing time can be defined as N1_DMRSshifted=N1+n1_DMRSshift, where n1_DMRSshift is either fixed in a wireless specification (e.g., 1 symbol) or is a function of the number of OFDM symbols the front-loaded DMRS is shifted. For instance, n1_ DMRSshift can equal to the number of OFDM symbols the front-loaded PDSCH DMRS is shifted to a later symbol.

In another aspect, n1_DMRSshift=0, if the PDSCH front-loaded DM-RS is shifted by one or two symbols, and is greater than zero, if the PDSCH front-loaded DM-RS is shifted by more than two symbols.

In another aspect, n1_DMRSshift=0, if the PDSCH front-loaded DM-RS shift is by one symbol, and is greater than zero, if the PDSCH front-loaded DM-RS shift is by more than one symbol.

In one aspect, the above relaxation to minimum UE processing time can be applied to both UE processing capabilities, i.e., capability 1 and capability 2 (which capabilities can be defined in one or more 3GPP specifications). In another aspect, the relaxation to the minimum UE processing time can be limited to UE processing time capability 2 (i.e., the "aggressive" UE processing time capability). In some aspects, the above techniques can apply only for UE processing capability 2, i.e., for the more aggressive UE capability, currently defined only for subcarrier spacing (SCS) values of 15 kHz and 30 kHz. In some aspects, the relaxation to the minimum UE processing time can be applied only if the front-loaded DMRS is shifted, and no relaxation is defined if only the additional DMRS symbols are shifted.

DM-RSMappingTypeB

In some aspects, shifting of DM-RS mapping type B, with 2/4/7 symbol non-slot based transmission, can be supported. The collision handling in this case can be based on the PDSCH duration and the number of overlapped symbols within the PDSCH duration.

2-Symbol Non-Slot Based Transmission

Figure 20:
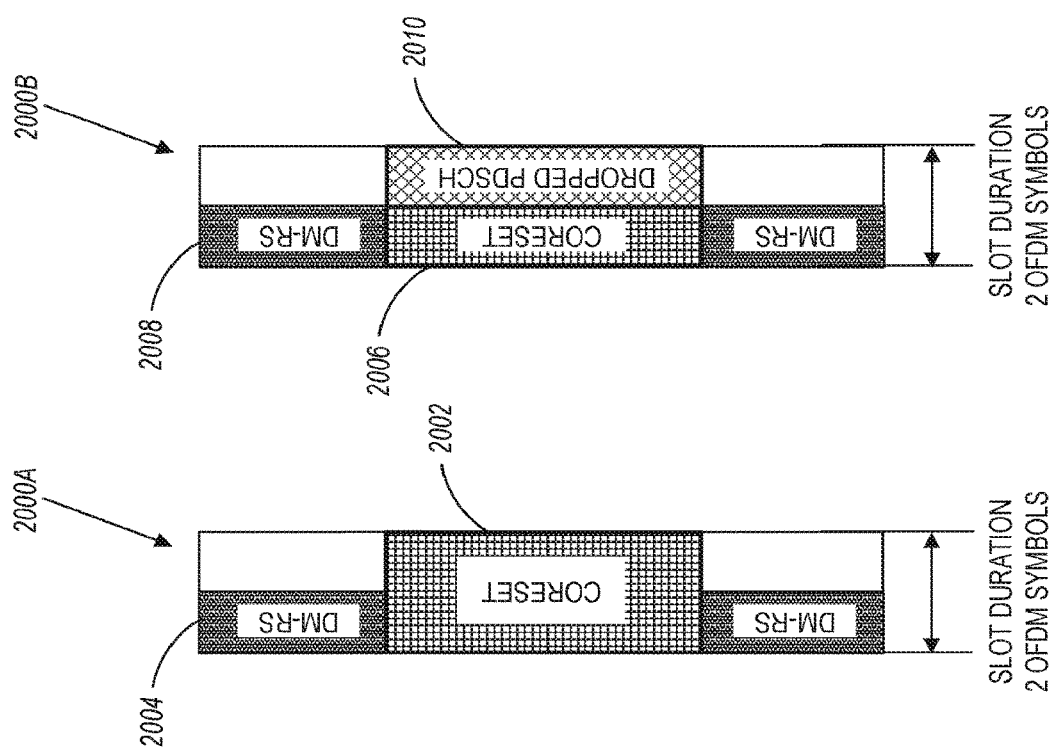
FIG. 20 illustrates a DM-RS structure for two symbol non-slot based transmission with a CORESET of different lengths in accordance with some aspects.

FIG. 20 illustrates a DM-RS structure for two symbol non-slot based transmission with a CORESET of different lengths in accordance with some aspects. Referring to FIG. 20, there is illustrated a two symbol slot 2000A, which can include a transmission of two symbol CORESET 2002 and a one symbol DM-RS 2004. FIG. 20 also illustrates a two symbol slot 2000B, which includes the transmission of a one symbol CORESET 2006 and a one symbol DM-RS 2008.

In connection with 2-symbol non-slot based transmission, if the overlap duration is 2 symbols, in one aspect, DM-RS can be punctured in the PRBs containing the PDCCH CORESETs, as illustrated in FIG. 20 (slot 2000A). The associated PDSCH in these PRBs can either be assumed as punctured (i.e., assumed that PDSCH is mapped to these resource elements (Res) but not actually transmitted) or rate-matched (i.e., PDSCH is assumed as not being mapped to these REs).

In some aspects, when the overlap is limited to 1 symbol, as an alternative to shifting the DM-RS symbol, DM-RS and PDSCH are punctured for the PRBs containing the PDCCH CORESET and the PDSCH is assumed as not transmitted (punctured/dropped) although mapped to the REs in the 2nd OFDM symbol on the PRBs corresponding to the CORESET transmission as illustrated in FIG. 20 (slot 2000B and dropped PDSCH 2010). Alternatively, the PDSCH can be assumed as being rate-matched around the PRBs in the affected symbols.

Compared to the above, if Options 1 or 2 (as presented in the context of PDSCH with DMRS mapping type A) are used and the PDSCA DM-RS is shifted to the second symbol of the 2-symbol PDSCH either for all or only the impacted PRBs, in one aspect, the minimum UE processing time, N1, can be relaxed to (N1+n1_DMRSshift), where n1_ DMRSshift=1 symbol in one example or a function of the shift amount (1 symbol in this case). This technique can be applied to both UE processing capabilities.

In some aspects, the relaxation to the minimum UE processing time can be limited to UE processing time capability 2 (i.e., the "aggressive" UE processing time capability).

4-Symbol Non-Slot Based Transmission

Figure 21:
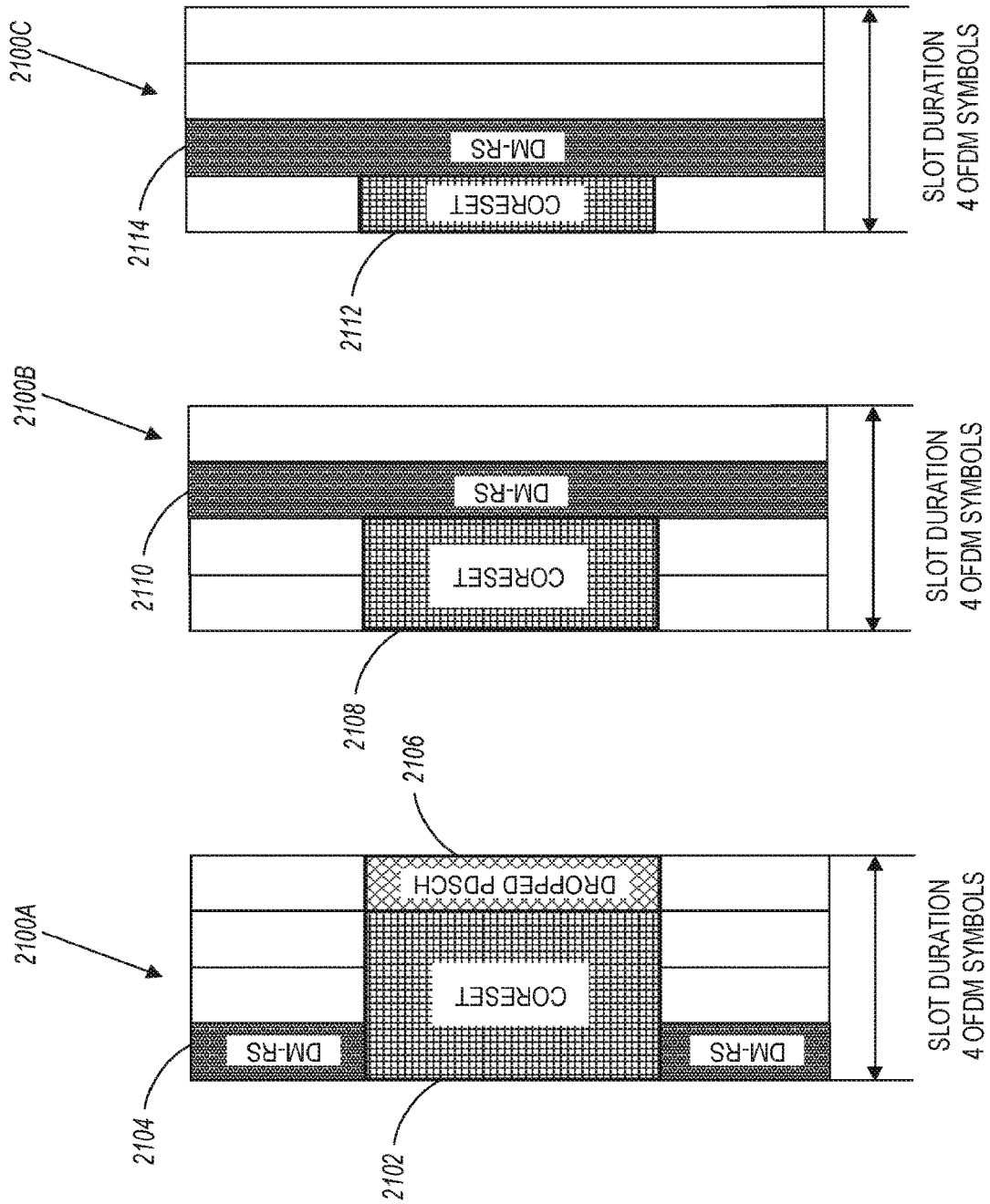
FIG. 21 illustrates a DM-RS structure for four symbol non-slot based transmission with a CORESET of different lengths in accordance with some aspects.

FIG. 21 illustrates a DM-RS structure for four symbol non-slot based transmission with a CORESET of different lengths in accordance with some aspects. Referring to FIG. 21, there is illustrated a 4-symbol slot 2100A, which can include a transmission of CORESET 2102 (3-symbols) and a one symbol DM-RS 2104. PDSCH 2106 following the course at 2102 and transmitted on PRBs used for the CORESET transmission can be dropped. FIG. 21 also illustrates a 4-symbol slot 2100B, which includes the transmission of a 2-symbol CORESET 2108 and a one symbol DM-RS 2110 shifted to the first available symbol following the transmission of the CORESET. FIG. 21 further illustrates a 4-symbol slot 2100C, which includes transmission of a 1-symbol CORESET 2112 and a 1-symbol DM-RS 2114 shifted to the first available symbol following the transmission of the CORESET.

In connection with 4-symbol non-slot based transmission, if the overlap duration is 3 symbols, as an alternative to DM-RS shifting, in an aspect, the DM-RS and PDSCH are punctured for the PRBs containing the PDCCH CORESETs and the PDSCH on the last OFDM symbol of the slot is dropped in the PRBs corresponding to the transmission of the PDCCH CORESETs (as seen in slot 2100A).

In aspects when the overlap durations are 2 and 1 symbol respectively, the DM-RS for the entire transmission (all PRBs) can be shifted to the first OFDM symbol not impacted by the overlap (i.e., in this example, not containing the PDCCH CORESET) as illustrated in slots 2100B and 2100C in FIG. 21. In some aspects, this approach can also be applied to the case of overlap of 3 symbols, wherein the DM-RS can be shifted to the last symbol of the PDSCH.

In aspects with PDSCH DM-RS shifting, the minimum UE processing time can be relaxed to (N1+n1_DMRSshift), where n1_DMRSshift=1 symbol in one example, or n1_DMRSshift is defined a function of the shift amount (1, 2, or 3 symbol(s) in this case).

As specific examples, n1_DMRSshift=0 if the PDSCH DM-RS shift is by one or two symbols, and equals 1 symbol if the PDSCH DM-RS shift is by more than 2 symbols. Alternatively, n1_DMRSshift=0 if the PDSCH DM-RS shift is by one symbol, and equals 1 symbol if the PDSCH DM-RS shift is by more than one symbol. In some aspects, the above relaxation to minimum UE processing time N1 can be applied to both UE processing capabilities. Additionally, in some aspects, the relaxation to the minimum UE processing time can be limited to LTE processing time capability 2 (i.e., the "aggressive" UE processing time cap ability).

7-Symbol Non-Slot Based Transmission

Figure 22:
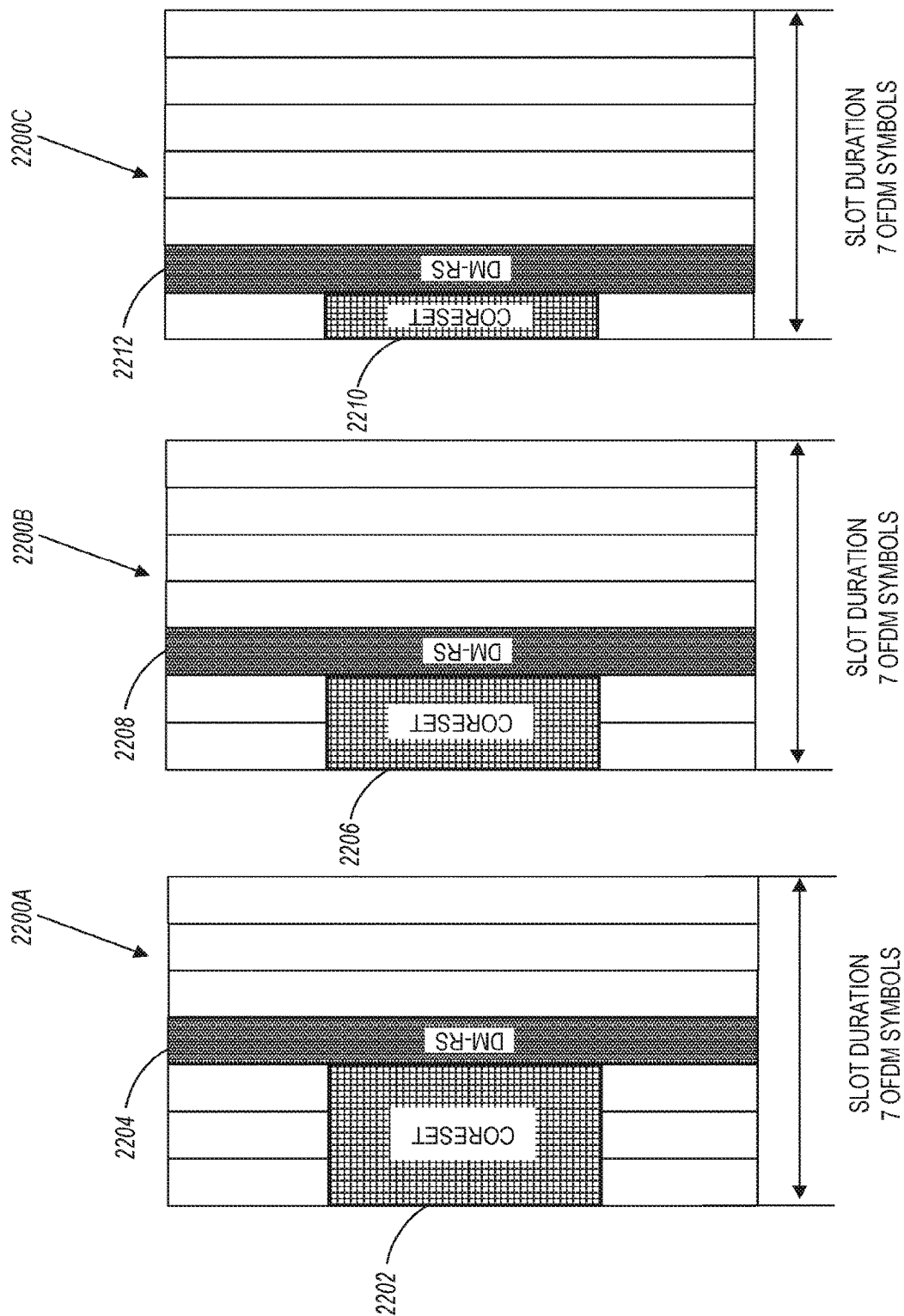
FIG. 22 illustrates a DM-RS structure for seven symbol non-slot based transmission with a CORESET of different lengths in accordance with some aspects.

FIG. 22 illustrates a DM-RS structure for seven symbol non-slot based transmission with a CORESET of different lengths in accordance with some aspects. Referring to FIG. 22, there is illustrated a 7-symbol slot 2200A, which can include a transmission of CORESET 2202 (3-symbols) and a one symbol DM-RS 2204 at the first available symbol following the CORESET transmission. FIG. 22 also illustrates a 7-symbol slot 2200B, which includes the transmission of a 2-symbol CORESET 2206 and a one symbol DM-RS 2208 shifted to the first available symbol following the transmission of the CORESET. FIG. 22 further illustrates a 7-symbol slot 2200C, which includes transmission of a 1-symbol CORESET 2210 and a 1-symbol DM-RS 2212 shifted to the first available symbol following the transmission of the CORESET.

In connection with the 7-symbol non-slot based transmission, the collision between PDCCH CORESET s and PDSCH can be handled by, e.g., shifting the entire DM-RS to the first OFDM symbol not containing the PDCCH CORESETs, as illustrated in FIG. 22, for CORESET lengths of 3, 2 and 1 symbols.

In aspects involving PDSCH DM-RS shifting in one example, the minimum UE processing time can be relaxed to (N1+n1_DMRSshift), where n1_DMRSshift=1 symbol or n1_DMRSshift is defined as a function of the shift amount (1, 2, or 3 symbol(s) in this case).

In an aspect, n1_DMRSshift=0 if the PDSCH DM-RS shift is by one or two symbols, and equals 1 symbol if the PDSCH DM-RS shift is by more than 2 symbols. Alternatively, n1_DMRSshift=0 if the PDSCH DM-RS shift is by one symbol, and equals 1 symbol if the PDSCH DM-RS shift is by more than one symbol.

In some aspects, the above relaxation to minimum UE processing time could be applied to both UE processing capabilities. In some aspects, the relaxation to the minimum UE processing time can be limited to UE processing time capability 2 (i.e., the "aggressive" UE processing time capability).

In some aspects, the PDCCH and scheduled. PDSCH can be overlapping in time domain and multiplexed in frequency domain, such that there is no overlap between the PDCCH and PDSCH on any of the scheduled PRBs for PDSCH in any allocated symbols for the PDSCH, as illustrated in FIG. 23.

Figure 23:
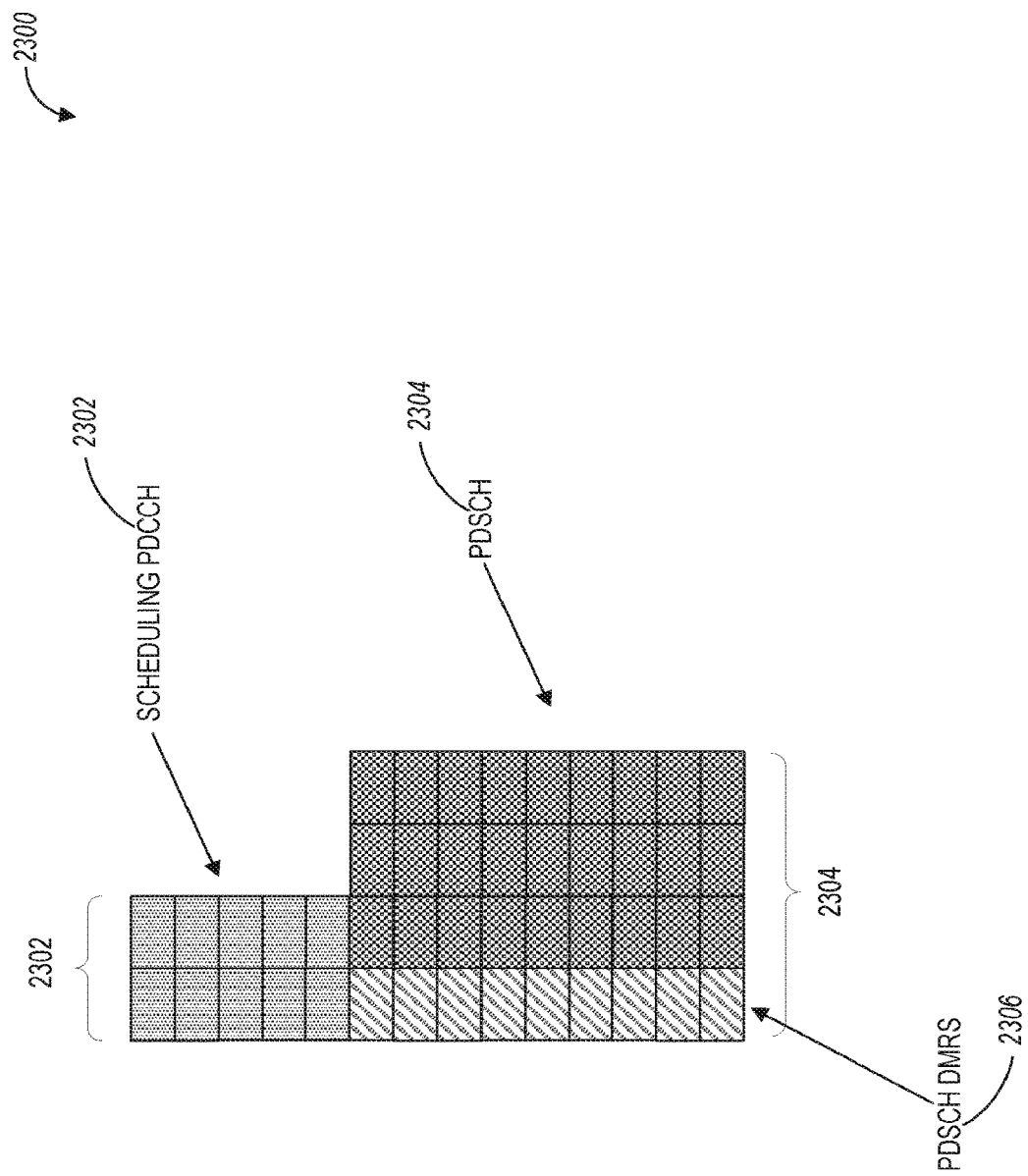
FIG. 23 illustrates PDCCH and PDSCH: overlapping in time domain and multiplexed in frequency domain without shifting of PDSCH DM-RS in accordance with some aspects.

FIG. 23 illustrates PDCCH and PDSCH overlapping in time domain and multiplexed in frequency domain without shifting of PDSCH DM-RS in accordance with some aspects. Referring to FIG. 23, there is illustrated a transmission 2300 which can include scheduling PDCCH 2302 and frequency domain multiplexed PDSCH 2304. The PDSCH 2304 can include a DM-RS 2306 transmitted in the first symbol of the slot, while frequency multiplexed with the PDCCH 2302.

In the aspect illustrated in FIG. 23, the PDSCH DM-RS need not be shifted to a later symbol of the PDSCH. However, the UE may not start performing channel estimation, even though the DM-RS is still in the first symbol of the PDSCH, until the scheduling DCI is decoded. In order to address this constraint on UE processing in one aspect, the minimum UE processing time, N1, can be increased by d symbols if the scheduling PDCCH ends d symbols after first PDSCH symbol for PDSCH typeB with 2-, 4-, or 7-symbol duration.

Considering 7-symbol PDSCH already offers some time-budget for the UE to "catch up" on the initial incurred delay, such relaxation may not be necessary for 7-symbol PDSCH with mapping type B, but only applied for 2- or 4-symbol duration PDSCH. In yet another aspect, such relaxation is defined only for PDSCH type B with 2-symbol duration.

In some aspects, any of the above relaxations can be specified for both Capabilities 1 and 2 ("baseline" and "aggressive" values) for UE minimum processing time. Alternatively, any of the above relaxation techniques can be specified only for Capability 2 for UE minimum processing time. Other combinations between the applicability of the relaxation to the different PDSCH durations (2, 4, 7 symbols) and the two cap abilities may be possible. In some aspects, the minimum UE processing time can be determined in connection with DM-RS that is shifted by zero (i.e., not shifted and transmitted at a pre-defined or pre-determined symbol location within a slot) or more than zero symbols within a slot.

Figure 24:
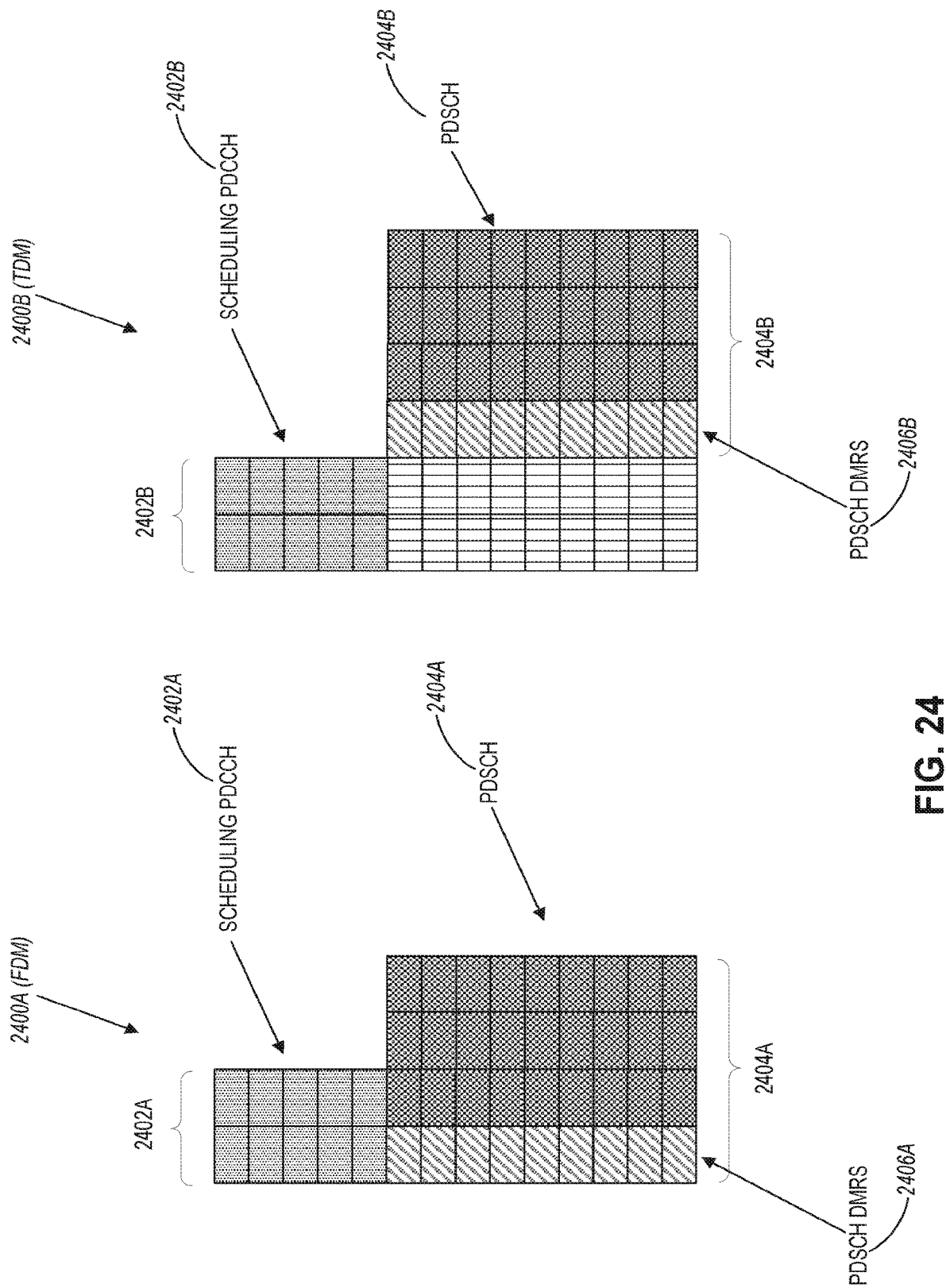
FIG. 24 illustrates relative locations for 4-symbol PDSCH with mapping type B in accordance with some aspects.

FIG. 24 illustrates relative locations for 4-symbol PDSCH with mapping typeB in accordance with some aspects. Referring to FIG. 24, there is illustrated a slot 2400A, which includes frequency domain multiplexed (FDM) PDCCH 2402A and a 4-slot PDSCH 2404A. The PDSCH 2404A includes a DM-RS 2406A transmitted in the first symbol of the slot 2400A, while frequency multiplexed with the PDCCH 2402A and the first and second symbols of the slot.

Referring to FIG. 24, there is also illustrated a slot 2400B, which includes time domain multiplexed (TDM) PDCCH 2402B and a 4-slot PDSCH 2404B. The PDSCH 2404B includes a DM-RS 2406B transmitted in the first available symbol after the transmission of the PDCCH 2402B.

In some aspects, for PDSCH mapping type B with 4-symbol duration as illustrated in FIG. 24, the N1 value for Capability #1 can be increased by 3 symbols, irrespective of the relative location of the scheduling PDCCH and the start of the scheduled PDSCH. In this regard, both slot transmission types illustrated in FIG. 24 would correspond to the same minimum UE processing time given by (N1+3) symbols. In some aspects, N1 can be pre-defined (example N1 values are listed in Table 5.3-1 of 3GPP TS 38.214_v15.0).

Figure 25:
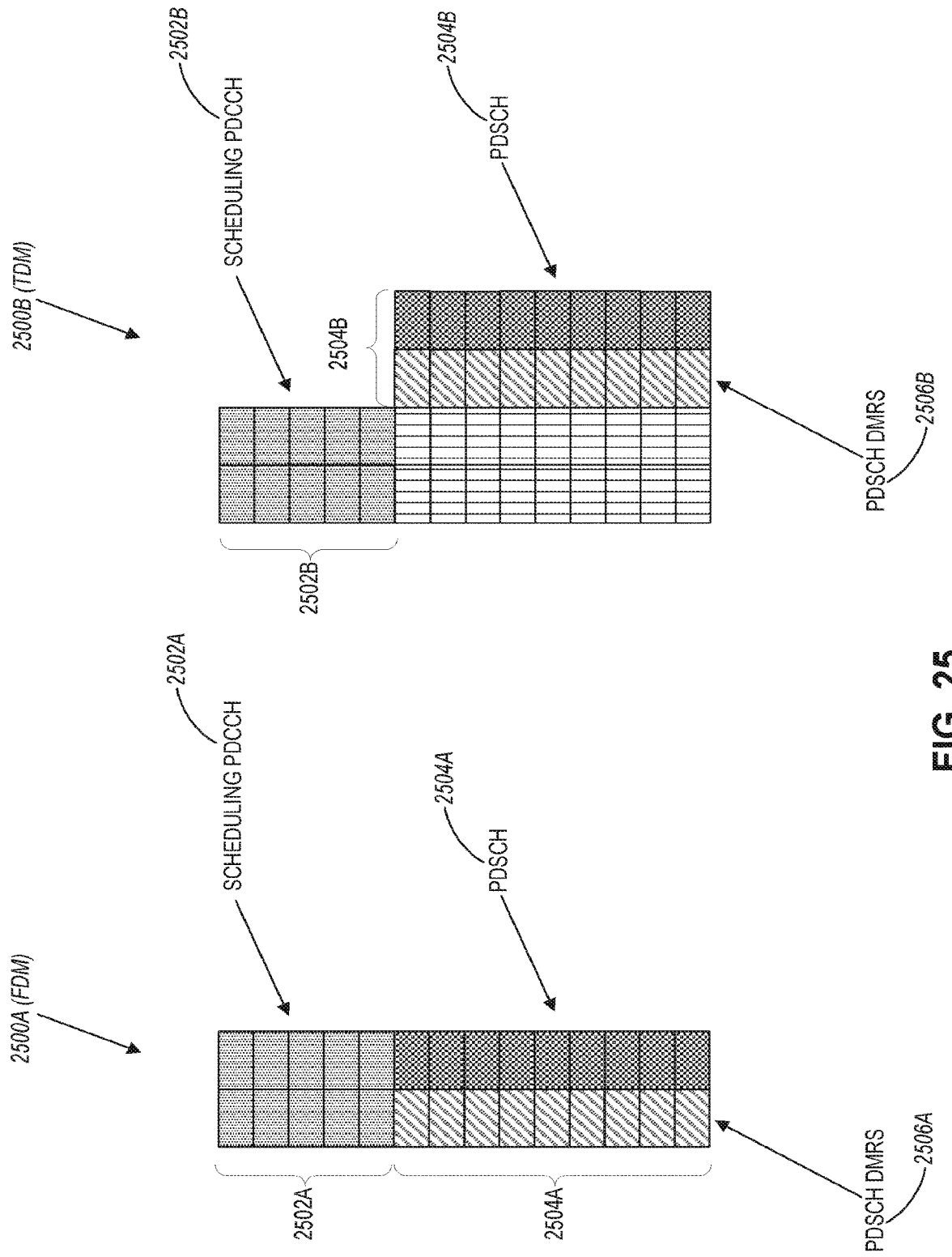
FIG. 25 illustrates relative locations for 2-symbol PDSCH with mapping type B in accordance with some aspects.

FIG. 25 illustrates relative locations for 2-symbol PDSCH with mapping typeB in accordance with some aspects. Referring to FIG. 25, there is illustrated a slot 2500A, which includes frequency domain multiplexed (FDM) PDCCH 2502A and a 2-slot PDSCH 2504A. The PDSCH 2504A includes a DM-RS 2506A transmitted in the first symbol of the slot 2500A, while frequency multiplexed with the PDCCH 2502A and the first and second symbols of the slot.

Referring to FIG. 25, there is also illustrated a slot 2500B, which includes time domain multiplexed (TDM) PDCCH 2502B and a 2-slot PDSCH 2504B. The PDSCH 2504B includes a DM-RS 2506B transmitted in the first available symbol after the transmission of the PDCCH 2502B.

In some aspects, other forms of slot 2500B are also possible, where there are additional symbol gap s between the PDCCH-end and the PDSCH-start, but it is sufficient to consider the scenario in slot 2500B in the context of UE minimum processing times.

Comparing the scenarios in FIG. 24 and FIG. 25, it can be noted that from the perspective of minimum UE processing time definition for PDSCH processing and HARQ-ACK feedback generation, a UE capable of handling slot 2400A case with N1=X symbols processing time can also handle slot 2500B case as the N1 time duration starts from end of the scheduled PDSCH. Therefore, the same processing time as used for 4-symbol PDSCH with mapping type B can apply for this case.

However, slot 2500A case can be more challenging as the UE may not know about the PDSCH starting symbol until after decoding the scheduling PDCCH, and thus, may not be able to start channel estimation and demodulation process until this time. On the other hand, the N1 time reference would be at the end of the scheduled PDSCH, thereby, effectively reducing the available processing time effectively by two symbols. Therefore, for slot 2500A case, two additional symbols may be added to the N1 value corresponding to slot 2500B case.

Slot 2400A case can be generalized to have an overlap between PDCCH and PDSCH of d={1, 2} symbols, and accordingly, in an aspect, for baseline (Capability 1) UE processing times, for PDSCH mapping type B with 2-symbol duration, the minimum UE processing times are defined as follows:

(1) N1+3 symbols when there is no time-domain overlap between the scheduling PDCCH and the scheduled PDSCH, and (2) N1+3+d symbols when there is a time-domain overlap of "d" symbols between the scheduling PDCCH and the scheduled PDSCH. In the above two techniques, N1 can be given by the corresponding value from Table 5.3-1 of 3GPP TS 38.214 v15.0. In some aspects, the above techniques may be applied to Capability #2 UE processing times as well.

Figure 26:
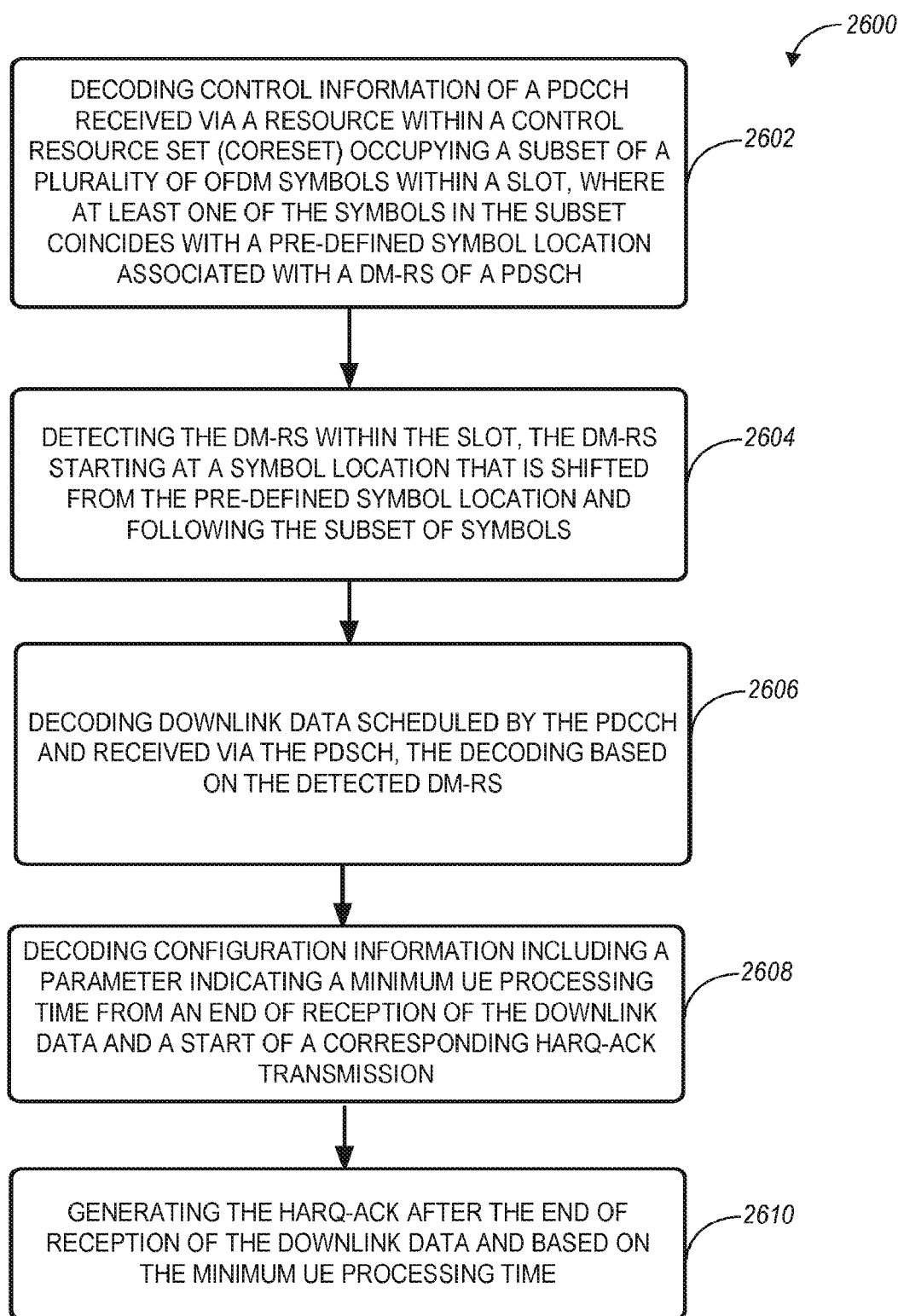
FIG. 26 illustrates generally a flowchart of example functionalities which can be performed in a 5G wireless architecture in connection with signal collision avoidance, in accordance with some aspects.

FIG. 26 illustrates generally a flowchart of example functionalities which can be performed in a 5G wireless architecture in connection with signal collision avoidance, in accordance with some aspects. Referring to FIG. 26, the example method 2600 may start at operation 2601, when processing circuitry of a UE (e.g., 102) may decode control information of a physical downlink control channel (PDCCH) received via a resource within a control resource set (CORESET) occupying a subset of a plurality of Orthogonal Frequency Division Multiplexing (OFDM) symbols within a slot. At least one of the symbols in the subset can coincide with a pre-defined symbol location associated with a demodulation reference signal (DM-RS) of a physical downlink shared channel (PDSCH). The pre-defined symbol location can be the 3rd or $4^{th}$ symbol for DM-RS mapping type A, or the first symbol for DM-RS mapping type B. At operation 2604, the DM-RS can be detected within the slot, the DM-RS starting at a symbol location that is shifted from the pre-defined symbol location and following the subset of symbols. For example, the DM-RS can be shifted based on one or more of the preceding figures discussed herein. At operation 2606, downlink data scheduled by the PDCCH and received via the PDSCH can be decoded, the decoding based on the detected DM-RS. At operation 2608, configuration information including a parameter indicating a minimum UE processing time from an end of reception of the downlink data and a start of a corresponding hybrid automatic repeat request acknowledgement (HARQ-ACK) transmission can be decoded. At operation 2610, the HARQ-ACK can be generated after the end of reception of the downlink data and based on the minimum UE processing time.

Figure 27:
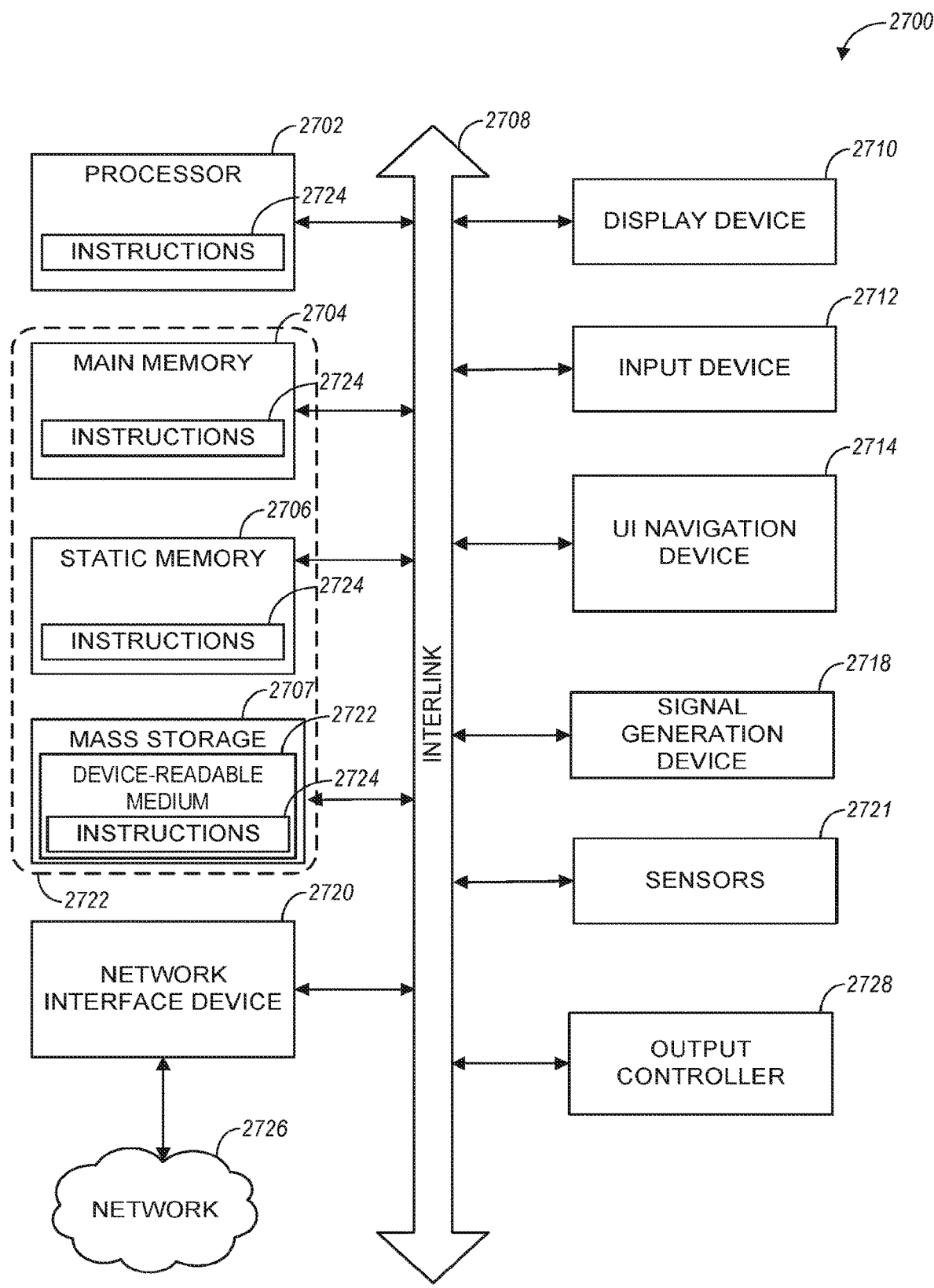
FIG. 27 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 27 illustrates a block diagram of a communication device such as an evolved Node-B (eNB), a new generation Node-B (gNB), an access point (AP), a wireless station (STA), a mobile station (MS), or a user equipment (UE), in accordance with some aspects. In alternative aspects, the communication device 2700 may operate as a standalone device or may be connected (e.g., networked) to other communication devices.

Circuitry (e.g., processing circuitry) is a collection of circuits implemented in tangible entities of the device 2700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 2700 follow.

In some aspects, the device 2700 may operate as a standalone device or may be connected (e.g., networked) to other devices. In a networked deployment, the communication device 2700 may operate in the capacity of a server communication device, a client communication device, or both in server-client network environments. In an example, the communication device 2700 may act as a peer communication device in peer-to-peer (P2P) (or other distributed) network environment. The communication device 2700 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 2700 may include a hardware processor 2702 (e.g., a central processing unit (CPU), a graphics processing unit (GPU), a hardware processor core, or any combination thereof), a main memory 2704, a static memory 2706, and mass storage 2707 (e.g., hard drive, tape drive, flash storage, or other block or storage devices), some or all of which may communicate with each other via an interlink (e.g., bus) 2708.

The communication device 2700 may further include a display device 2710, an alphanumeric input device 2712 (e.g., a keyboard), and a user interface (UI) navigation device 2714 (e.g., a mouse). In an example, the display device 2710, input device 2712 and UI navigation device 2714 may be a touch screen display. The communication device 2700 may additionally include a signal generation device 2718 (e.g., a speaker), a network interface device 2720, and one or more sensors 2721, such as a global positioning system (GPS) sensor, compass, accelerometer, or other sensor. The communication device 2700 may include an output controller 2728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2707 may include a communication device-readable medium 2722, on which is stored one or more sets of data structures or instructions 2724 (e.g., software) embodying or utilized by any one or more of the techniques or functions described herein. In some aspects, registers of the processor 2702, the main memory 2704, the static memory 2706, and/or the mass storage 2707 may be, or include (completely or at least partially), the device-readable medium 2722, on which is stored the one or more sets of data structures or instructions 2724, embodying or utilized by any one or more of the techniques or functions described herein. In an example, one or any combination of the hardware processor 2702, the main memory 2704, the static memory 2706, or the mass storage 2716 may constitute the device-readable medium 2722.

As used herein, the term "device-readable medium" is interchangeable with "computer-readable medium" or "machine-readable medium". While the communication device-readable medium 2722 is illustrated as a single medium, the term "communication device-readable medium" may include a single medium or multiple media (e.g., a centralized or distributed database, and/or associated caches and servers) configured to store the one or more instructions 2724.

The term "communication device-readable medium" may include any medium that is capable of storing encoding or carrying instructions (e.g., instructions 2724) for execution by the communication device 2700 and that cause the communication device 2700 to perform any one or more of the techniques of the present disclosure, or that is capable of storing encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 2724 may further be transmitted or received over a communications network 2726 using a transmission medium via the network interface device 2720 utilizing any one of a number of transfer protocols (e.g., frame relay, internet protocol (IP), transmission control protocol (TCP), user datagram protocol (UDP), by hypertext transfer protocol (HTTP), Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2720 may include one or more physical jacks (e.g., Ethernet, coaxial, or phone jacks) or one or more antennas to connect to the communications network 2726. In an example, the network interface device 2720 may include a plurality of antennas to wirelessly communicate using at least one of single-input multiple-output (SIMO), MIMO, or multiple-input single-output (MISO) techniques. In some examples, the network interface device 2720 may wirelessly communicate using Multiple User MIMO techniques.

The term "transmission medium" shall be taken to include any intangible medium that is capable of storing encoding or carrying instructions for execution by the communication device 2700, and includes digital or analog communications signals or other intangible medium to facilitate communication of such software. In this regard, a transmission medium in the context of this disclosure is a device-readable medium.

Additional Notes and Examples

Example 1 is an apparatus of a user equipment (UE), the apparatus comprising: processing circuitry, the processing circuitry configured to: decode control information of a physical downlink control channel (PDCCH) received via a resource within a control resource set (CORESET) occupying a subset of a plurality of Orthogonal Frequency Division Multiplexing (OFDM) symbols within a slot, wherein at least one of the symbols in the subset coincides with a pre-defined symbol location associated with a demodulation reference signal (DM-RS) of a physical downlink shared channel (PDSCH); detect the DM-RS within the slot, the DM-RS starting at a symbol location that is shifted from the pre-defined symbol location and following the subset of symbols; and decode downlink data scheduled by the PDCCH and received via the PDSCH, the decoding based on the detected DM-RS; and memory coupled to the processing circuitry, the memory configured to store the control information.

In Example 2, the subject matter of Example 1 includes, wherein the DM-RS is a full DM-RS, occupying a same number of physical resource blocks (PRBs) as the CORESET.

In Example 3, the subject matter of Examples 1-2 includes, wherein the DM-RS is shifted by zero or more OFDM symbols.

In Example 4, the subject matter of Examples 1-3 includes, wherein the DM-RS is a front-loaded DM-RS with the pre-defined symbol location at a first symbol of the PDSCH duration.

In Example 5, the subject matter of Examples 1-4 includes, wherein the downlink DM-RS occupies one of a single symbol or two symbols within the slot, starting at the pre-defined symbol location within the PDSCH transmission.

In Example 6, the subject matter of Examples 1-5 includes, wherein the processing circuitry is configured to: detect a first portion of the DM-RS at a first plurality of physical resource blocks (PRBs) starting at the pre-defined symbol location; and detect a remaining portion of the DM-RS at a second plurality of PRBs starting at the shifted symbol location.

In Example 7, the subject matter of Examples 1-6 includes, wherein the processing circuitry is configured to: detect a first portion of the DM-RS at a first plurality of physical resource blocks (PRBs) starting at the pre-defined symbol location; and detect the CORESET at a second plurality of PRBs starting at the pre-defined symbol location.

In Example 8, the subject matter of Example 7 includes, wherein the processing circuitry is configured to: decode a portion of the downlink data received via the first plurality of PRBs and based on the first portion of the DM-RS.

In Example 9, the subject matter of Examples 7-8 includes, wherein the first portion of the DM-RS includes a complete demodulation reference signal that can be used to decode the PDSCH received within the slot.

In Example 10, the subject matter of Examples 7-9 includes, wherein the processing circuitry is configured to: detect a second DM-RS within the slot, the second DM-RS starting at a second symbol location following an end symbol of the CORESET; and refrain from decoding a portion of the downlink data received via the second plurality of PRBs, the portion of the downlink data located after the end symbol of the CORESET and prior to the second symbol location.

In Example 11, the subject matter of Examples 1-10 includes, wherein a mapping associated with the DM-RS is one of DM-RS mapping type A or DM-RS mapping type B.

In Example 12, the subject matter of Example 11 includes, wherein the PDSCH spans durations of 3 through 14 symbols within a slot for the mapping type A, and the PDSCH spans durations of 2, 4, or 7 symbols for the mapping type B.

In Example 13, the subject matter of Examples 1-12 includes, wherein the DM-RS is shifted by zero or more symbols and the processing circuitry is configured to: determine a minimum UE processing time from an end of reception of the PDSCH and a time instance for a start of a corresponding hybrid automatic repeat request acknowledgement (HARQ-ACK) transmission.

In Example 14, the subject matter of Example 13 includes, wherein the minimum UE processing time is a function of a difference in symbols between the DM-RS starting symbol location and the pre-defined symbol location.

In Example 15, the subject matter of Examples 13-14 includes, wherein the PDCCH and the PDSCH are multiplexed in frequency domain for some or all PRBs of the PDSCH, and wherein the minimum UE processing time is increased by d symbols, when the PDCCH ends d symbols after a starting symbol of the PDSCH.

In Example 16, the subject matter of Examples 13-15 includes, wherein the DM-RS is mapping type B with 2-symbol duration, and wherein the minimum UE processing time is (N1+3) symbols when there is no time domain overlap between the PDCCH and the PDSCH, where N1 symbols corresponds to the minimum UE processing time for a PDSCH with mapping type A or B with duration of at least 7 symbols.

In Example 17, the subject matter of Examples 13-16 includes, wherein the DM-RS is mapping type B with 2-symbol duration, and wherein the UE processing time is (N1+3+d) symbols when there is a time domain overlap of d symbols between the PDCCH and the PDSCH.

Example 18 is an apparatus of a user equipment (UE), the apparatus comprising: processing circuitry, the processing circuitry configured to: decode synchronization information within a synchronization signal (SS) block, the SS block received via a receive beam and within a SS burst set, the SS block occupying a subset of a plurality of Orthogonal Frequency Division Multiplexing (OFDM) symbol s within a slot; perform a synchronization procedure with a next generation Node-B (gNB) based on the synchronization information within the SS block; and decode a reference signal received via the receive beam; and memory coupled to the processing circuitry, the memory configured to store the synchronization information.

In Example 19, the subject matter of Example 18 includes, wherein the reference signal is a channel state information reference signal (CSI-RS).

In Example 20, the subject matter of Examples 18-19 includes, wherein the reference signal is received on physical resource blocks (PRBs) that are unoccupied by the SS block within the subset of symbols.

In Example 21, the subject matter of Examples 18-20 includes, wherein the processing circuitry is configured to: decode configuration information indicative of energy-per-resource-element (EPRE) ratio between the reference signal and the SS block; and estimate the CQI based at least in part on the EPRE ratio.

In Example 22, the subject matter of Examples 18-21 includes, wherein the reference signal is received on at least one of the subset of symbols used for receiving the SS block.

In Example 23, the subject matter of Examples 18-22 includes, wherein an antenna port associated with transmission of the SS block and the reference signal is quasi co-located with regard to one or more spatial parameters of a transmit channel.

In Example 24, the subject matter of Examples 18-23 includes, wherein the slot is configured with at least two bandwidth parts (BWPs each of the BWPs associated with different numerology.

In Example 25, the subject matter of Example 24 includes, wherein the processing circuitry is configured to: decode configuration information with a second reference signal received on a time-frequency resource associated with a first BWP of the at least two BWPs, the first BWP associated with first numerology; and derive the reference signal using the second reference signal, wherein the reference signal is associated with data received via a second BWP of the at least two BWPs.

In Example 26, the subject matter of Example 25 includes, wherein the second reference signal includes a mother pseudo noise (PN) sequence, and the processing circuitry is configured to: derive the reference signal based on sub-sampling the second reference signal.

In Example 27, the subject matter of Examples 25-26 includes, wherein the processing circuitry is configured to: derive the reference signal based on a PN sequence for each BPW of the at least two BWPs, the PN sequence configured based on configured numerology and common resource block.

In Example 28, the subject matter of Examples 18-27 includes, transceiver circuitry coupled to the processing circuitry; and, one or more antennas coupled to the transceiver circuitry.

Example 29 is an apparatus of a Next Generation Node-B (gNB), the apparatus comprising: processing circuitry, configured to: encode control information of a physical downlink control channel (PDCCH) for transmission to a user equipment (UE) via a resource within a control resource set (CORESET), the CORESET occupying a subset of a plurality of Orthogonal Frequency Division Multiplexing (OFDM) symbols within a slot, wherein at least one of the symbols in the subset coincides with a pre-defined symbol location associated with a demodulation reference signal (DM-RS) of a physical downlink shared channel (PDSCH) scheduled by the PDCCH; encode the DM-RS for transmission within the slot, the DM-RS starting at a symbol location that is shifted from the pre-defined symbol location and following the subset of symbols; and encode downlink data for transmission via the PDSCH and based on the DM-RS; and memory coupled to the processing circuitry the memory configured to store the control information.

In Example 30, the subject matter of Example 29 includes, wherein the processing circuitry is configured to: encode a first portion of the DM-RS for transmission at a first plurality of physical resource blocks (PRBs) starting at the pre-defined symbol location; and encode a remaining portion of the DM-RS at a second plurality of PRBs starting at the shifted symbol location.

In Example 31, the subject matter of Examples 29-30 includes, wherein the processing circuitry is configured to: encode a first portion of the DM-RS at a first plurality of physical resource blocks (PRBs) starting at the pre-defined symbol location; and encode the control information within the CORESET at a second plurality of PRBs starting at the pre-defined symbol location.

In Example 32, the subject matter of Example 31 includes, wherein the processing circuitry is configured to: encode a portion of the downlink data for transmission via resources associated with the first plurality of PRBs and based on the first portion of the DM-RS.

In Example 33, the subject matter of Examples 31-32 includes, wherein the processing circuitry is configured to: encode a second DM-RS for transmission within the slot, the second DM-RS starting at a second symbol location following an end symbol of the CORESET.

In Example 34, the subject matter of Examples 31-33 includes, wherein the DM-RS is shifted by zero or more than zero symbols, and the processing circuitry is configured to: encode configuration information for transmission to the UE, the configuration information indicating a minimum UE processing time from an end of reception of the PDSCH and a start of a corresponding hybrid automatic repeat request acknowledgement (HARQ-ACK) transmission.

In Example 35, the subject matter of Examples 31-34 includes, wherein the processing circuitry is configured to: encode synchronization information for transmission to the UE within a synchronization signal (SS) block and via a transmit beam, the SS block occupying a subset of a plurality of Orthogonal Frequency Division Multiplexing (OFDM) symbols within a slot; and encode a channel state information reference signal (CSI-RS) for transmission to the UE via the transmit beam; and decode channel quality information (CQI) received based on the CSI-RS.

Example 36 is a non-transitory computer-readable storage medium that stores instructions for execution by one or more processors of a user equipment (UE), the instructions to configure the one or more processors to cause the UE to: decode control information of a physical downlink control channel (PDCCH) received via a resource within a control resource set (CORESET) occupying a subset of a plurality of Orthogonal Frequency Division Multiplexing (OFDM) symbols within a slot, wherein at least one of the symbols in the subset coincides with a pre-defined symbol location associated with a demodulation reference signal (DM-RS) of a physical downlink shared channel (PDSCH); detect the DM-RS within the slot, the DM-RS starting at a symbol location that is shifted from the pre-defined symbol location and following the subset of symbols; decode downlink data scheduled by the PDCCH and received via the PDSCH, the decoding based on the detected DM-RS; decode configuration information including a parameter indicating a minimum UE processing time from an end of reception of the downlink data and a start of a corresponding hybrid automatic repeat request acknowledgement (HARQ-ACK) transmission; and generate the HARQ-ACK after the end of reception of the downlink data and based on the minimum UE processing time.

In Example 37, the subject matter of Example 36 includes, wherein the instructions further cause the UE to: detect a first portion of the DM-RS at a first plurality of physical resource blocks (PRBs) starting at the pre-defined symbol location; and detect a remaining portion of the DM-RS at a second plurality of PRBs starting at the shifted symbol location.

In Example 38, the subject matter of Examples 36-37 includes, wherein the instructions further cause the UE to: detect a first portion of the DM-RS at a first plurality of physical resource blocks (PRBs) starting at the pre-defined symbol location; and detect the CORESET at a second plurality of PRBs starting at the pre-defined symbol location.

In Example 39, the subject matter of Example 38 includes, wherein the instructions further cause the UE to: decode a portion of the downlink data received via the first plurality of PRBs and based on the first portion of the DM-RS.

In Example 40, the subject matter of Examples 38-39 includes, wherein the instructions further cause the UE to detect a second DM-RS within the slot, the second DM-RS starting at a second symbol location following an end symbol of the CORESET, and refrain from decoding a portion of the downlink data received via the second plurality of PRBs, the portion of the downlink data located after the end symbol of the CORESET and prior to the second symbol location.

Example 41 is at least one machine-readable medium including instructions that, when executed by processing circuitry, cause the processing circuitry to perform operations to implement of any of Examples 1-40

Example 42 is an apparatus comprising means to implement of any of Examples 1-40.

Example 43 is a system to implement of any of Examples 1-40.

Example 44 is a method to implement of any of Examples 1-40.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a pail hereof show, by way of illustration, and not of limitation, specific aspects in which the subject matter may be practiced. The aspects illustrated are described in sufficient detail to enable those skilled in the an to practice the teachings disclosed herein Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. A method, comprising:
receiving a configuration with first resources for physical downlink control channel (PDCCH) monitoring and configuration of an associated control resource set (CORESET), wherein the first resources occupy a subset of a plurality of OFDM symbols within a slot;
receiving a message scheduling a physical downlink shared channel (PDSCH) demodulation reference signal (DM-RS) in the slot, wherein a first front-loaded DMRS symbol of the PDSCH DM-RS collides with the first resources; and
receiving the first front-loaded DMRS symbol of the PDSCH DM-RS starting at a shifted symbol location based on the collision, wherein the shifted symbol location is immediately after the associated CORESET.

2. The method of claim 1, wherein when an additional DM-RS is associated with the PDSCH: (1) the additional DM-RS is shifted to a second symbol location or (2) a UE assumes the additional DM-RS is not transmitted.

3. The method of claim 1, wherein a PDSCH transmission uses mapping type B.

4. The method of claim 1, wherein the DM-RS is a full DM-RS.

5. Method of claim 4, wherein the full DM-RS occupies a same number of physical resource blocks (PRBs) as the CORESET.

6. The method of claim 1, wherein the DM-RS occupies one of a single symbol or two symbols within the slot.

7. The method of claim 1, wherein the DM-RS is shifted by zero or more OFDM symbols.

8. A method, comprising:
transmitting, to a user equipment (UE), configuration of first resources for physical downlink control channel (PDCCH) monitoring and associated control resource set (CORESET) configuration, wherein the first resources occupy a subset of a plurality of OFDM symbols within a slot;
scheduling a physical downlink shared channel (PDSCH) demodulation reference signal (DM-RS) in the slot, wherein a first front-loaded DMRS symbol of the PDSCH DM-RS collides with the first resources; and
transmitting the first front-loaded DMRS symbol of the PDSCH DM-RS starting at a shifted symbol location based on the collision, wherein the shifted symbol location is immediately after the associated CORESET.

9. The method of claim 8, wherein when an additional DM-RS is associated with the PDSCH: (1) the additional DM-RS is shifted to a second symbol location or (2) the UE assumes the additional DM-RS is not transmitted.

10. The method of claim 8, wherein a PDSCH transmission uses mapping type B.

11. The method of claim 8, wherein the DM-RS is a full DM-RS.

12. The method of claim 11, wherein the full DM-RS occupies a same number of physical resource blocks (PRBs) as the CORESET.

13. The method of claim 8, wherein the DM-RS occupies one of a single symbol or two symbols within the slot.

14. The method of claim 8, wherein the DM-RS is shifted by zero or more OFDM symbols.

15. A method, comprising:
 transmitting, to a user equipment (UE), configuration of first resources for physical downlink control channel (PDCCH) monitoring and configuration of an associated control resource set (CORESET), wherein the first resources occupy a subset of a plurality of OFDM symbols within a slot;
 scheduling a physical downlink shared channel (PDSCH) demodulation reference signal (DM-RS) in the slot; and
 when a first front-loaded DMRS symbol of the PDSCH DM-RS collides with the configuration the first resources, transmitting the first front-loaded DMRS symbol of the PDSCH DM-RS immediately after the associated CORESET.

16. The method of claim 15, wherein when an additional DM-RS is associated with the PDSCH: (1) the additional DM-RS is shifted to a second symbol location or (2) the UE assumes the additional DM-RS is not transmitted.

17. The method of claim 15, wherein a PDSCH transmission uses mapping type B.

18. The method of claim 15, wherein the DM-RS is a full DM-RS.

19. The method of claim 15, wherein the DM-RS occupies one of a single symbol or two symbols within the slot.

20. The method of claim 15, wherein the DM-RS is shifted by zero or more OFDM symbols.

* * * * *